United States Patent
Han et al.

(10) Patent No.: US 12,081,053 B2
(45) Date of Patent: Sep. 3, 2024

(54) CHARGING METHOD AND ELECTRONIC DEVICE

(71) Applicant: Huawei Technologies Co., Ltd., Shenzhen (CN)

(72) Inventors: Jingsong Han, Shenzhen (CN); Chengjun Yang, Shanghai (CN); Lihou Ma, Shenzhen (CN); Rui Cui, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/007,494

(22) PCT Filed: Jul. 26, 2021

(86) PCT No.: PCT/CN2021/108334
§ 371 (c)(1),
(2) Date: Jan. 31, 2023

(87) PCT Pub. No.: WO2022/022436
PCT Pub. Date: Feb. 3, 2022

(65) Prior Publication Data
US 2023/0291218 A1    Sep. 14, 2023

(30) Foreign Application Priority Data
Jul. 31, 2020 (CN) .......................... 202010763535.X

(51) Int. Cl.
*H02J 7/00* (2006.01)

(52) U.S. Cl.
CPC .......... *H02J 7/0068* (2013.01); *H02J 7/0047* (2013.01)

(58) Field of Classification Search
CPC ........... H02J 7/00; H02J 7/0068; H02J 7/0047
See application file for complete search history.

(56) References Cited

U.S. PATENT DOCUMENTS

2019/0176652 A1*   6/2019  Teng ...................... B60L 55/00

* cited by examiner

*Primary Examiner* — Robert L Deberadinis
(74) *Attorney, Agent, or Firm* — SLATER MATSIL, LLP

(57) ABSTRACT

In an embodiment, a method includes controlling an electronic device to be in a state in which both a load and a battery of the electronic device are powered by a charging device when a battery level of the battery is less than or equal to a first preset battery level and controlling the electronic device to be in a state in which neither the load nor the battery is powered by the charging device and the battery supplies power to the load when the battery level of the battery is greater than or equal to a second preset battery level, wherein the second preset battery level is greater than the first preset battery level and less than or equal to a maximum battery level of the battery.

20 Claims, 53 Drawing Sheets

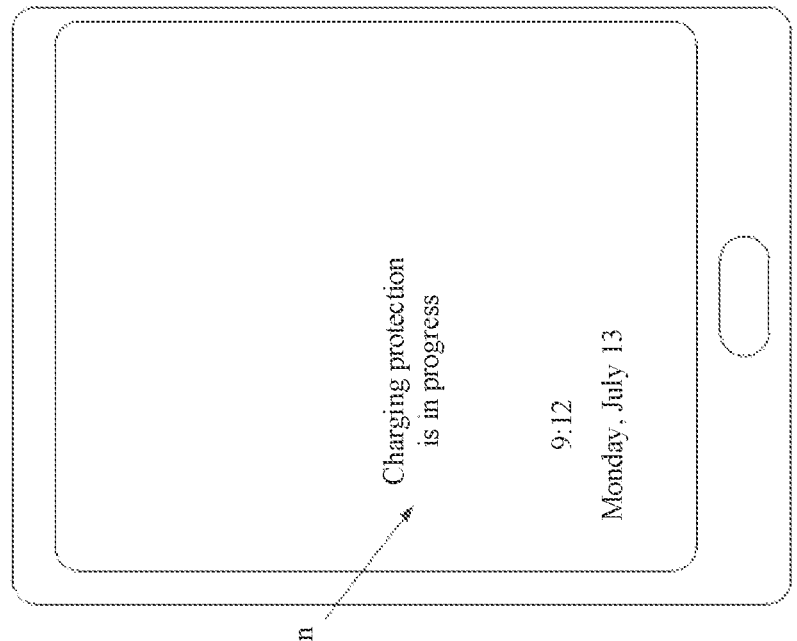
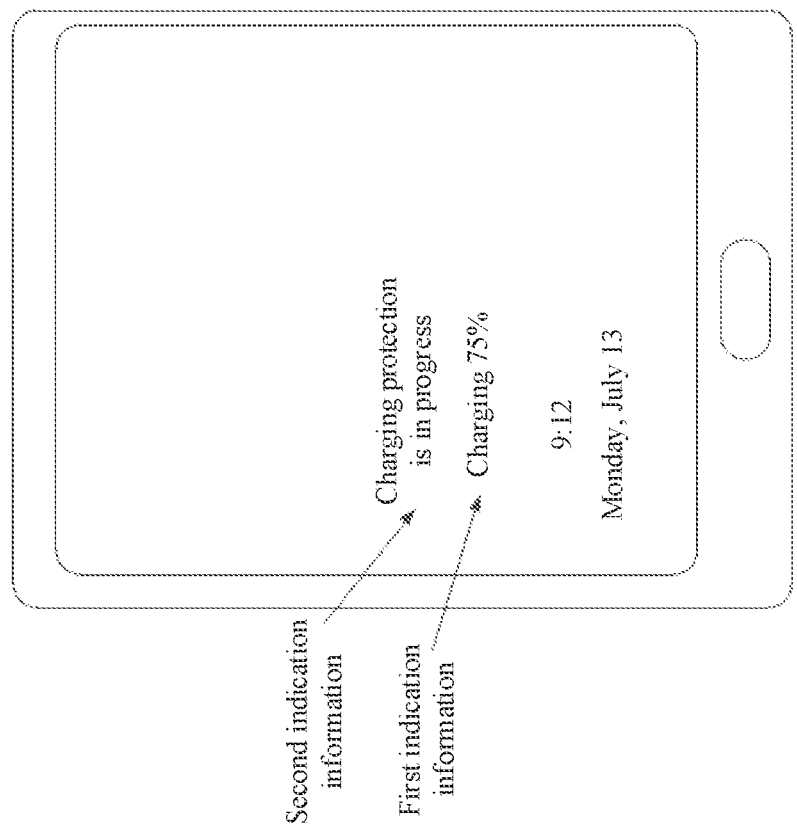
FIG. 7A
FIG. 7B

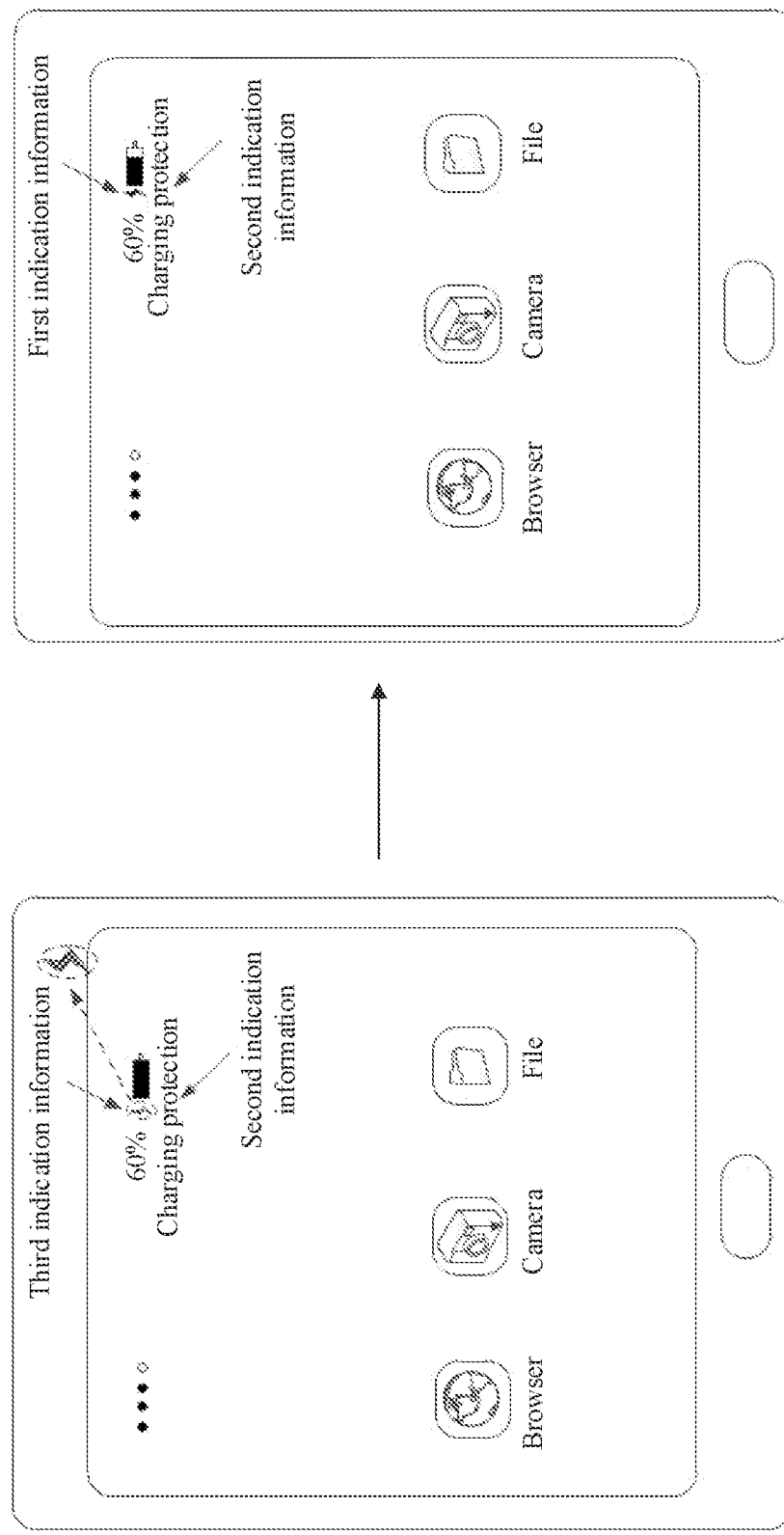

```
                    CONT.
                    FROM
                    FIG. 24A                              CONT.
                      ~                                   FROM
                                                          FIG. 24A
         ┌─────────────────────────────────┐                ~
         │ The electronic device determines │   ┌─────────────────────────────────┐
         │ that the battery level of the   │   │ The electronic device determines │
         │ battery is less than or equal   │   │ that the battery level of the   │
         │ to the first preset battery     │   │ battery is greater than or equal │
  S1001  │ level, and the electronic device│   │ to a second preset battery      │  S1704
         │ switches to a second power      │   │ level, and the electronic device│
         │ supply state, where the second  │   │ switches to a second power      │
         │ power supply state includes a   │   │ supply state                    │
         │ state in which the load of the  │   └─────────────────────────────────┘
         │ electronic device is powered by │                    │
         │ the charging device and the     │                    ▼
         │ battery is not powered by the   │   ┌─────────────────────────────────┐
         │ charging device                 │   │ The electronic device maintains │
         └─────────────────────────────────┘   │ the second power supply state   │  S1705
                          │                    │ for second preset duration      │
                          ▼                    └─────────────────────────────────┘
         ┌─────────────────────────────────┐                    │
         │ The electronic device controls  │                    ▼
  S1002  │ the electronic device to        │   ┌─────────────────────────────────┐
         │ maintain the second power supply│   │ The electronic device switches  │  S1706
         │ state for first preset duration │   │ to a third power supply state   │
         └─────────────────────────────────┘   └─────────────────────────────────┘
                          │                                     │
                          ▼                                     ▼
         ┌─────────────────────────────────┐   ┌─────────────────────────────────┐
  S1003  │ The electronic device switches  │   │ The electronic device determines │
         │ to the first power supply state │   │ that the battery level of the   │
         └─────────────────────────────────┘   │ battery is less than or equal to │  S1004
                          │                    │ the first preset battery level,  │
                          ▼                    │ and the electronic device        │
         ┌─────────────────────────────────┐   │ switches to the second power     │
         │ The electronic device determines │   │ supply state                    │
         │ that the battery level of the   │   └─────────────────────────────────┘
         │ battery is greater than or equal│                    │
         │ to a second preset battery      │                    ▼
  S1701  │ level, and the electronic device│   ┌─────────────────────────────────┐
         │ switches to the second power    │   │ The electronic device maintains │
         │ supply state, where the second  │   │ the second power supply state   │  S1005
         │ preset battery level is greater │   │ for first preset duration       │
         │ than the first preset battery   │   └─────────────────────────────────┘
         │ level and less than or equal to │                    │
         │ a maximum battery level of the  │                    ▼
         │ battery                         │   ┌─────────────────────────────────┐
         └─────────────────────────────────┘   │ The electronic device switches  │  S1006
                          │                    │ to the first power supply state │
                          ▼                    └─────────────────────────────────┘
         ┌─────────────────────────────────┐                    │
         │ The electronic device controls  │                    ▼
  S1702  │ the electronic device to        │
         │ maintain the second power supply│
         │ state for second preset duration│
         └─────────────────────────────────┘
                          │
                          ▼
         ┌─────────────────────────────────┐
  S1703  │ The electronic device switches  │
         │ to the third power supply state │
         └─────────────────────────────────┘
                          │
                          ▼
```

Repeat step S1001 to step 1703 until the electronic device is disconnected from the charging device Repeat step S1704 to step 1006 until the electronic device is disconnected from the charging device

FIG. 24B

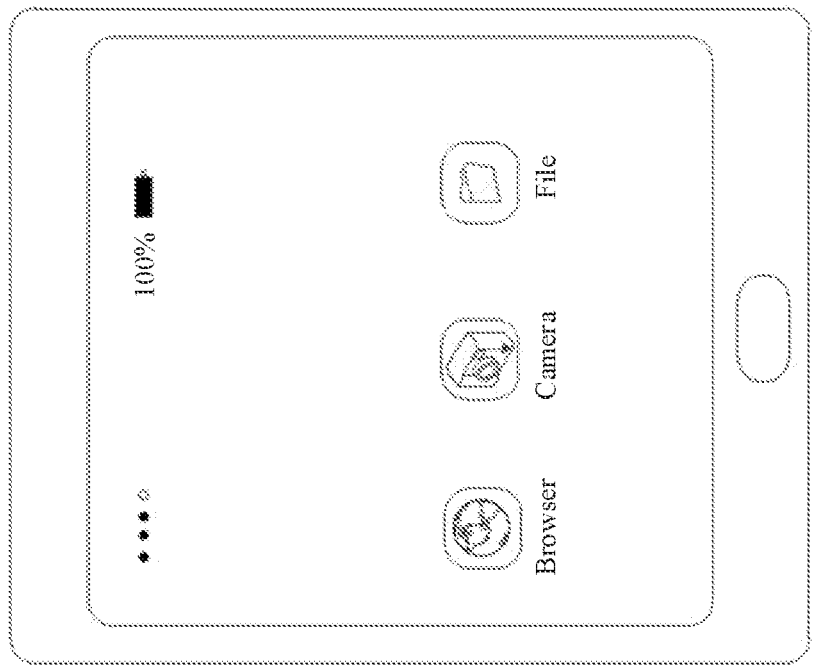
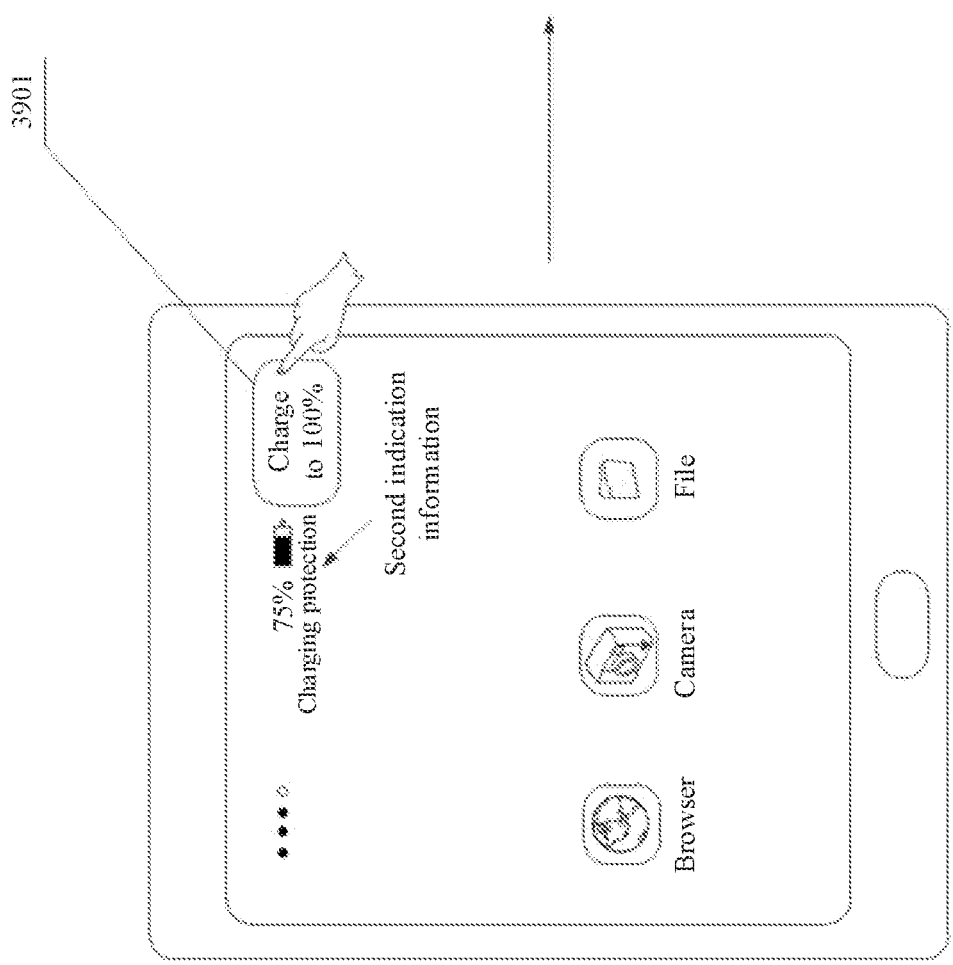
FIG. 40A
FIG. 40B

CHARGING METHOD AND ELECTRONIC DEVICE

This application is a National Stage of International Patent Application No. PCT/CN2021/108334 filed on Jul. 26, 2021, which claims priority to Chinese Patent Application No. 202010763535.X filed on Jul. 31, 2020. Both of the aforementioned applications are hereby incorporated by reference in their entireties.

TECHNICAL FIELD

This application relates to the field of terminal device technologies, and in particular, to a charging method and an electronic device.

BACKGROUND

With development of electronic devices, functions of the electronic devices are diversified, and the diversified functions impose increasingly strict requirements on battery safety, service lives, and the like of the electronic devices.

Currently, some electronic devices are put on charging cradles during use. For example, an intelligent voice assistant tablet, a mobile phone used for commercial demonstration, or an in-vehicle tablet computer is usually put on a charging cradle during use. In these scenarios, in a process in which the electronic device is connected to the charging cradle, the charging cradle continuously supplies power to the electronic device, so that a battery of the electronic device is in a high battery level state for a long time, or even in a full battery level state for a long time.

However, if the battery of the electronic device is in the high battery level state for a long time, an aging and expansion rate of the battery of the electronic device is accelerated, and a service life of the battery is shortened.

SUMMARY

This application provides a charging method and an electronic device, to prolong a service life of a battery of the electronic device.

According to a first aspect, an embodiment of this application provides a charging method, including: controlling, if a battery level of a battery of an electronic device is less than or equal to a first preset battery level, the electronic device to be in a state in which both a load and the battery of the electronic device are powered by a charging device; and controlling, if the battery level of the battery is greater than or equal to a second preset battery level, the electronic device to be in a state in which neither the load nor the battery is powered by the charging device, and the battery supplies power to the load, where the second preset battery level is greater than the first preset battery level and is less than or equal to a maximum battery level of the battery. Optionally, the first preset battery level is greater than or equal to a battery level 50% and less than or equal to a battery level 65%. Optionally, the second preset battery level is greater than or equal to a battery level 70% and less than or equal to a battery level 85%.

In a process in which the charging device charges the electronic device, when the battery level of the battery is less than or equal to the first preset battery level, the electronic device controls the electronic device to be in the state in which both the load and the battery are powered by the charging device, so that the battery level of the battery increases. When the battery level of the battery increases to be greater than or equal to the second preset battery level, the electronic device switches to the state in which neither the load nor the battery is powered by the charging device, and the battery supplies power to the load, so that the battery level of the battery decreases. The second preset battery level is less than or equal to the maximum battery level of the battery. This can avoid that the battery of the electronic device is in a high battery level state for a long time, thereby prolonging a service life of the battery.

In a possible implementation, after the controlling, if a battery level of a battery of an electronic device is less than or equal to a first preset battery level, the electronic device to be in a state in which both a load and the battery are powered by a charging device, the method further includes: displaying first indication information, where the first indication information indicates that the battery is in a state in which the charging device supplies power.

In this solution, after the electronic device is in the state in which both the load and the battery are powered by the charging device, the first indication information is displayed, so that a user can learn that the battery of the electronic device is in the state in which the charging device supplies power. In this case, reliability of the electronic device is improved.

In a possible implementation, the controlling, if a battery level of a battery of an electronic device is less than or equal to a first preset battery level, the electronic device to be in a state in which both a load and the battery are powered by the charging device includes: if the battery level of the battery of the electronic device is less than or equal to the first preset battery level, controlling the electronic device to be in a state in which the load is powered by the charging device and the battery is not powered by the charging device; and if duration in which the electronic device is in the state in which the load is powered by the charging device and the battery is not powered by the charging device is equal to first preset duration, controlling the electronic device to be in the state in which both the load and the battery are powered by the charging device.

In this solution, when determining that the battery level of the battery is less than or equal to the first preset battery level, the electronic device does not immediately switch to the state in which both the load and the battery are powered by the charging device, but switches to the state in which both the load and the battery are powered by the charging device after maintaining the state in which the load is powered by the charging device and the battery is not powered by the charging device and the battery level of the battery does not increase for a period of time. This avoids that the battery is in a high battery level state for a long time, reduces a charge/discharge cycle frequency of the battery, and further reduces a battery capacity loss rate caused by a charge/discharge cycle.

In a possible implementation, the controlling, if the battery level of the battery is greater than or equal to a second preset battery level, the electronic device to be in a state in which neither the load nor the battery is powered by the charging device, and the battery supplies power to the load includes: if the battery level of the battery of the electronic device is greater than or equal to the second preset battery level, controlling the electronic device to be in the state in which the load is powered by the charging device and the battery is not powered by the charging device; and if the duration in which the electronic device is in the state in which the load is powered by the charging device and the battery is not powered by the charging device is equal to second preset duration, controlling the electronic device to be in the state in which neither the load nor the battery is powered by the charging device, and the battery supplies power to the load.

In this solution, when determining that the battery level of the battery increases to be greater than or equal to the second preset battery level, the electronic device does not immediately switch to the state in which neither the load nor the battery is powered by the charging device, and the battery supplies power to the load, but switches to the state in which neither the load nor the battery is powered by the charging device, and the battery supplies power to the load after maintaining the state in which the load is powered by the charging device and the battery is not powered by the charging device, and the battery level of the battery does not increase for a period of time. This avoids that the battery is in a high battery level state for a long time, and further reduces a charge/discharge cycle frequency of the battery, and further reduces a battery capacity loss rate caused by a charge/discharge cycle.

In a possible implementation, after the controlling the electronic device to be in a state in which the load is powered by the charging device and the battery is not powered by the charging device, the method further includes: displaying third indication information, where the third indication information indicates that the electronic device is in the state in which the load is powered by the charging device and the battery is not powered by the charging device.

In this solution, after the electronic device is in the state in which the load is powered by the charging device and the battery is not powered by the charging device, the third indication information is displayed, so that a user can learn of a current power supply state of the electronic device. In this case, reliability of the electronic device is improved.

In a possible implementation, before the controlling, if a battery level of a battery of an electronic device is less than or equal to a first preset battery level, the electronic device to be in a state in which both a load and the battery are powered by a charging device, the method further includes: after the electronic device is connected to the charging device, controlling the electronic device to be in the state in which both the load and the battery are powered by the charging device; if the battery level of the battery of the electronic device is greater than or equal to a third preset battery level, controlling the electronic device to be in the state in which the load is powered by the charging device and the battery is not powered by the charging device, where the third preset battery level is greater than or equal to the second preset battery level and is less than or equal to the maximum battery level of the battery; and controlling the electronic device to last for third preset duration in the state in which the load is powered by the charging device and the battery is not powered by the charging device.

In this solution, after the electronic device is connected to the charging device, the battery level of the battery increases. If the battery level of the battery is greater than or equal to the third preset battery level, the electronic device is first controlled to last for the third preset duration in the state in which the load is powered by the charging device and the battery is not powered by the charging device, so that the battery of the electronic device can maintain a high battery level for a period of time. In this way, the user can learn that the battery is in a high battery level state based on battery level indication information displayed on a display, and can learn that charging functions of the electronic device and the charging device are normal, that is, reliability of the electronic device is high.

In a possible implementation, after the controlling the electronic device to last for third preset duration in the state in which the load is powered by the charging device and the battery is not powered by the charging device, and before the controlling, if a battery level of a battery is less than or equal to a first preset battery level, the electronic device to be in a state in which both a load and the battery are powered by a charging device, the method further includes: if the battery level of the battery is greater than the first preset battery level, controlling the electronic device to be in the state in which neither the load nor the battery is powered by the charging device, and the battery supplies power to the load.

This solution provides a specific implementation when the battery level of the battery is greater than the first preset battery level after the controlling the electronic device to last for third preset duration in the state in which the load is powered by the charging device and the battery is not powered by the charging device, and before the controlling, if a battery level of a battery is less than or equal to a first preset battery level, the electronic device to be in a state in which both a load and the battery are powered by a charging device.

In a possible implementation, the method further includes: displaying second indication information, where the second indication information indicates that the battery of the electronic device is in a charging protection state.

In this solution, after the electronic device determines that the electronic device is connected to the charging device, the electronic device pushes the second indication information, so that the user learns that the electronic device is in the charging protection state. For example, when battery level indication information indicates that the battery does not reach the maximum battery level, the user may learn, by using the second indication information, that a reason that the battery does not reach the maximum battery level is that the battery is in the charging protection state instead of that the electronic device or the charging device is faulty. In this case, reliability of the electronic device is improved.

In a possible implementation, the method further includes: obtaining a first instruction, where the first instruction instructs to charge the battery to the maximum battery level; and controlling, in response to the first instruction, the electronic device to be in the state in which both the load and the battery are powered by the charging device, so that the battery level of the battery reaches the maximum battery level.

In this solution, the electronic device in the charging protection state meets a requirement of a user for enabling the battery level of the battery to reach the maximum battery level by charging, so that reliability of the electronic device is improved.

In a possible implementation, the obtaining a first instruction includes: obtaining the first instruction input by a user by using a voice; or obtaining the first instruction that is input by a user by using an operation on a preset icon on a display interface; or obtaining the first instruction that is input by a user by using an operation on a preset physical button. This solution provides several specific implementations of obtaining the first instruction.

According to a second aspect, an embodiment of this application provides an electronic device, including a processor. The processor is configured to: control, if a battery level of a battery of an electronic device is less than or equal to a first preset battery level, the electronic device to be in a state in which both a load and the battery of the electronic device are powered by a charging device; and control, if the battery level of the battery is greater than or equal to a second preset battery level, the electronic device to be in a state in which neither the load nor the battery is powered by the charging device, and the battery supplies power to the load, where the second preset battery level is greater than the first preset battery level and is less than or equal to a maximum battery level of the battery.

In a possible implementation, when the processor is configured to control, if the battery level of the battery is less than or equal to the first preset battery level, the electronic device to be in the state in which both the load and the battery are powered by the charging device, the processor is specifically configured to: if the battery level of the battery of the electronic device is less than or equal to the first preset battery level, control the electronic device to be in a state in which the load is powered by the charging device and the battery is not powered by the charging device; and if duration in which the electronic device is in the state in which the load is powered by the charging device and the battery is not powered by the charging device is equal to first preset duration, control the electronic device to be in the state in which both the load and the battery are powered by the charging device.

In a possible implementation, when the processor is configured to control, if the battery level of the battery is greater than or equal to the second preset battery level, the electronic device to be in the state in which neither the load nor the battery is powered by the charging device, and the battery supplies power to the load, the processor is specifically configured to: if the battery level of the battery of the electronic device is greater than or equal to the second preset battery level, control the electronic device to be in the state in which the load is powered by the charging device and the battery is not powered by the charging device; and if the duration in which the electronic device is in the state in which the load is powered by the charging device and the battery is not powered by the charging device is equal to second preset duration, control the electronic device to be in the state in which neither the load nor the battery is powered by the charging device, and the battery supplies power to the load.

In a possible implementation, before the processor controls, if the battery level of the battery of the electronic device is less than or equal to the first preset battery level, the electronic device to be in the state in which both the load and the battery are powered by the charging device, the processor is further configured to: after the electronic device is connected to the charging device, control the electronic device to be in the state in which both the load and the battery are powered by the charging device; if the battery level of the battery of the electronic device is greater than or equal to a third preset battery level, control the electronic device to be in the state in which the load is powered by the charging device and the battery is not powered by the charging device, where the third preset battery level is greater than or equal to the second preset battery level and is less than or equal to the maximum battery level of the battery; and control the electronic device to last for third preset duration in the state in which the load is powered by the charging device and the battery is not powered by the charging device.

In a possible implementation, after the processor controls the electronic device to last for the third preset duration in the state in which the load is powered by the charging device and the battery is not powered by the charging device, and before the processor controls, if the battery level of the battery is less than or equal to the first preset battery level, the electronic device to be in the state in which both the load and the battery are powered by the charging device, the processor is further configured to: if the battery level of the battery is greater than the first preset battery level, control the electronic device to be in the state in which neither the load nor the battery is powered by the charging device, and the battery supplies power to the load.

In a possible implementation, the electronic device further includes a display. After the processor controls the electronic device to be in the state in which both the load and the battery are powered by the charging device, the display is configured to display first indication information, where the first indication information indicates that the battery is in a state in which the charging device supplies power.

In a possible implementation, the electronic device further includes a display. After the processor controls the electronic device to be in the state in which the load is powered by the charging device and the battery is not powered by the charging device, the display is configured to: display third indication information, where the third indication information indicates that the electronic device is in the state in which the load is powered by the charging device and the battery is not powered by the charging device.

In a possible implementation, the electronic device further includes a display. The display is configured to: display second indication information, where the second indication information indicates that the battery of the electronic device is in a charging protection state.

In a possible implementation, the processor is further configured to: obtain a first instruction, where the first instruction instructs to charge the battery to the maximum battery level; and control, in response to the first instruction, the electronic device to be in the state in which both the load and the battery are powered by the charging device, so that the battery level of the battery reaches the maximum battery level.

In a possible implementation, when obtaining the first instruction, the processor is specifically configured to: obtain the first instruction input by a user by using a voice; or obtain the first instruction that is input by a user by using an operation on a preset icon on a display interface; or obtain the first instruction that is input by a user by using an operation on a preset physical button.

In a possible implementation, the first preset battery level is greater than or equal to a battery level 50% and less than or equal to a battery level 65%.

In a possible implementation, the second preset battery level is greater than or equal to a battery level 70% and less than or equal to a battery level 85%.

According to a third aspect, an embodiment of this application provides a non-transitory computer-readable storage medium storing computer instructions. The computer instructions are used to enable a computer to perform the method according to any one of the first aspect and the possible implementations of the first aspect.

BRIEF DESCRIPTION OF THE DRAWINGS

FIG. 7A is a schematic diagram 2 of a user interface of an electronic device in a screen-locked state according to an embodiment of this application;

FIG. 7B is a schematic diagram 3 of a user interface of an electronic device in a screen-locked state according to an embodiment of this application;

FIG. 14A is a schematic diagram 6 of a user interface of an electronic device in a use state according to an embodiment of this application;

FIG. 14B is a schematic diagram 7 of a user interface of an electronic device in a use state according to an embodiment of this application;

FIG. 24A and FIG. 24B are a flowchart 4 of a charging method according to an embodiment of this application;

FIG. 40A is a schematic diagram 16 of a user interface of an electronic device in a use state according to an embodiment of this application;

FIG. 40B is a schematic diagram 17 of a user interface of an electronic device in a use state according to an embodiment of this application;

DETAILED DESCRIPTION OF ILLUSTRATIVE EMBODIMENTS

First, elements in this application are first described.

In this embodiment of this application, if an electronic device is in a state in which both a load and a battery are powered by a charging device, it is referred to that the electronic device is in a first power supply state. If the electronic device is in a state in which the load of the electronic device is powered by the charging device and the battery is not powered by the charging device, it is considered that the electronic device is in a second power supply state. If the electronic device is in a state in which neither the load nor the battery is powered by the charging device, and the battery supplies power to the load, it is considered that the electronic device is in a third power supply state. The load of the electronic device may include at least another component that needs to be powered, such as a processor, a memory, and a camera.

Second, a system architecture and a device in this application are described.

Figure 1A:
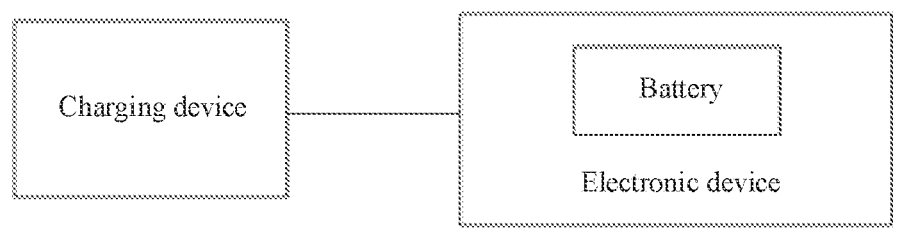
FIG. 1A is a diagram of a possible system architecture according to an embodiment of this application.

FIG. 1A is a diagram of a possible system architecture according to an embodiment of this application. Refer to FIG. 1A. The system architecture includes an electronic device and a charging device. The electronic device has a built-in battery. The electronic device may be but is not limited to at least one of the following: a tablet computer, a mobile phone, a charging headset, a vacuum cleaner, a floor sweeping robot, and the like. The tablet computer may be but is not limited to any one of the following: a personal tablet computer, a tablet computer used for a taxi or online car-hailing, a tablet computer used for processing control, a tablet computer used for access control, a tablet computer used for a hotel or restaurant, a tablet computer used for self-service, a tablet computer used for teaching, a tablet computer used for a conference, a tablet computer used for enterprise management, and a tablet computer used for firefighting.

Figure 1B:
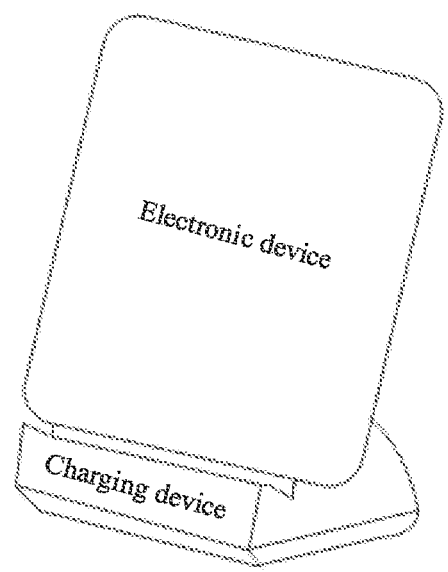
FIG. 1B is a schematic diagram of a connection between a charging device and an electronic device according to an embodiment of this application.

After the charging device is connected to the electronic device, the charging device starts to charge the electronic device. The charging device may be a charging cradle, or may be a charger having a data cable. When the charging device is the charging cradle, a schematic diagram of a connection between the charging device and the electronic device may be shown in FIG. 1B. In this case, the connection between the electronic device and the charging device may be physical contact or physical contact and electrical connection between the electronic device and the charging device. It may be understood that when the electronic device and the charging device are physically in contact and are not electrically connected, the charging device may charge the electronic device through electromagnetic induction between the charging device and the electronic device.

After the electronic device is connected to the charging device, a process in which the charging device charges the electronic device may be started. The charging device may be connected to an external power supply in the process of charging the electronic device.

Figure 2:
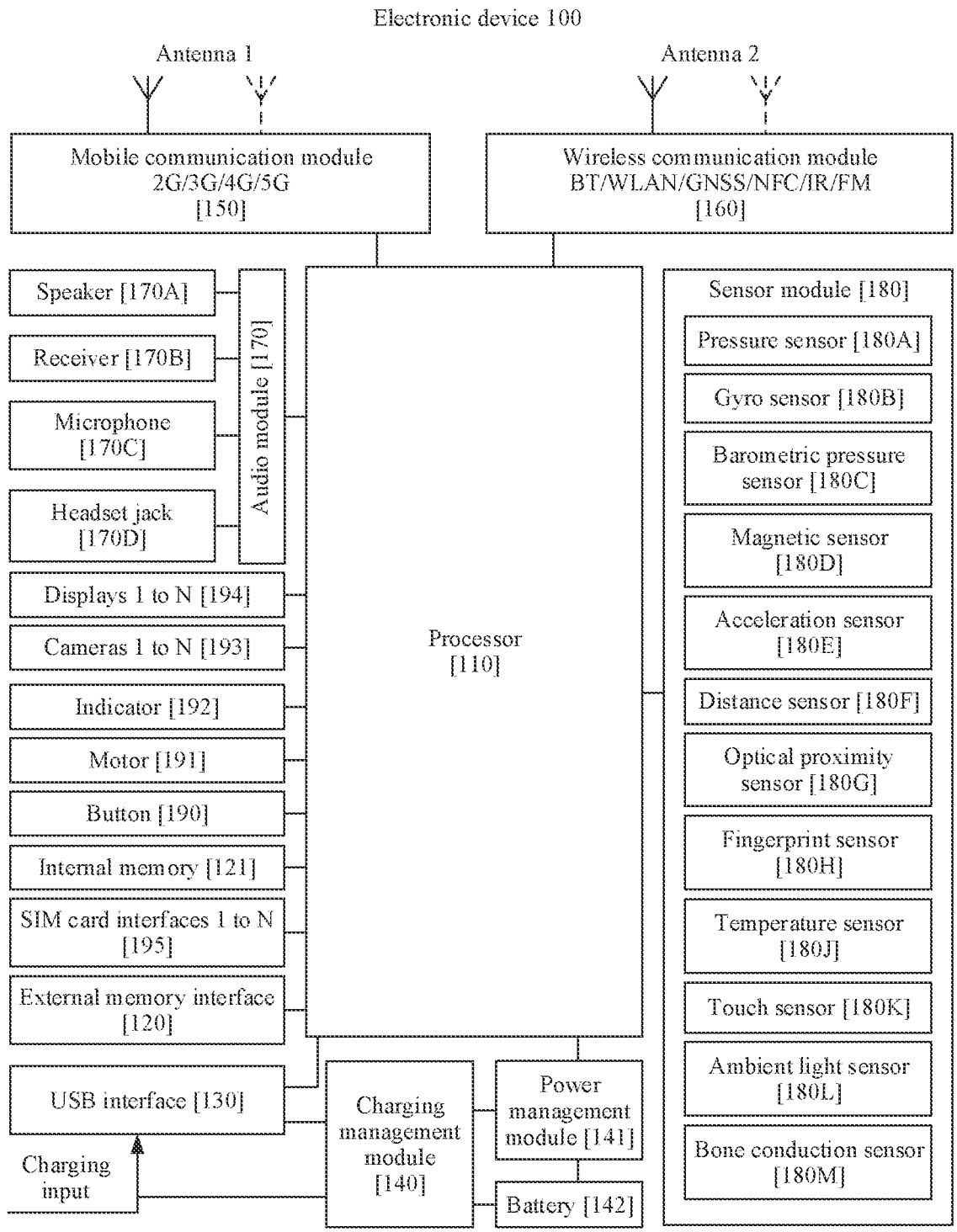
FIG. 2 is a schematic diagram of a structure of an electronic device according to an embodiment of this application.

A structure of the electronic device is described with reference to FIG. 2. FIG. 2 is a schematic diagram of a structure of an electronic device according to an embodiment of this application. Refer to FIG. 2. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to peripheral components such as the display 194 and the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI interface, to implement a display function of the electronic device 100.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The mobile communication module 150 may provide a solution applied to the electronic device 100 for wireless communication such as 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules in the mobile communication module 150 may be disposed in the processor 110. In some embodiments, at least some function modules in the mobile communication module 150 may be disposed in a same component as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same component as the mobile communication module 150 or another functional module.

The wireless communication module 160 may provide a solution that is applied to the electronic device 100 and that is for wireless communication such as a wireless local area network (wireless local area network, WLAN) (for example, a Wi-Fi network), BT, a global navigation satellite system (global navigation satellite system, GNSS), frequency modulation (frequency modulation, FM), near field communication (near field communication, NFC), or an infrared (infrared, IR) technology. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation system, SBAS).

The electronic device 100 implements a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flex light-emitting diode (flex light-emitting diode, FLED), a mini-LED, a micro-LED, a micro-OLED, a quantum dot light-emitting diode (quantum dot light-emitting diode, QLED), or the like. In some embodiments, the electronic device 100 may include one or N displays 194, where N is a positive integer greater than 1.

Optionally, the touch sensor may be disposed on the display, and the touch sensor and the display 194 constitute a touchscreen, which is also referred to as a "touch screen". The touch sensor is configured to detect a touch operation performed on or near the touch sensor. The touch sensor may transfer the detected touch operation to the application processor to determine a type of a touch event. The display 194 may provide a visual output related to the touch operation. The touch sensor may alternatively be disposed on a surface of the electronic device 100 at a location different from that of the display 194. The touch sensor may also be referred to as a touch panel or a touch-sensitive surface.

The electronic device 100 can implement a photographing function through the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of the camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)1, MPEG2, MPEG3, and MPEG4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external storage card such as a Micro SD card, to extend a storage capability of the electronic device 100. The external memory card communicates with the processor 110 through the external memory interface 120, to implement a data storage function. For example, a file such as music or a video is stored in the external storage card.

The internal memory 121 may be configured to store computer-executable program code, and the executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a non-volatile memory, for example, at least one magnetic disk storage device, a flash memory, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement an audio function through the audio module 170, the speaker 170A, the receiver 170B, the microphone 170C, the headset jack 170D, the application processor, and the like. For example, the audio function may be music playing, recording, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

Second, to better understand this application, a current technical problem is described.

Currently, after an electronic device is connected to a charging device, the electronic device controls the electronic device to be in a first power supply state, so that a battery of the electronic device reaches a maximum battery level. After a battery level of the battery reaches the maximum battery level, the electronic device switches the first power supply state to a second power supply state. In the second power supply state, if the battery level of the battery is less than a preset battery level, the electronic device switches the second power supply state to the first power supply state, and switches to the second power supply state after the battery level of the battery reaches the maximum battery level again. This process repeats until the electronic device is disconnected from the charging device. The preset battery level may be, for example, a preset multiple of the maximum battery level, and the preset multiple may be greater than or equal to 98% and less than or equal to 99.9%.

Figure 3:
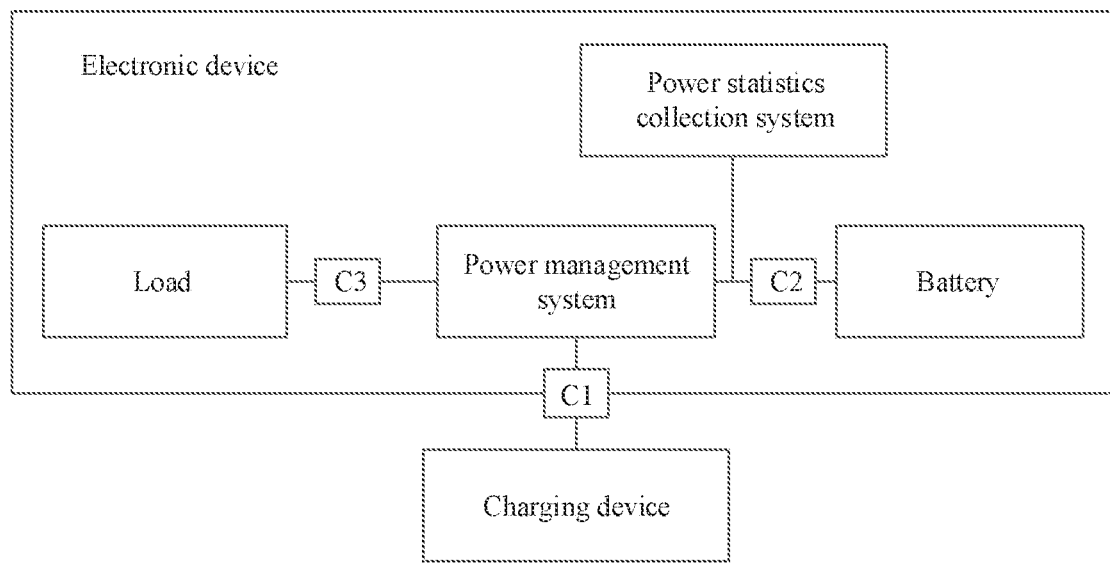
FIG. 3 is a schematic diagram of an internal functional structure of an electronic device according to an embodiment of this application.

Internal implementation of the foregoing charging process may be described with reference to FIG. 3. FIG. 3 is a schematic diagram of an internal functional structure of an electronic device according to an embodiment of this application. Refer to FIG. 3. The electronic device includes: a load, a power management system, a battery, and a power statistics collection system. The load includes a processor and a memory. The power management system includes a first switch C1, a second switch C2, and a third switch C3. In a state in which the first switch C1 is turned on, a charging channel between the power management system and a charging device is opened, so that the power management system obtains electric energy from the charging device. In a state in which the third switch C3 is turned on, a channel between the power management system and the load is opened, so that the power management system transmits the obtained electric energy to the load, where when the battery is normal, the third switch C3 is in a normally open state. In a state in which the second switch C2 is turned on, a channel between the power management system and the battery is opened, so that the power management module transmits the obtained electric energy to the battery. In addition, there is a normally open channel between the battery and the load, so that the battery supplies power to the load when the load needs to be supplied with electric energy by using the battery.

Specifically, after the electronic device is placed and connected to the charging device, the first switch C1, the second switch C2, and the third switch C3 are all in the turned-on state, the processor controls the power management system to transmit the electric energy from the charging device to the load and the battery, and the electronic device is in a first power supply state. The power statistics collection system obtains the battery level of the battery in real time, and sends the battery level of the battery to the processor. If the processor determines that the battery level of the battery reaches the maximum battery level, the processor controls the power management system to turn off the second switch C2. In this case, the power management system continues to transmit the electric energy from the charging device to the load but stops transmitting the electric energy to the battery, that is, the electronic device is in a second power supply state. In the second power supply state, if the processor determines that the battery level of the battery is less than a preset battery level, the electronic device controls the power management system to turn on the second switch C2, that is, the electronic device switches from the second power supply state to the first power supply state, and after determining that the battery level of the battery reaches the maximum battery level again, controls the power management system to turn off the second switch C2, that is, switch to the second power supply state. This process repeats until the electronic device is disconnected from the charging device.

It can be learned from the foregoing power supply process that in a scenario in which the electronic device is connected to the charging device for a long time, the battery of the electronic device is in a high battery level state for a long time, or even in a full battery level state for a long time. For example, a tablet computer in a taxi or a vehicle for online car-hailing, a tablet computer used for teaching, or the like is placed on the charging device for a long time, and a battery of the tablet computer is in a high battery level state for a long time. For another example, in a charging process of a mobile phone, if a battery of the mobile phone is still connected to the charging device for a long time after being fully charged, the battery of the mobile phone is also in a high battery level state for a long time. If the battery is in the high battery level state for a long time, an aging and expansion rate of the battery of the electronic device is accelerated, and a service life of the battery is shortened.

To resolve a technical problem that the service life of the battery is shortened because the battery of the electronic device is in the high battery level state for a long time, the following improvement solution is currently proposed: A physical switch is additionally disposed on the charging device, and the charging device charges the electronic device when the physical switch is turned on. After the battery of the electronic device has a full battery level, the electronic device sends a control signal to the charging device, the charging device turns off the physical switch based on the control signal, and the charging device stops supplying power to the electronic device. However, this improved solution increases structural complexity of the charging device.

Therefore, how to reduce duration in which the battery of the electronic device is at a high battery level to prolong the service life of the battery without changing structures/a structure of the electronic device and/or the charging device is an urgent technical problem to be resolved. To resolve the technical problem, this application proposes a charging method for an electronic device: controlling, if a battery level of a battery of an electronic device is less than or equal to a first preset battery level, the electronic device to be in a state in which both a load and the battery of the electronic device are powered by a charging device, that is, controlling the electronic device to be in a first power supply state; and controlling, if the battery level of the battery is greater than or equal to a second preset battery level, the electronic device to be in a state in which neither the load nor the battery is powered by the charging device, and the battery supplies power to the load, that is, controlling the electronic device to be in a third power supply state, where the second preset battery level is greater than the first preset battery level and is less than or equal to a maximum battery level of the battery. This can avoid that the battery of the electronic device is in a high battery level state for a long time, thereby prolonging a service life of the battery.

The following describes the charging method in this application by using specific embodiments.

Figure 4:
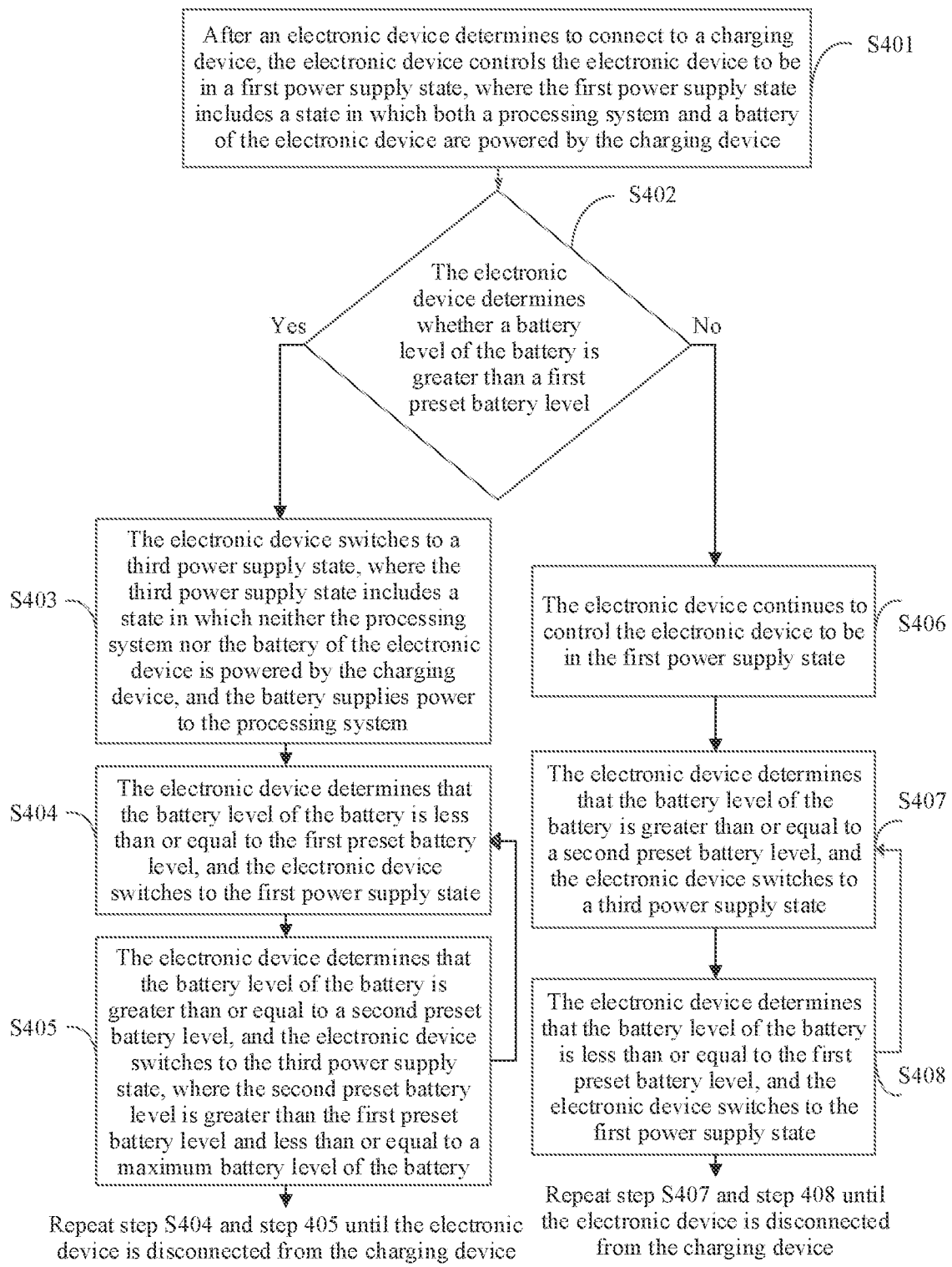
FIG. 4 is a flowchart 1 of a charging method according to an embodiment of this application.

FIG. 4 is a flowchart 1 of a charging method according to an embodiment of this application. Refer to FIG. 4. The method in this embodiment includes the following steps.

Step S401: After an electronic device determines to connect to a charging device, the electronic device controls the electronic device to be in a first power supply state.

After the electronic device is connected to the charging device, the electronic device is first in the first power supply state. With reference to FIG. 3, in the first power supply state, a first switch C1, a second switch C2, and a third switch C3 are all in a turned-on state, the charging device outputs electric energy to a power management system of the electronic device, and the power management system transmits the electric energy to a battery and a load, that is, both the load and the battery of the electronic device are in a state in which the charging device supplies power.

After the electronic device determines to connect to the charging device, the electronic device may further push first indication information, where the first indication information indicates that the battery is in the state in which the charging device supplies power. In a manner, that the electronic device pushes first indication information includes: The electronic device displays the first indication information by using a display part, where the display part may be a display or a light emitting body. In another manner, that the electronic device pushes first indication information includes: The electronic device sends the first indication information to the charging device, so that the charging device displays the first indication information by using a display part. This manner is applicable to a case in which the electronic device has no display part. Meanings of subsequent push are the same as those in this embodiment, and details are not described again.

Step S402: The electronic device determines whether a battery level of the battery is greater than a first preset battery level.

After the electronic device determines to connect to the charging device, the electronic device starts to determine whether the battery level of the battery is greater than the first preset battery level. Optionally, the first preset battery level may be greater than or equal to a battery level 50% and less than a battery level 65%.

Starting from this step, the electronic device enters a charging protection state.

Figure 5A:
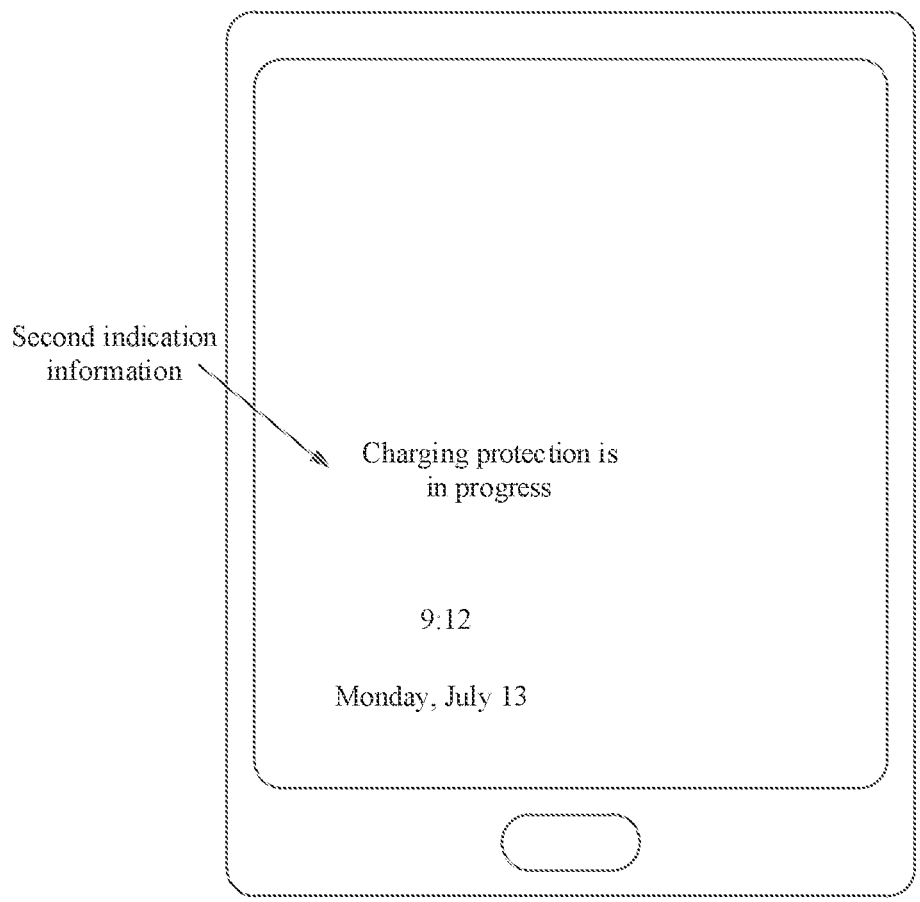
FIG. 5A is a schematic diagram 1 of a user interface of an electronic device in a screen-locked state according to an embodiment of this application.
Figure 5B:
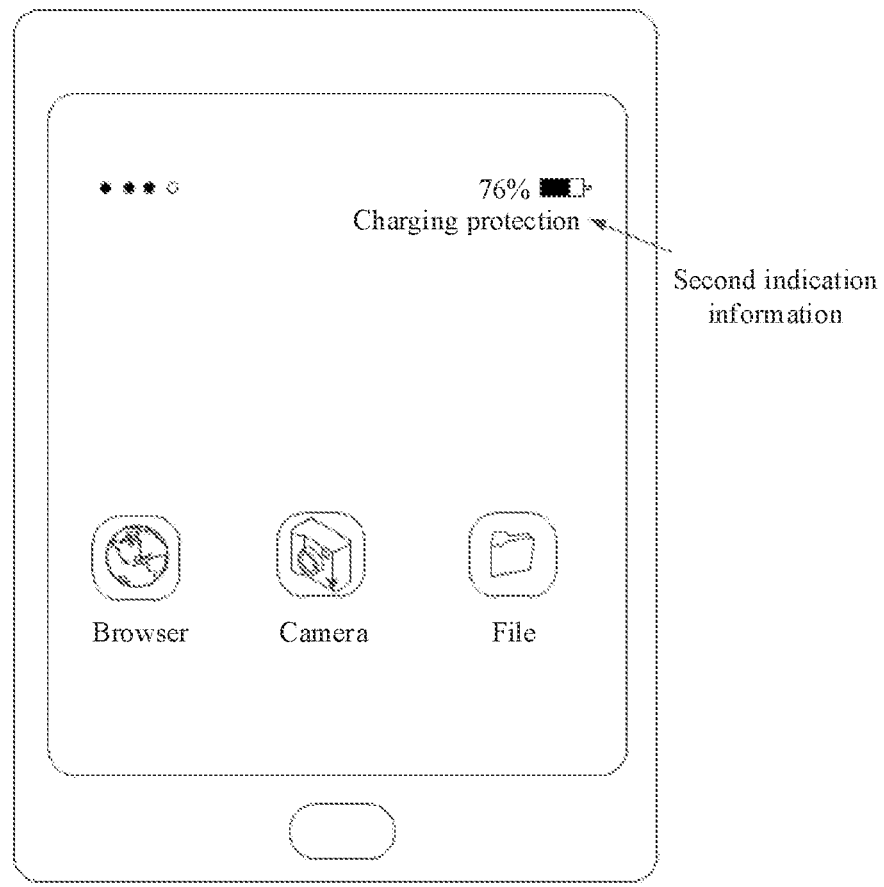
FIG. 5B is a schematic diagram 1 of a user interface of an electronic device in a use state according to an embodiment of this application.

Optionally, after the electronic device determines to connect to the charging device, the electronic device may further push second indication information, where the second indication information indicates that the electronic device is in the charging protection state, so that the user learns that the electronic device is in the charging protection state. For example, when battery level indication information indicates that the battery does not reach the maximum battery level, the user may learn, by using the second indication information, that a reason that the battery does not reach the maximum battery level is that the battery is in the charging protection state instead of that the electronic device or the charging device is faulty. In this case, reliability of the electronic device is improved. A diagram of a user interface corresponding to the second indication information displayed by the electronic device by using the display may be shown in FIG. 5A or FIG. 5B. FIG. 5A is a schematic diagram 1 of a user interface of an electronic device in a screen-locked state. FIG. 5B is a schematic diagram 2 of a user interface of an electronic device in a use state.

If the battery level of the battery is greater than the first preset battery level, step S403 to step S405 are performed; or if the battery level of the battery is less than or equal to the first preset battery level, step S406 to step S408 are performed.

Step S403: If the battery level of the battery is greater than the first preset battery level, the electronic device switches to a third power supply state.

If the battery level of the battery is greater than the first preset battery level, it indicates that the battery level of the battery is not low. To avoid that the battery is at a high battery level, the electronic device switches from the first power supply state to the third power supply state. It may be understood that, in the third power supply state, the battery level of the battery gradually decreases, thereby avoiding that the battery is always in the high battery level state.

With reference to FIG. 3, in the third power supply state, the processor of the electronic device controls the first switch C1 to be in a turned-off state, and the charging device cannot output the electric energy to the power management system of the electronic device. In this case, the power management system cannot transmit the electric energy to the load and the battery either. Because there is a normally open channel between the load and the battery, the battery can supply power to the load.

Optionally, after the electronic device switches from the first power supply state to the third power supply state, if the electronic device has a display part, the electronic device no longer displays the first indication information; or if the electronic device has no display part and the charging device has a display part, the charging device no longer displays the first indication information.

Step S404: When determining that the battery level of the battery is less than or equal to the first preset battery level, the electronic device switches to the first power supply state.

After the electronic device switches to the third power supply state in step S403, the battery level of the battery gradually decreases. When the electronic device detects that the battery level of the battery is less than or equal to the first preset battery level, the electronic device switches to the first power supply state.

Optionally, after the electronic device switches from the third power supply state to the first power supply state, the method may further include: The electronic device pushes the first indication information.

Step S405: When determining that the battery level of the battery is greater than or equal to a second preset battery level, the electronic device switches to the third power supply state, where the second preset battery level is greater than the first preset battery level and is less than or equal to a maximum battery level of the battery.

After the electronic device switches to the first power supply state in step S404, the battery level of the battery gradually increases. When the electronic device detects that the battery level of the battery is greater than or equal to the second preset battery level, the electronic device switches to the third power supply state again. Optionally, the second preset battery level is greater than or equal to a battery level 70% and less than or equal to a battery level 85%.

Optionally, after the electronic device switches from the first power supply state to the third power supply state, if the electronic device has a display part, the electronic device no longer displays the first indication information; or if the electronic device has no display part and the charging device has a display part, the charging device no longer displays the first indication information.

Figure 6B:
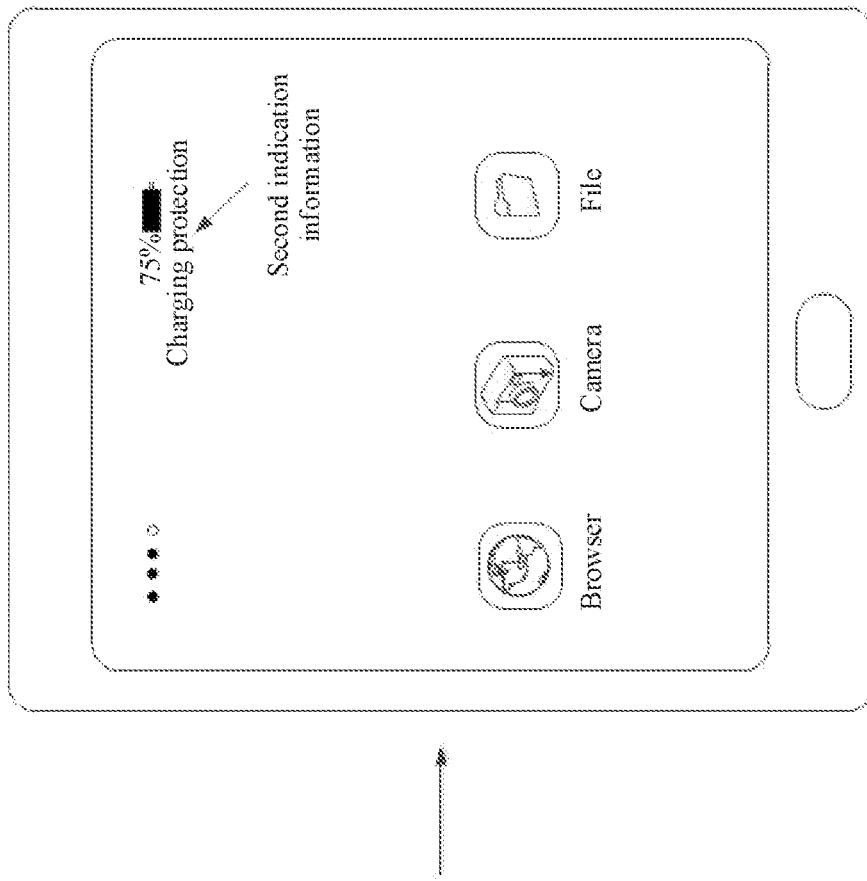
FIG. 6B is a schematic diagram 3 of a user interface of an electronic device in a use state according to an embodiment of this application.
Figure 6A:
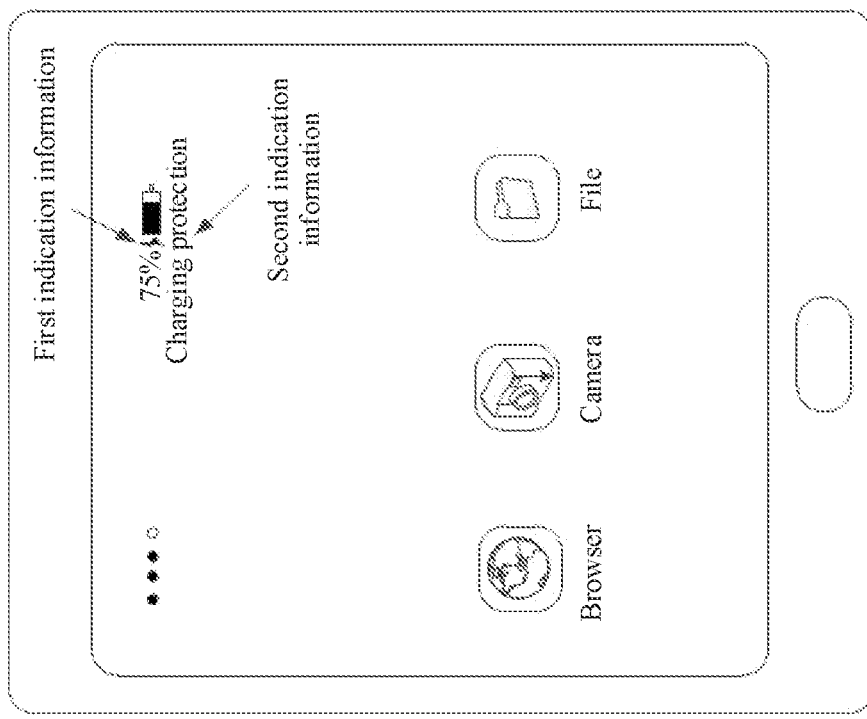
FIG. 6A is a schematic diagram 2 of a user interface of an electronic device in a use state according to an embodiment of this application.

A schematic diagram of an interface change corresponding to switching of the electronic device from the first power supply state to the third power supply state may be shown in FIG. 6A and FIG. 6B, or shown in FIG. 7A and FIG. 7B. Refer to FIG. 6A and FIG. 6B or FIG. 7A and FIG. 7B. After the electronic device switches from the first power supply state to the third power supply state, the electronic device no longer displays the first indication information.

Subsequently, step S404 and step S405 are repeated until the electronic device determines to disconnect from the charging device. For the electronic device in the charging protection state, after the battery level of the battery is lower than or equal to the second preset battery level for the first time, the battery level of the battery changes in a first range, where the first range is greater than or equal to a first battery level and less than or equal to a second battery level. The first battery level is less than or equal to the first preset battery level, a difference between the first preset battery level and the first battery level is less than a first threshold, the second battery level is greater than or equal to the second preset battery level, and an absolute value of a difference between the second battery level and the second preset battery level is less than a second threshold. Optionally, the first threshold is greater than or equal to 1% and less than or equal to 3%, and the second threshold is greater than or equal to 1% and less than or equal to 3%.

Figure 8A:
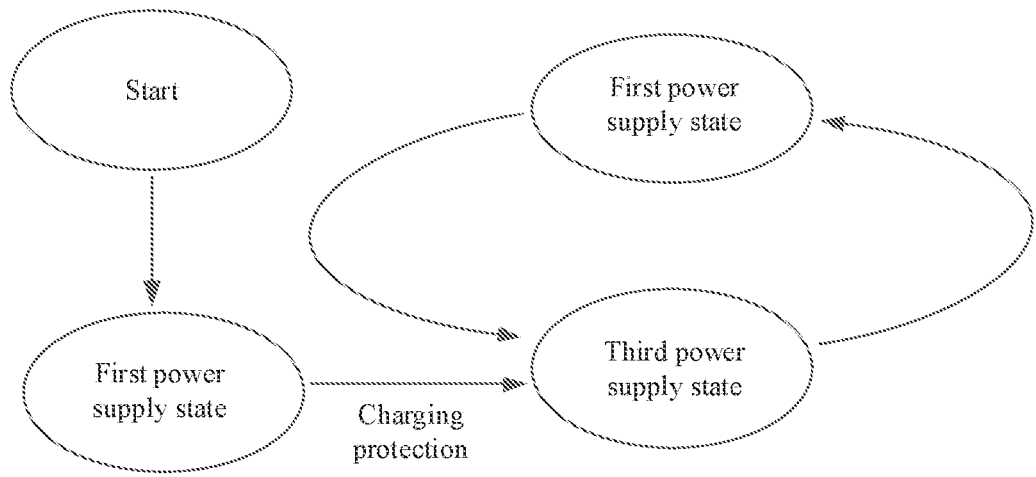
FIG. 8A is a schematic diagram 1 of a change of a power supply state of an electronic device according to an embodiment of this application.

A schematic diagram of a change of the power supply state of the electronic device corresponding to step 401 and step S405 may be shown in FIG. 8A. Refer to FIG. 8A. After the electronic device is connected to the charging device, the electronic device is in the first power supply state, and after entering the charging protection state, the electronic device switches between the third power supply state and the first power supply state.

Step S406: If the battery level of the battery is less than or equal to the first preset battery level, the electronic device continues to control the electronic device to be in the first power supply state.

It may be understood that the electronic device may be connected to the charging device only when power of the electronic device is low. Therefore, after the electronic device is connected to the charging device, there is a case in which the battery level of the battery is less than or equal to the first preset battery level.

Step S407: When determining that the battery level of the battery is greater than or equal to the second preset battery level, the electronic device switches to the third power supply state.

When the electronic device is in the first power supply state in step S406, if there is no power-intensive application, the battery level of the battery gradually increases. When the electronic device detects that the battery level of the battery is greater than or equal to the second preset battery level, the electronic device switches to the third power supply state.

Optionally, after the electronic device switches from the first power supply state to the third power supply state, if the electronic device has a display part, the electronic device no longer displays the first indication information; or if the electronic device has no display part and the charging device has a display part, the charging device no longer displays the first indication information.

Step S408: When determining that the battery level of the battery is less than or equal to the first preset battery level, the electronic device switches to the first power supply state.

Optionally, after the electronic device switches to the first power supply state, the method may further include: The electronic device pushes the first indication information.

Subsequently, step S407 and step S408 are repeated until the electronic device determines to disconnect from the charging device. For the electronic device in the charging protection state, after the battery level of the battery is lower than or equal to the second preset battery level for the first time, the battery level of the battery changes within the first range.

Figure 8B:
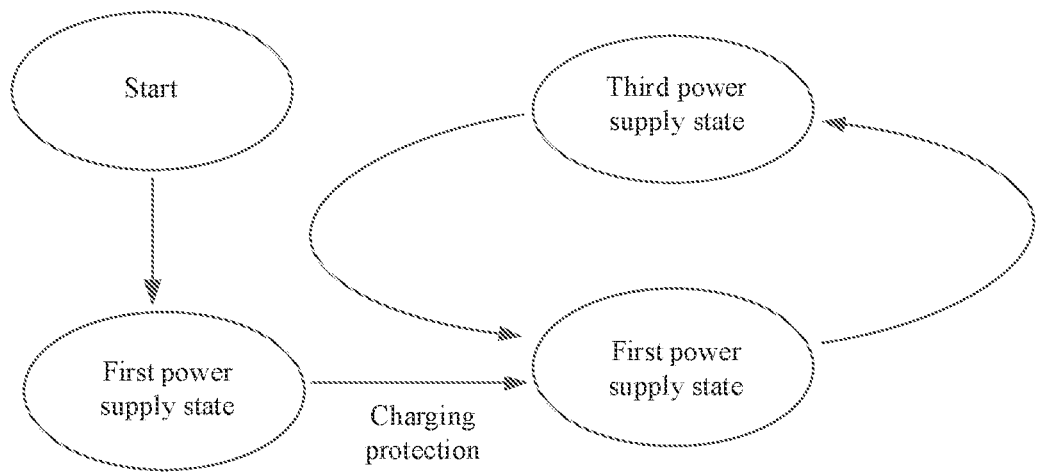
FIG. 8B is a schematic diagram 2 of a change of a power supply state of an electronic device according to an embodiment of this application.

A schematic diagram of a change of the power supply state of the electronic device corresponding to steps S401, S402, and S406 to S408 may be shown in FIG. 8B. Refer to FIG. 8B. After the electronic device is connected to the charging device, the electronic device is in the first power supply state, and after entering the charging protection state, the electronic device switches between the first power supply state and the third power supply state.

Figure 9:
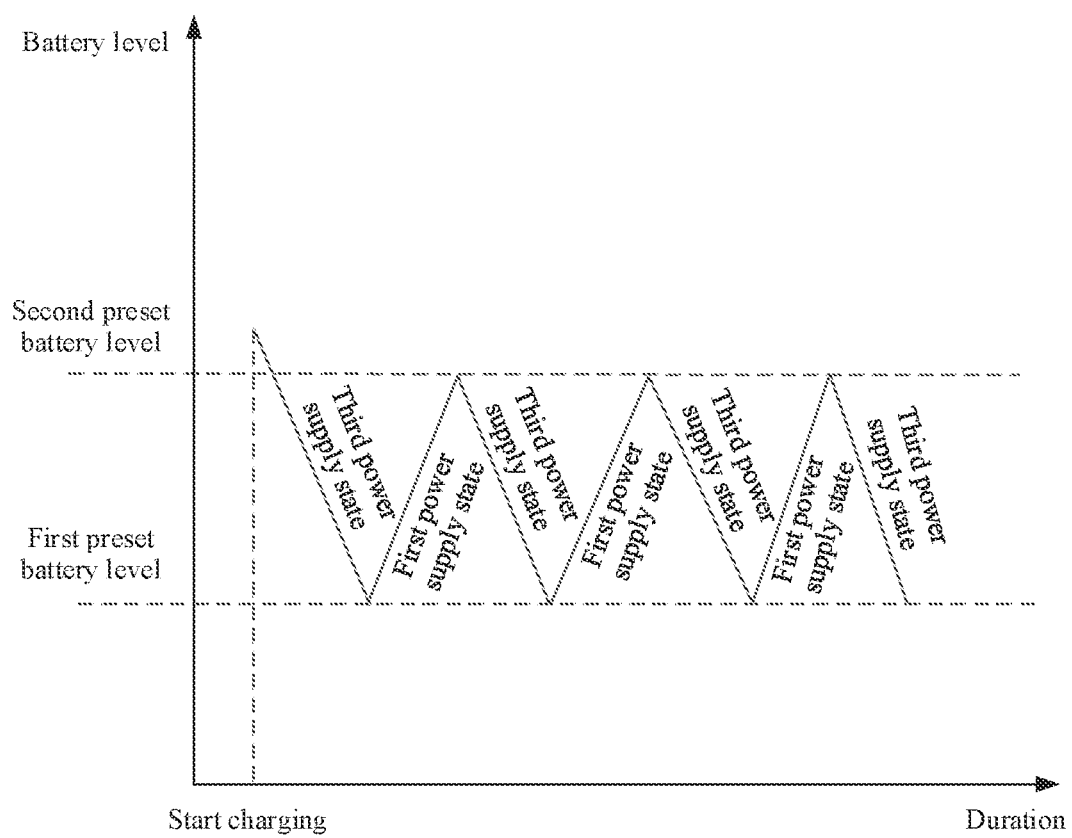
FIG. 9 is a schematic diagram 1 of a change of a battery level of a battery according to an embodiment of this application.

A schematic diagram of a change of a battery level of a battery in a charging method according to an embodiment of this application is shown in FIG. 9. Refer to FIG. 9. After an electronic device is connected to a charging device, when determining that the battery level of the battery is greater than a first preset battery level, the electronic device is in a third power supply state, and the battery level of the battery decreases. When the battery level of the battery decreases to the first preset battery level, the electronic device switches to a first power supply state, and the battery level of the battery increases. When the battery level of the battery increases to a second preset battery level, the electronic device switches to the third power supply state, and the battery level of the battery decreases. When the battery level of the battery decreases to the first preset battery level, the electronic device switches to the first power supply state, and the battery level of the battery increases. When the battery level of the battery increases to the second preset battery level, the electronic device switches to the third power supply state, and the battery level of the battery decreases. This process repeats until the electronic device determines to disconnect from the charging device.

In this embodiment, in a process in which the charging device charges the electronic device, when the battery level of the battery is less than or equal to the first preset battery level, the electronic device controls the electronic device to be in the first power supply state, so that the battery level of the battery increases. When the battery level of the battery increases to be greater than or equal to the second preset battery level, the electronic device switches to the third power supply state, so that the battery level of the battery decreases. The second preset battery level is less than or equal to the maximum battery level of the battery. This can avoid that the battery of the electronic device is in a high battery level state for a long time, thereby prolonging a service life of the battery.

Figure 10A:
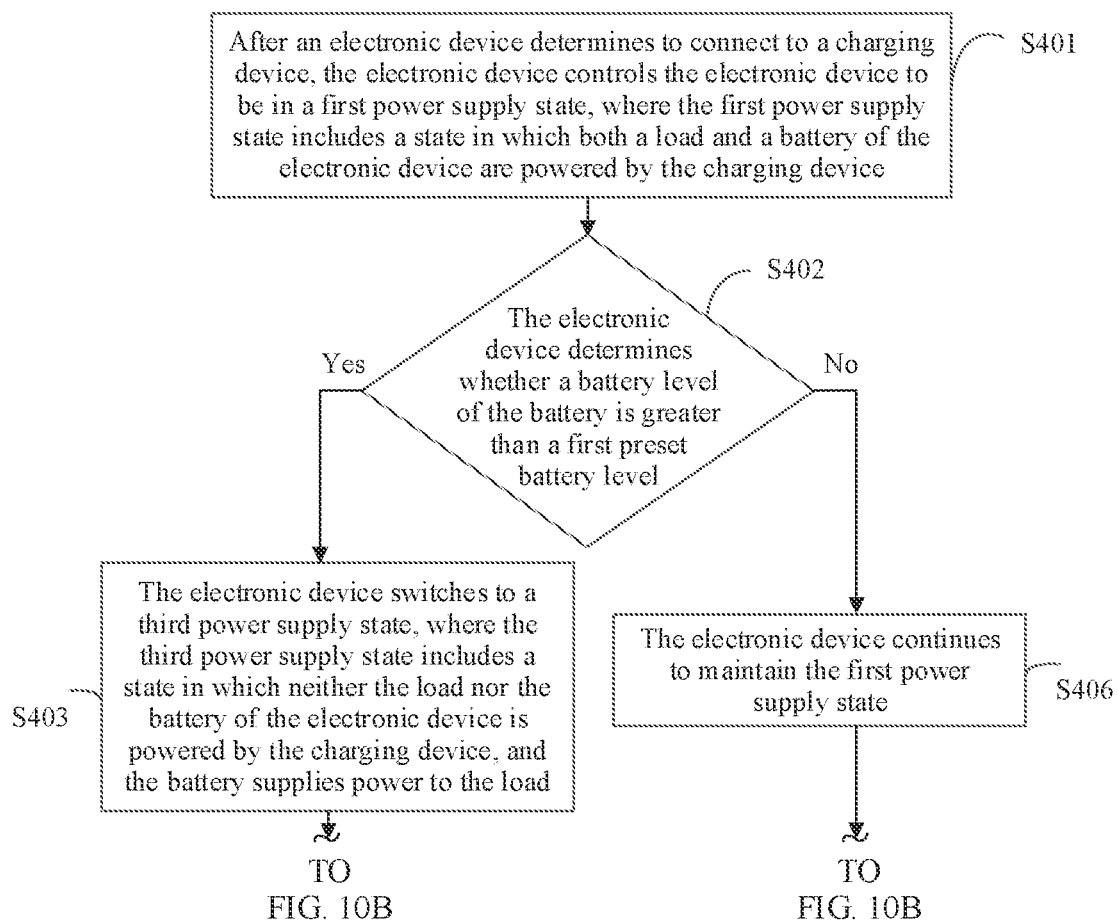
FIG. 10A and FIG. 10B are a flowchart 2 of a charging method according to an embodiment of this application.
Figure 10B:
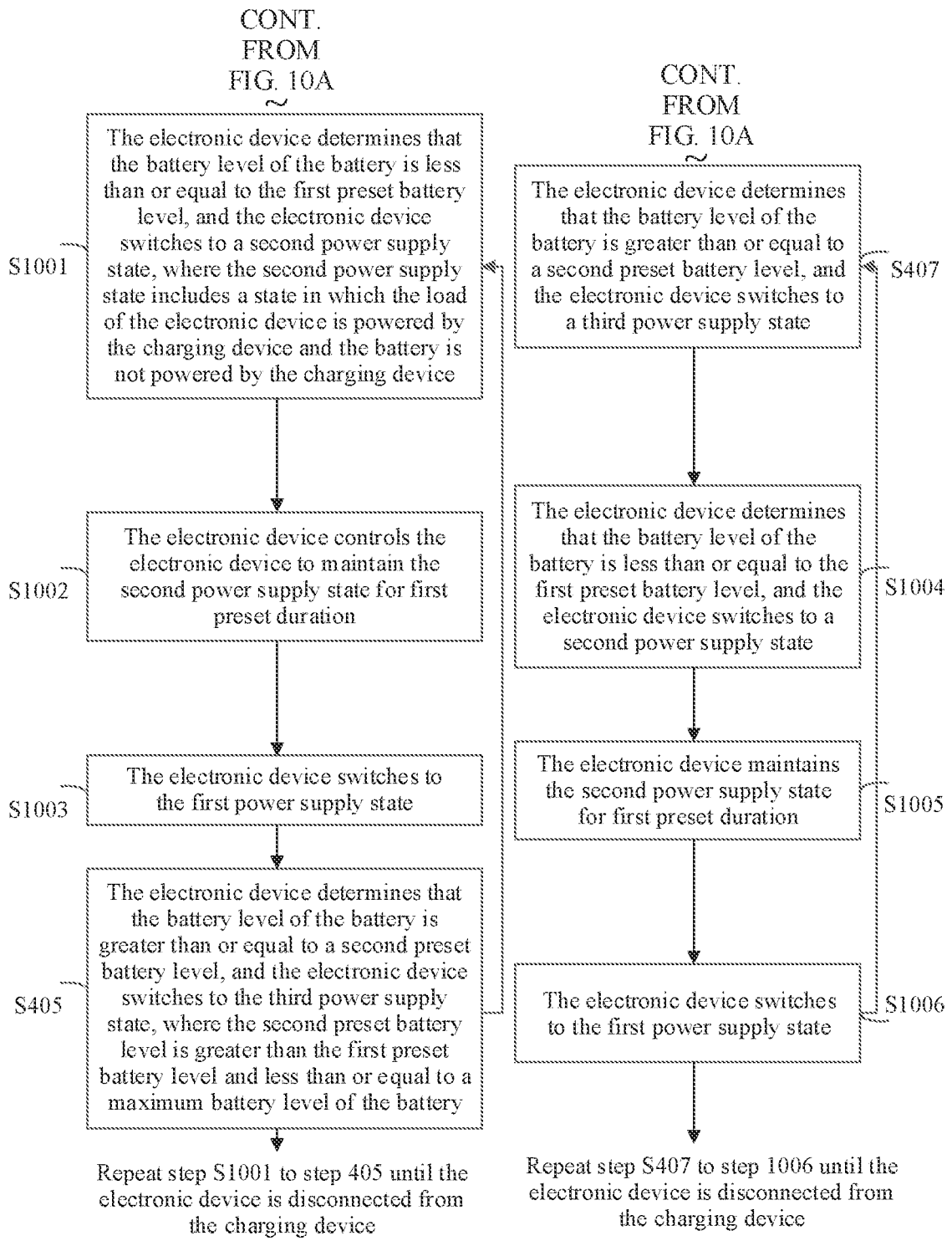
Figure 11A:
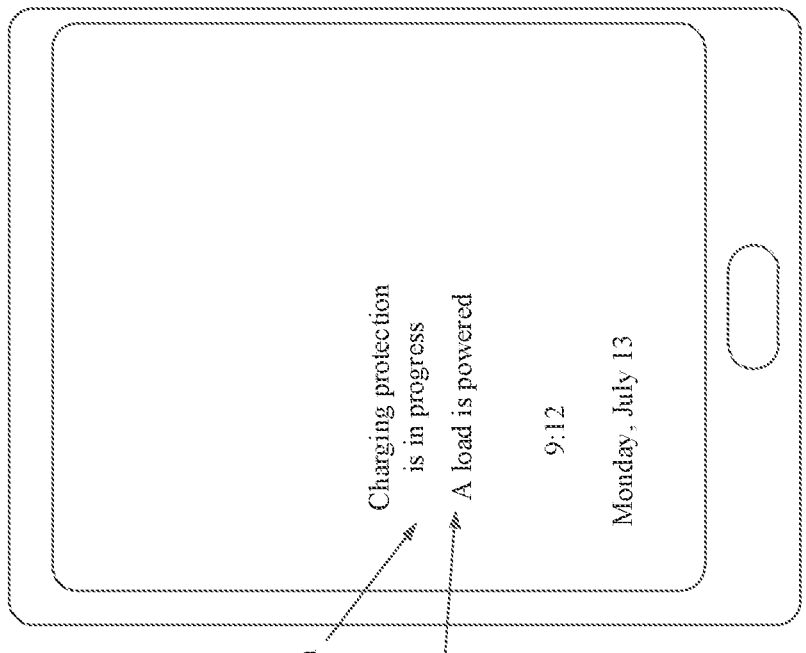
FIG. 11A is a schematic diagram 4 of a user interface of an electronic device in a screen-locked state according to an embodiment of this application.
Figure 11B:
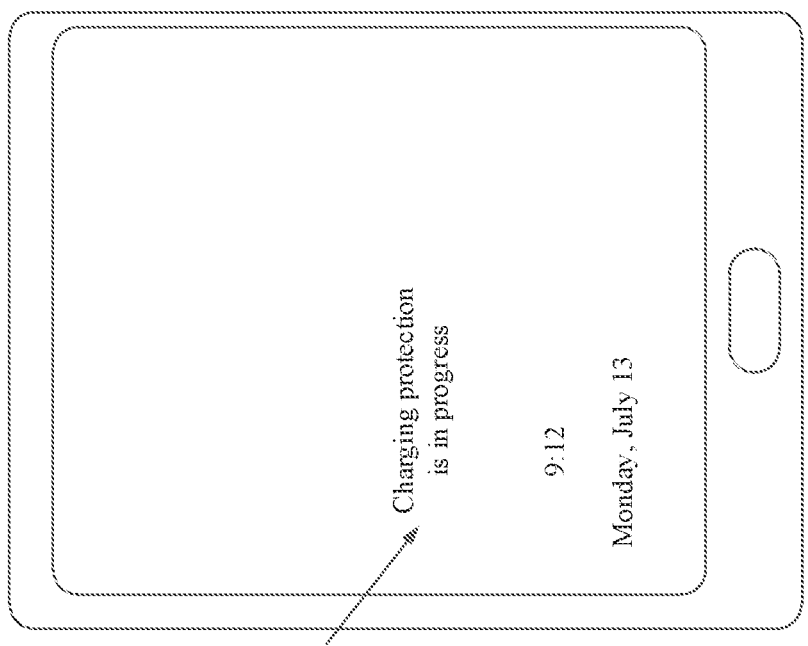
FIG. 11B is a schematic diagram 5 of a user interface of an electronic device in a screen-locked state according to an embodiment of this application.
Figure 12B:
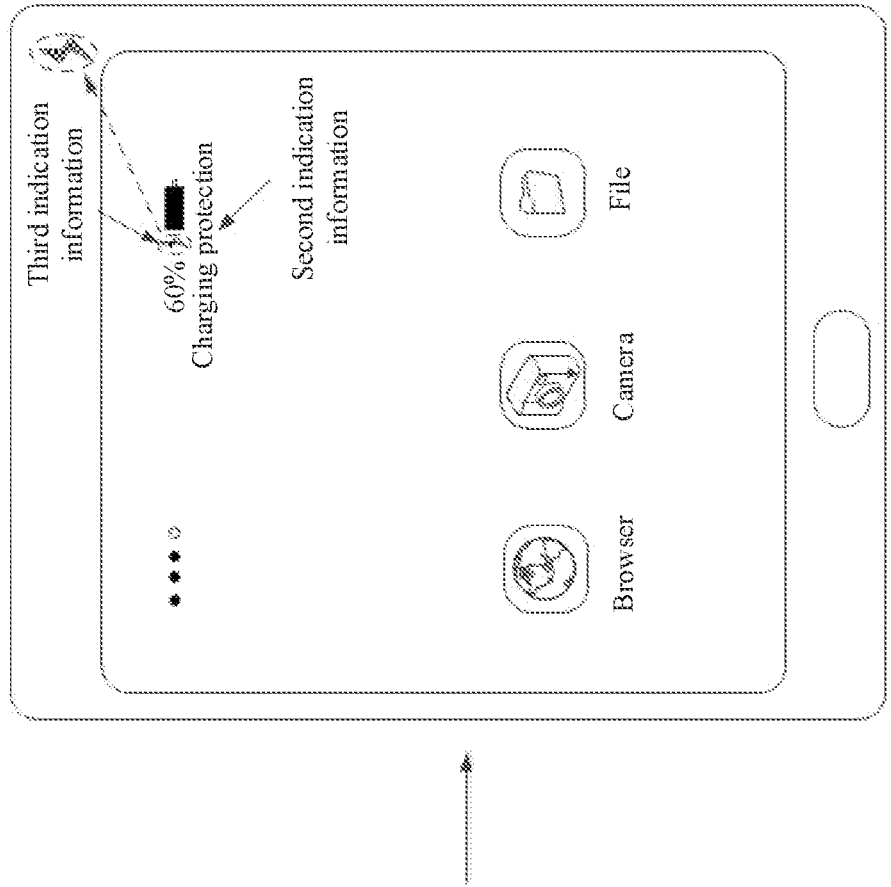
FIG. 12B is a schematic diagram 5 of a user interface of an electronic device in a use state according to an embodiment of this application.
Figure 12A:
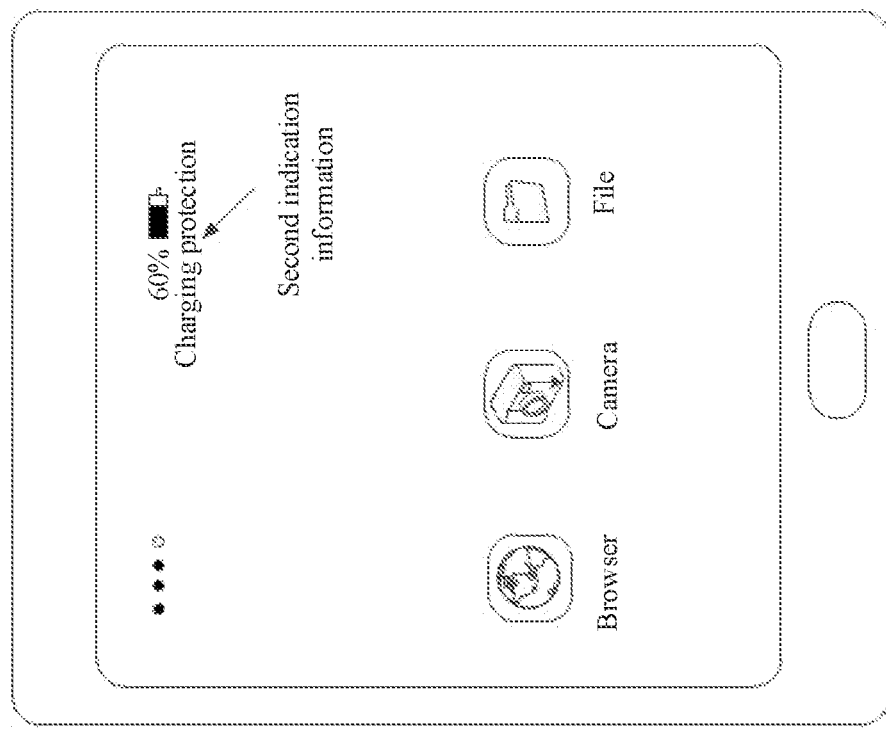
FIG. 12A is a schematic diagram 4 of a user interface of an electronic device in a use state according to an embodiment of this application.
Figure 13A:
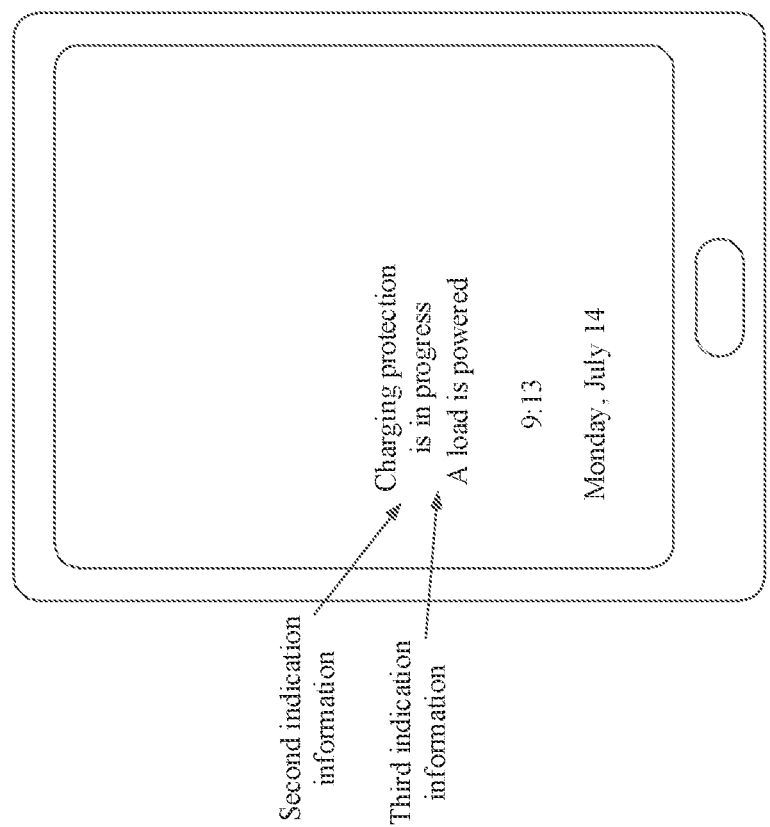
FIG. 13A is a schematic diagram 6 of a user interface of an electronic device in a screen-locked state according to an embodiment of this application.
Figure 13B:
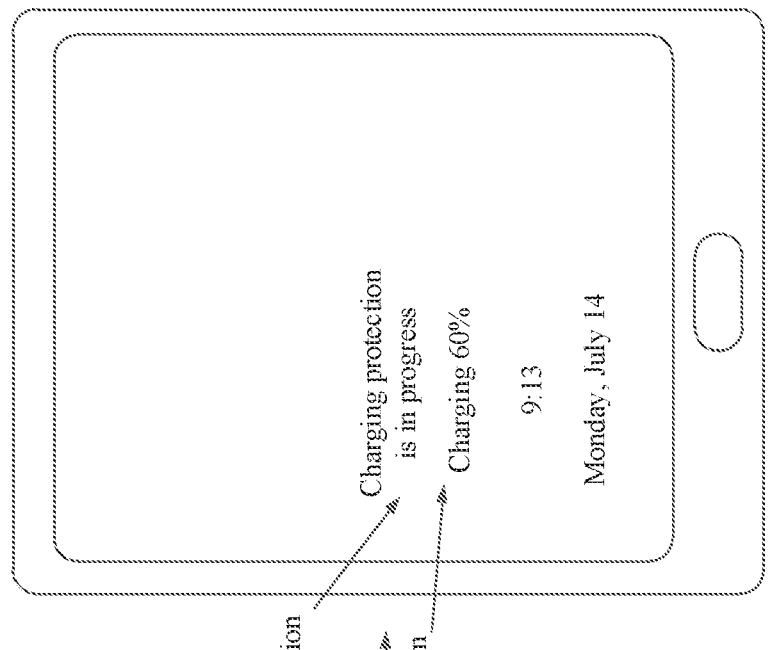
FIG. 13B is a schematic diagram 7 of a user interface of an electronic device in a screen-locked state according to an embodiment of this application.

FIG. 10A and FIG. 10B are a flowchart 2 of a charging method according to an embodiment of this application. The embodiment shown in FIG. 10A and FIG. 10B is further improved based on the embodiment shown in FIG. 4. The following describes another charging method provided in this application with reference to FIG. 10A and FIG. 10B.

Refer to FIG. 10B. In a solution, a difference between this embodiment and the embodiment shown in FIG. 4 lies in that after step S403 in which the electronic device switches to the third power supply state and before step S405 in which the electronic device switches to the third power supply state, the charging method in this embodiment includes step S1001 to step S1003.

Step S1001: The electronic device determines that the battery level of the battery is less than or equal to the first preset battery level, and the electronic device switches to a second power supply state, where the second power supply state includes the state in which the load of the electronic device is powered by the charging device and the battery is not powered by the charging device.

After the electronic device switches to the third power supply state in step S403, the battery level of the battery gradually decreases. After detecting that the battery level of the battery is less than or equal to the first preset battery level, the electronic device switches to the second power supply state. In the second power supply state, because the battery is in a state in which the charging device does not supply power, the battery level of the battery does not increase.

Optionally, after the electronic device switches from the third power supply state to the second power supply state, the method may further include: The electronic device pushes third indication information, where the third indication information indicates that the electronic device is in the second power supply state. For example, a schematic diagram of an interface change corresponding to switching of the electronic device from the third power supply state to the second power supply state may be shown in FIG. 11A and FIG. 11B, or shown in FIG. 12A and FIG. 12B. Refer to FIG. 11A and FIG. 11B or FIG. 12A and FIG. 12B. After the electronic device switches from the third power supply state to the second power supply state, the electronic device displays the third indication information.

Step S1002: The electronic device controls the electronic device to maintain the second power supply state for first preset duration.

It may be understood that if the electronic device runs a power-intensive application when being maintained in the second power supply state for the first preset duration, there is a possibility that the battery level of the battery further decreases. If no power-intensive application runs when the second power supply state is maintained for the first preset duration, the battery level of the battery may remain unchanged. Optionally, the first preset duration may be greater than or equal to 0.5 h and less than or equal to 2 h.

Step S1003: The electronic device switches to the first power supply state.

After the electronic device controls the electronic device to maintain the second power supply state for the first preset duration, the electronic device controls the electronic device to switch from the second power supply state to the first power supply state.

If the electronic device pushes the third indication information after the electronic device switches from the third power supply state to the second power supply state, after the electronic device switches from the second power supply state to the first power supply state, when the electronic device has a display part, the electronic device displays the first indication information and no longer displays the third indication information, specifically as shown in FIG. 13A and FIG. 13B or FIG. 14A and FIG. 14 B. If the electronic device has no display part and the charging device has a display part, the method may further include: The electronic device sends the first indication information to the charging device, so that the charging device displays the first indication information. In this case, the charging device no longer displays the third indication information.

Subsequently, steps S1001 to S405 are repeated until the electronic device determines to disconnect from the charging device. For the electronic device in the charging protection state, after the battery level of the battery is lower than or equal to the second preset battery level for the first time, the battery level of the battery changes within the first range.

Figure 15A:
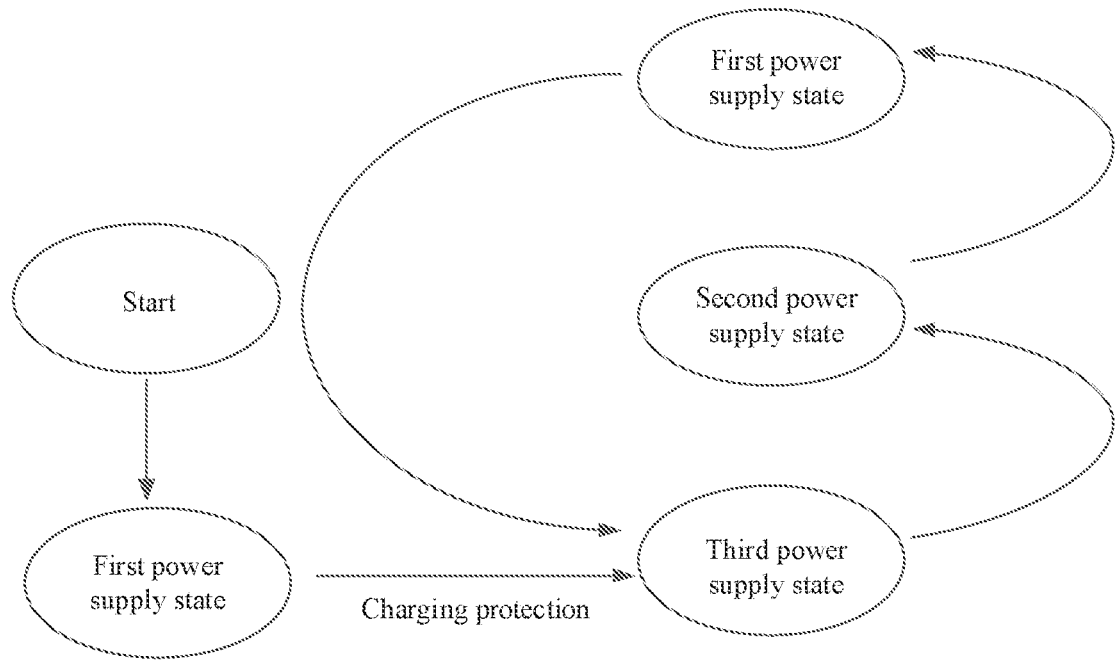
FIG. 15A is a schematic diagram 3 of a change of a power supply state of an electronic device according to an embodiment of this application.

A schematic diagram of a change of the power supply state of the electronic device corresponding to this solution may be as shown in FIG. 15A. Refer to FIG. 15A. After the electronic device is connected to the charging device, the electronic device is in the first power supply state. After entering the charging protection state, the electronic device, in one cycle, has power supply states that are sequentially the third power supply state, the second power supply state, and the first power supply state.

Still refer to FIG. 10B. In another solution, a difference between this embodiment and the embodiment shown in FIG. 4 lies in that after step S407 in which the electronic device switches to the third power supply state, the charging method in this embodiment includes step S1004 to step S1006.

Step S1004: When determining that the battery level of the battery is less than or equal to the first preset battery level, the electronic device switches to the second power supply state.

Specific implementation of this step is the same as that of step S1001, and details are not described herein again.

Step S1005: The electronic device maintains the second power supply state for the first preset duration.

Specific implementation of this step is the same as that of step S1002, and details are not described herein again.

Step S1006: The electronic device switches to the first power supply state.

Specific implementation of this step is the same as that of step S1003, and details are not described herein again.

Subsequently, steps S407 to S1006 are repeated until the electronic device determines to disconnect from the charging device. For the electronic device in the charging protection state, after the battery level of the battery is lower than or equal to the second preset battery level for the first time, the battery level of the battery changes within the first range.

Figure 15B:
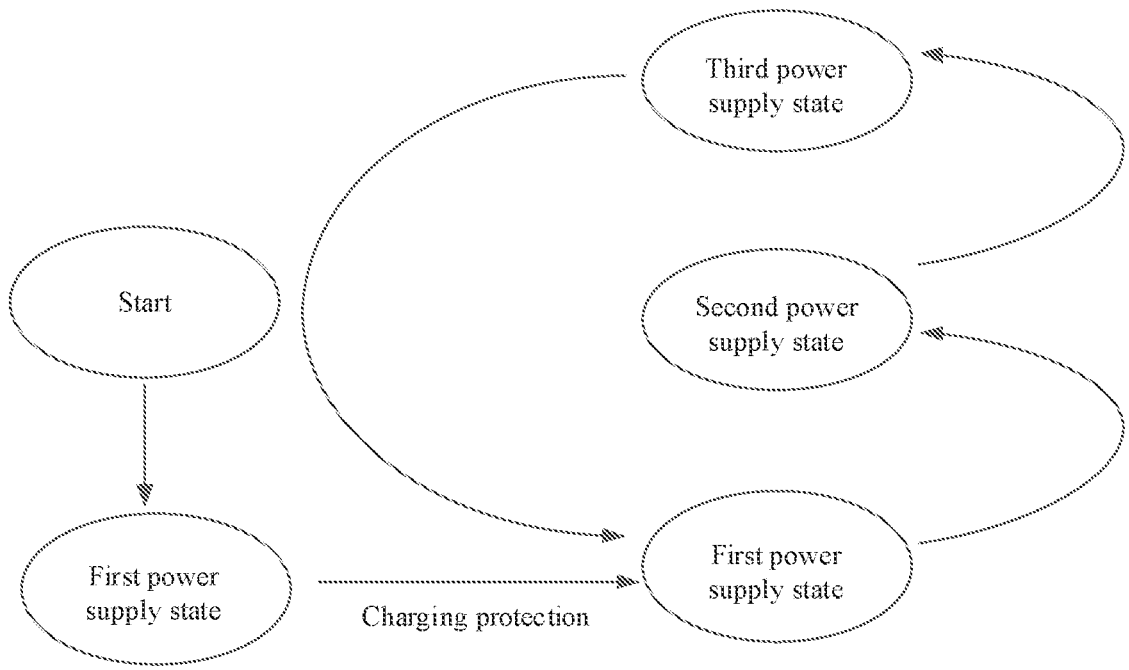
FIG. 15B is a schematic diagram 4 of a change of a power supply state of an electronic device according to an embodiment of this application.

A schematic diagram of a change of the power supply state of the electronic device corresponding to this solution may be as shown in FIG. 15B. Refer to FIG. 15B. After the electronic device is connected to the charging device, the electronic device is in the first power supply state. After entering the charging protection state, the electronic device, in one cycle, has power supply states that are sequentially the first power supply state, the second power supply state, and third power supply state.

Figure 16:
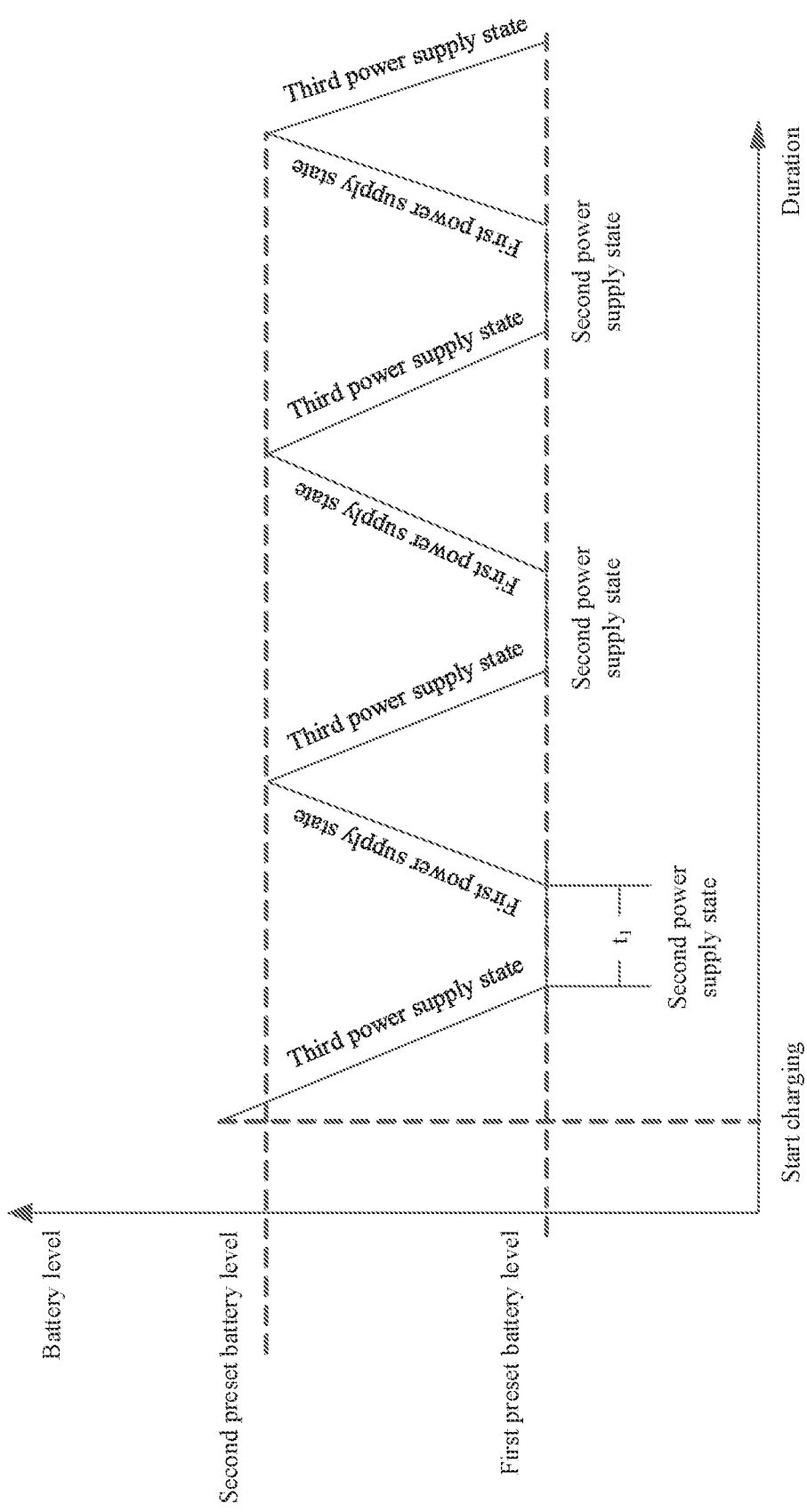
FIG. 16 is a schematic diagram 2 of a change of a battery level of a battery according to an embodiment of this application.

FIG. 16 is a schematic diagram of a change of a battery level of a battery in a charging method according to an embodiment of this application. Refer to FIG. 16. After an electronic device is connected to a charging device, when determining that the battery level of the battery is greater than a first preset battery level, the electronic device is in a third power supply state, and the battery level of the battery decreases. When the battery level of the battery decreases to the first preset battery level, the electronic device switches to a second power supply state, maintains the second power supply state for first preset duration t1, and then switches to a first power supply state, and the battery level of the battery increases. When the battery level of the battery increases to a second preset battery level, the electronic device switches to the third power supply state, and the battery level of the battery decreases. When the battery level of the battery decreases to the first preset battery level, the electronic device switches to the second power supply state, and maintains the second power supply state for the first preset duration. Then, the electronic device switches to the first power supply state, and the battery level of the battery increases. When the battery level of the battery increases to the second preset battery level, the electronic device switches to the third power supply state, and the battery level of the battery decreases. When the battery level of the battery decreases to the first preset battery level, the electronic device switches to the second power supply state, and maintains the second power supply state for the first preset duration. Then, the electronic device switches to the first power supply state, and the battery level of the battery increases. This process repeats until the electronic device determines to disconnect from the charging device.

In this embodiment, in a process in which the charging device charges the electronic device, when determining that the battery level of the battery is less than or equal to the first preset battery level, the electronic device is controlled to be in the first power supply state, so that the battery level of the battery increases. When the battery level of the battery increases to be greater than or equal to the second preset battery level, the electronic device switches to the third power supply state, so that the battery level of the battery decreases. The second preset battery level is less than or equal to a maximum battery level of the battery. This can avoid that the battery of the electronic device is in a high battery level state for a long time, thereby prolonging a service life of the battery.

In addition, in this embodiment, when determining that the battery level of the battery is less than or equal to the first preset battery level, the electronic device does not immediately switch to the first power supply state, but switches to the first power supply state after maintaining the second power supply state in which the battery level of the battery does not increase for a period of time. This avoids that the battery is in the high battery level state for a long time, reduces a charge/discharge cycle frequency of the battery, and further reduces a battery capacity loss rate caused by a charge/discharge cycle.

Figure 17A:
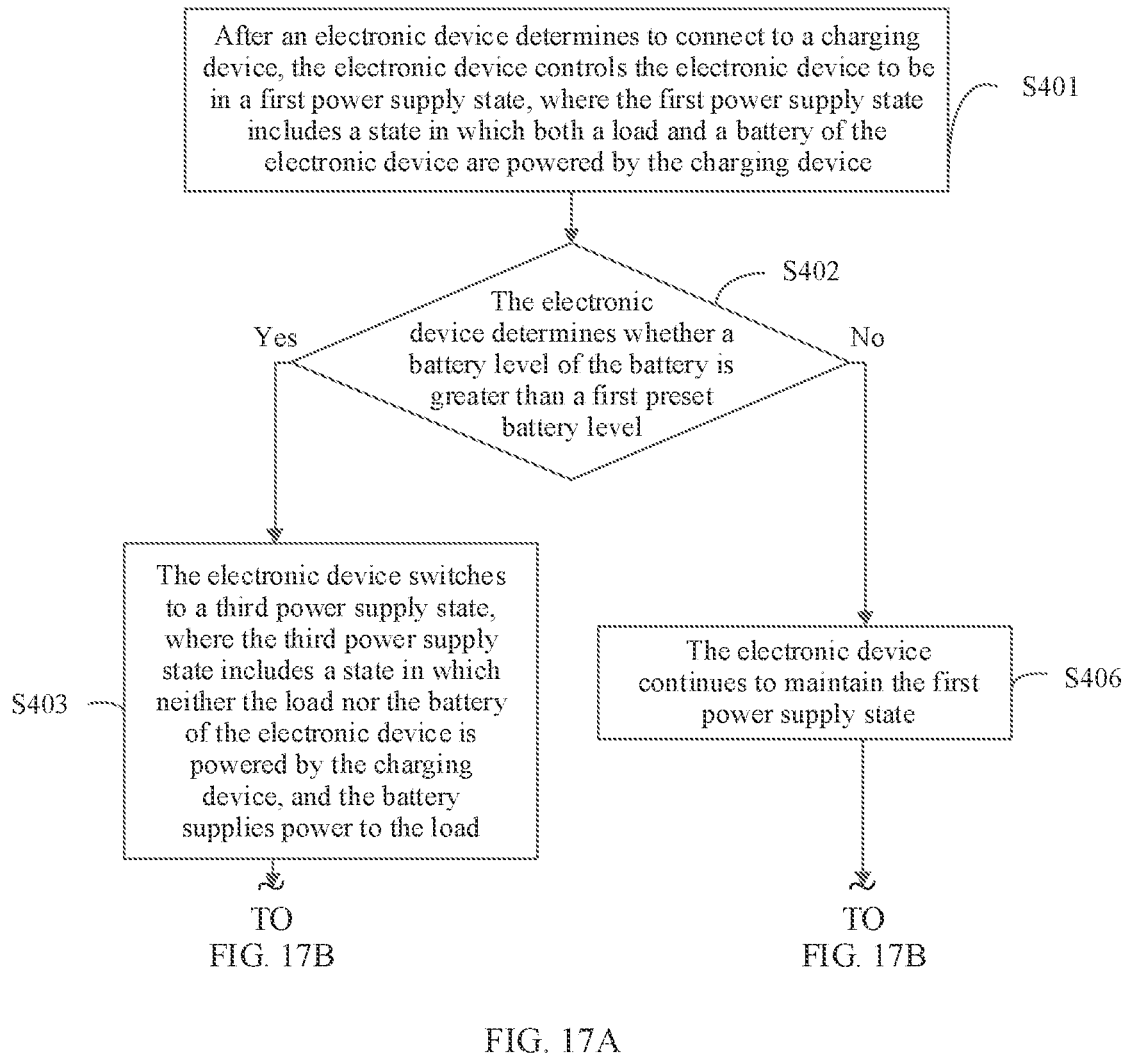
FIG. 17A and FIG. 17B are a flowchart 3 of a charging method according to an embodiment of this application.
Figure 17B:
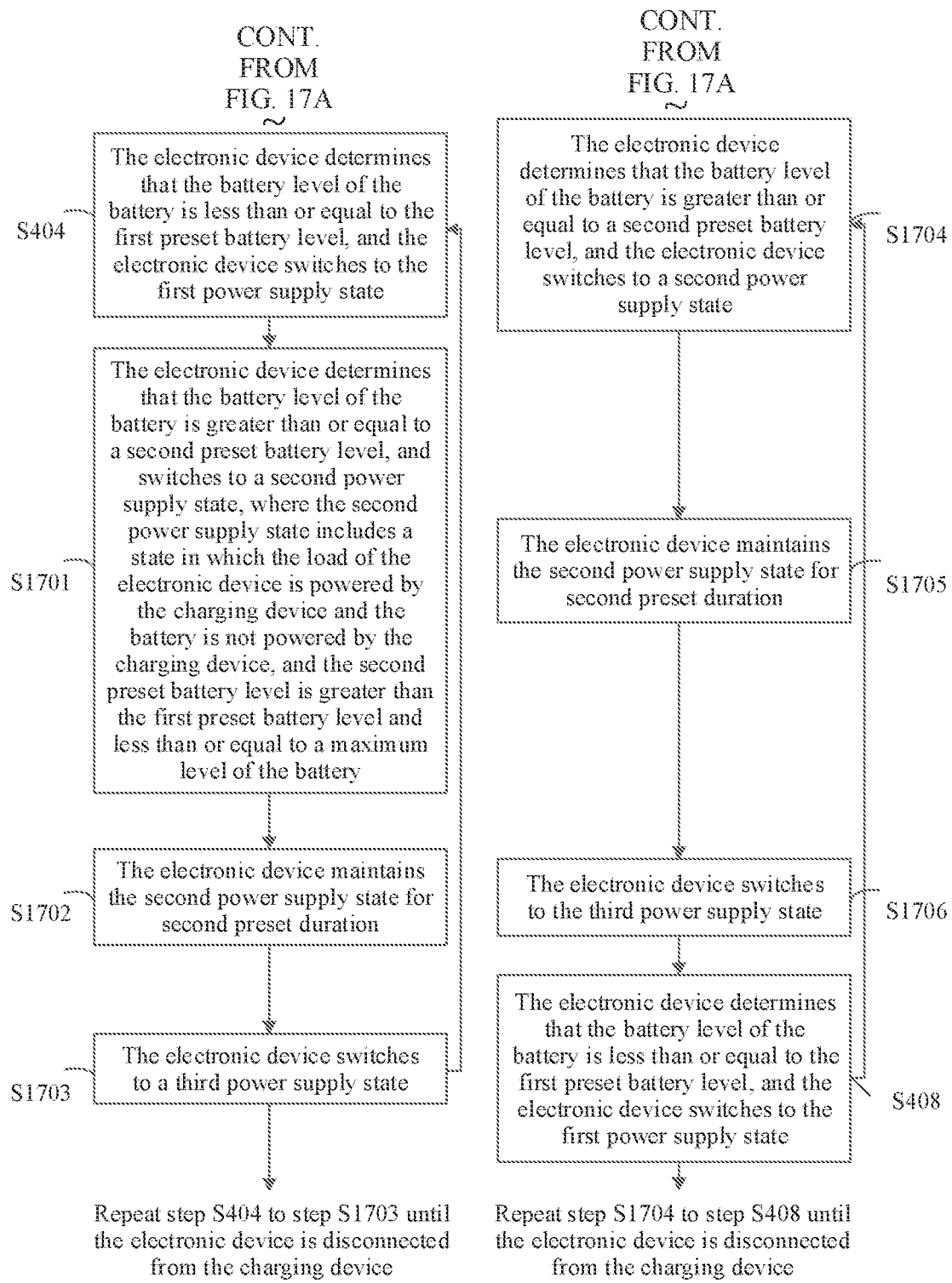
Figure 18B:
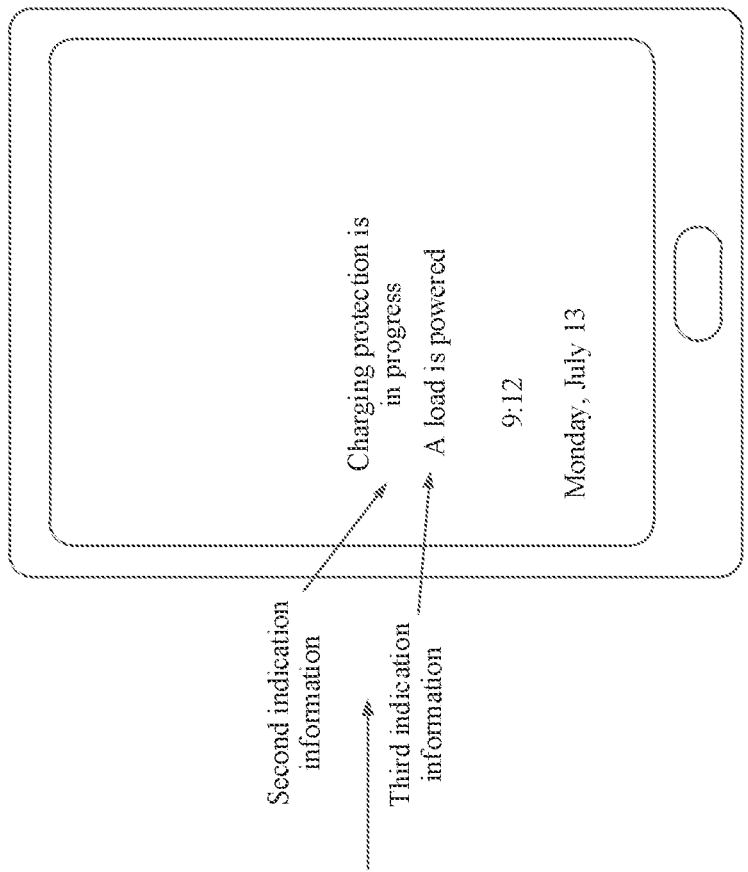
FIG. 18B is a schematic diagram 11 of a user interface of an electronic device in a screen-locked state according to an embodiment of this application.
Figure 18A:
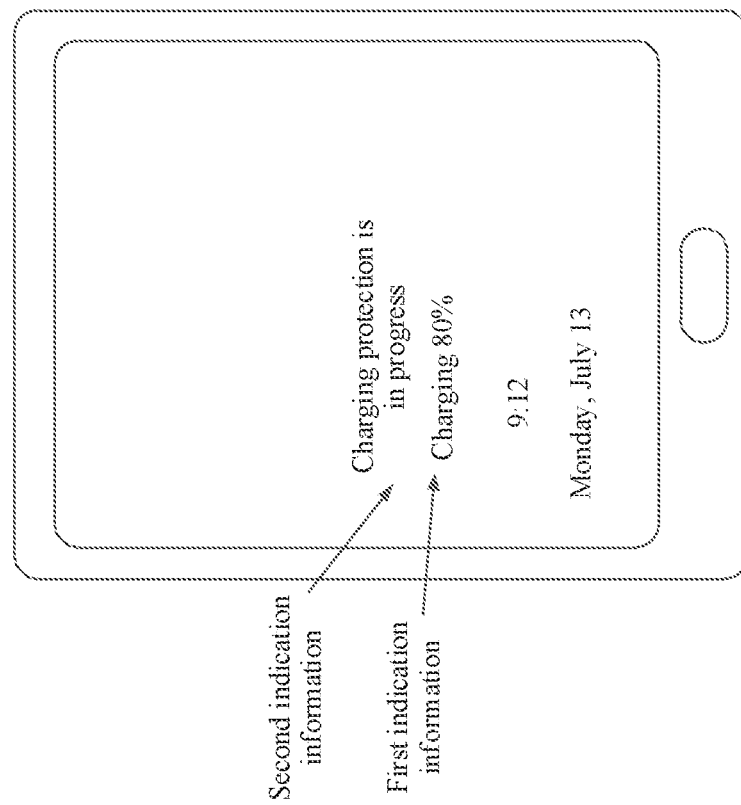
FIG. 18A is a schematic diagram 10 of a user interface of an electronic device in a screen-locked state according to an embodiment of this application.
Figure 19B:
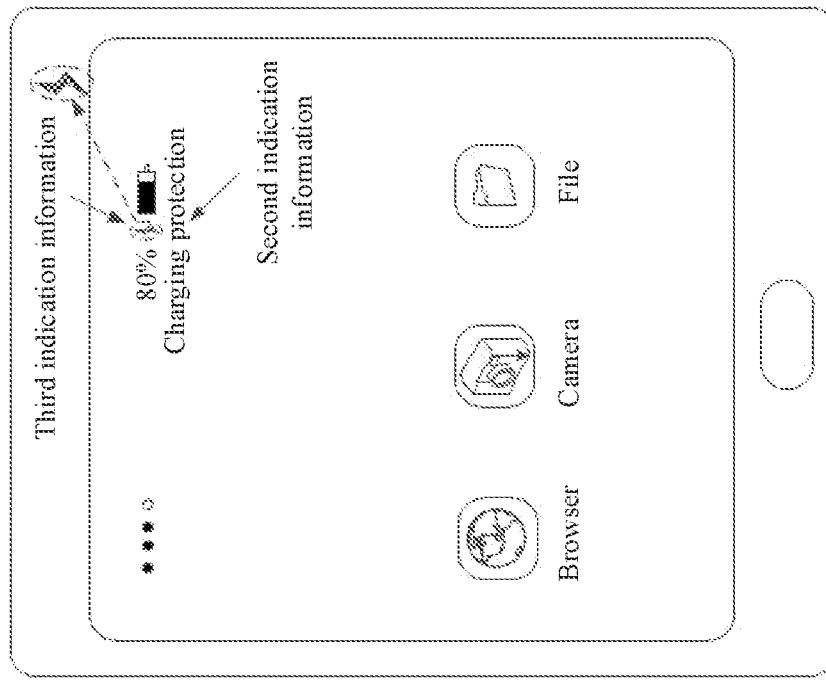
FIG. 19B is a schematic diagram 11 of a user interface of an electronic device in a use state according to an embodiment of this application.
Figure 19A:
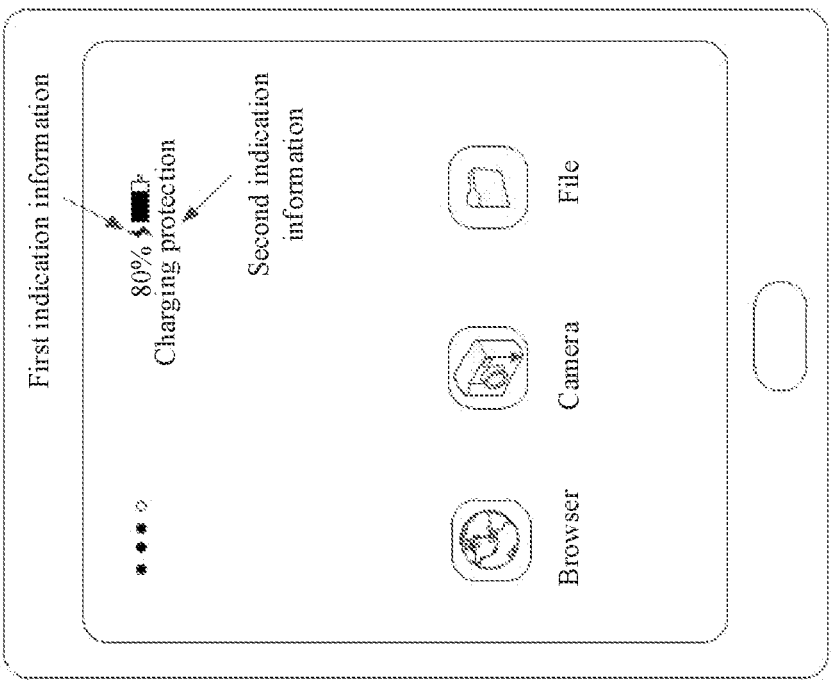
FIG. 19A is a schematic diagram 10 of a user interface of an electronic device in a use state according to an embodiment of this application.

FIG. 17A and FIG. 17B are a flowchart 3 of a charging method according to an embodiment of this application. The embodiment shown in FIG. 17A and FIG. 17B is further improved based on the embodiment shown in FIG. 4. The following describes still another charging method provided in this application with reference to FIG. 17A and FIG. 17B.

Refer to FIG. 17B. In a solution, a difference between this embodiment and the embodiment shown in FIG. 4 lies in that after step S404 in which the electronic device switches to the first power supply state, the charging method in this embodiment includes step S1701 to step S1703.

Step S1701: When determining that the battery level of the battery is greater than or equal to a second preset battery level, the electronic device switches to the second power supply state, where the second preset battery level is greater than the first preset battery level and less than or equal to the maximum battery level of the battery.

After the electronic device switches to the first power supply state in step S404, the battery level of the battery increases. After detecting that the battery level of the battery is greater than or equal to the second preset battery level, the electronic device switches from the first power supply state to the second power supply state.

Optionally, after the electronic device switches from the first power supply state to the second power supply state, if the electronic device has a display part, the method may further include: The electronic device displays third indication information, where the third indication information indicates that the electronic device is in the second power supply state. In this case, the electronic device no longer displays the first indication information, specifically as shown in FIG. 18A and FIG. 18B or FIG. 19A and FIG. 19B.

After the electronic device switches from the first power supply state to the second power supply state, if the electronic device does not have a display part, the method may further include: The electronic device sends third indication information to the charging device, so that the charging device displays the third indication information. In this case, the charging device no longer displays the first indication information.

Step S1702: The electronic device maintains the second power supply state for second preset duration.

It may be understood that if the electronic device runs a power-intensive application when being maintained in the second power supply state for the second preset duration, there is a possibility that the battery level of the battery decreases. If no power-intensive application runs when the second power supply state is maintained for the second preset duration, the battery level of the battery may remain unchanged. Optionally, the second preset duration may be greater than or equal to 0.5 h and less than or equal to 2 h.

Step S1703: The electronic device switches to the third power supply state.

After the electronic device controls the electronic device to maintain the second power supply state for the second preset duration, the electronic device controls the electronic device to switch from the second power supply state to the third power supply state.

Figure 20B:
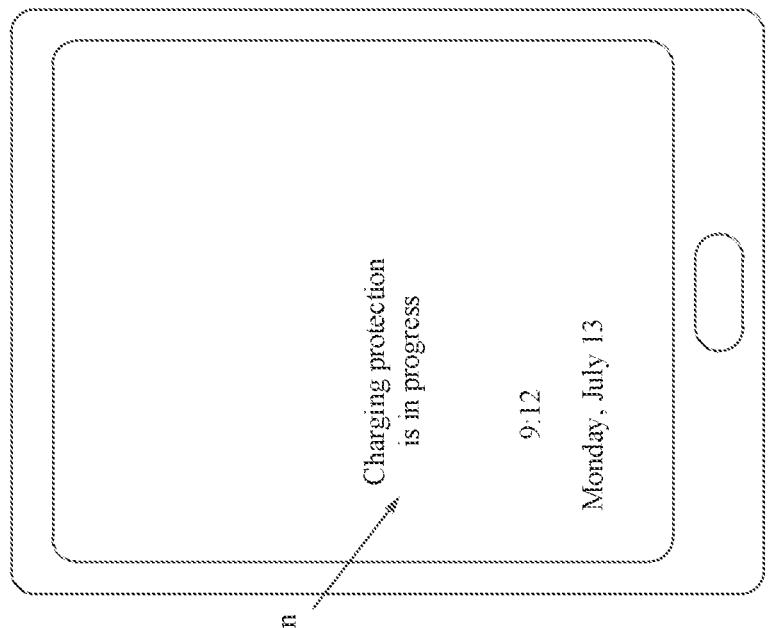
FIG. 20B is a schematic diagram 13 of a user interface of an electronic device in a screen-locked state according to an embodiment of this application.
Figure 20A:
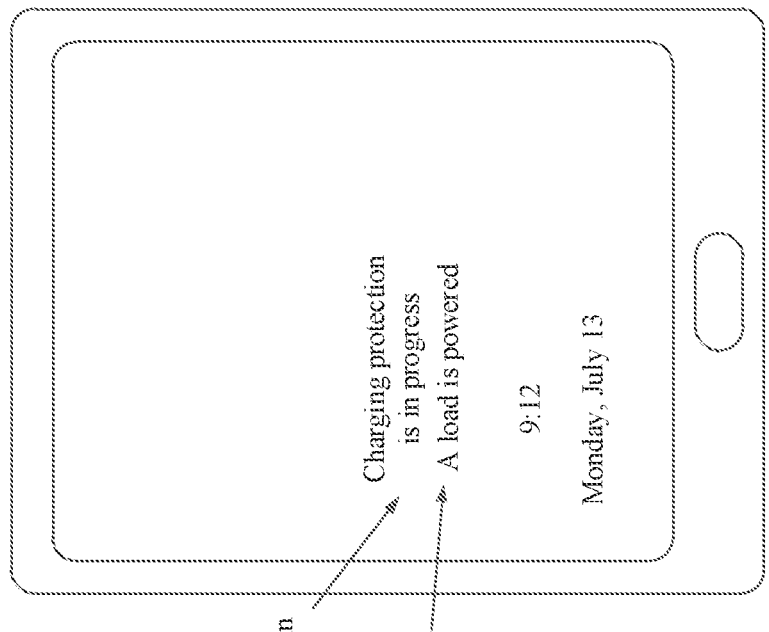
FIG. 20A is a schematic diagram 12 of a user interface of an electronic device in a screen-locked state according to an embodiment of this application.
Figure 21B:
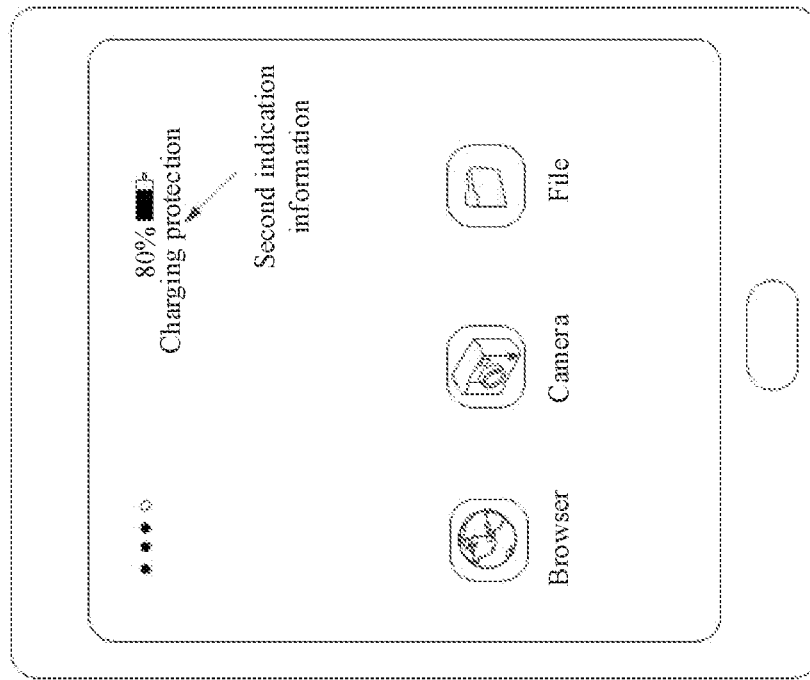
FIG. 21B is a schematic diagram 13 of a user interface of an electronic device in a use state according to an embodiment of this application.
Figure 21A:
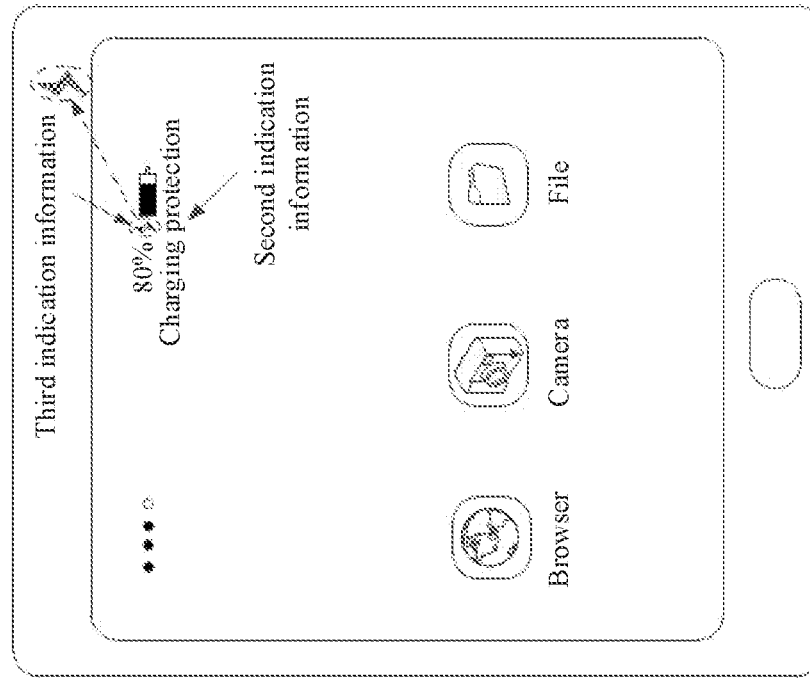
FIG. 21A is a schematic diagram 12 of a user interface of an electronic device in a use state according to an embodiment of this application.

Optionally, if the electronic device displays the third indication information or sends the third indication information to the charging device after the electronic device switches from the first power supply state to the second power supply state, the electronic device or the charging device no longer displays the third indication information after the electronic device switches from the second power supply state to the third power supply state, specifically as shown in FIG. 20A and FIG. 20B, or as shown in FIG. 21A and FIG. 21B.

Subsequently, steps S404 to S1703 are repeated until the electronic device determines to disconnect from the charging device. For the electronic device in the charging protection state, after the battery level of the battery is lower than or equal to the second preset battery level for the first time, the battery level of the battery changes within the first range.

Figure 22A:
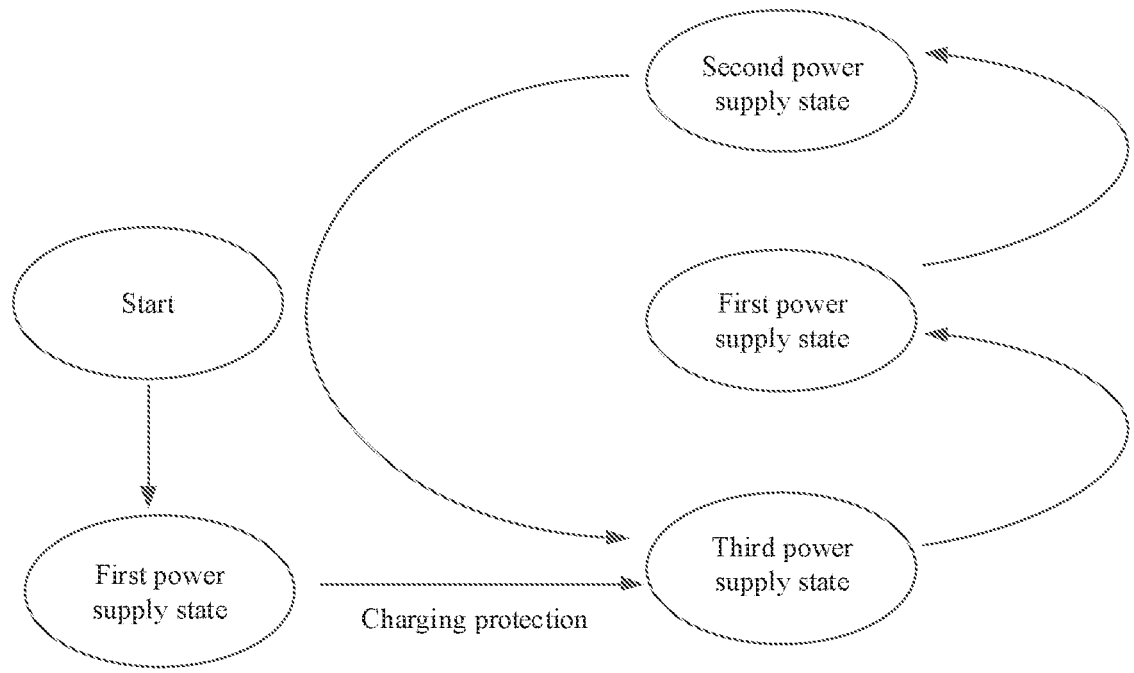
FIG. 22A is a schematic diagram 5 of a change of a power supply state of an electronic device according to an embodiment of this application.

A schematic diagram of a change of the power supply state of the electronic device corresponding to this solution may be as shown in FIG. 22A. Refer to FIG. 22A. After the electronic device is connected to the charging device, the electronic device is in the first power supply state. After entering the charging protection state, the electronic device, in one cycle, has power supply states that are sequentially the third power supply state, the first power supply state, and the second power supply state.

Still refer to FIG. 17B. In another solution, a difference between this embodiment and the embodiment shown in FIG. 4 lies in that after step S406 in which the electronic device maintains the first power supply state, and before step S408 in which the electronic device switches to the first power supply state, the charging method in this embodiment includes step S1704 to step S1706.

Step S1704: When determining that the battery level of the battery is greater than or equal to the second preset battery level, the electronic device switches to the second power supply state.

Specific implementation of this step is the same as that of step S1701, and details are not described herein again.

Step S1705: The electronic device maintains the second power supply state for the second preset duration.

Specific implementation of this step is the same as that of step S1702, and details are not described herein again.

Step S1706: The electronic device switches to the third power supply state.

Specific implementation of this step is the same as that of step S1703, and details are not described herein again.

Subsequently, steps S1704 to S408 are repeated until the electronic device determines to disconnect from the charging device. For the electronic device in the charging protection state, after the battery level of the battery is lower than or equal to the second preset battery level for the first time, the battery level of the battery changes within the first range.

Figure 22B:
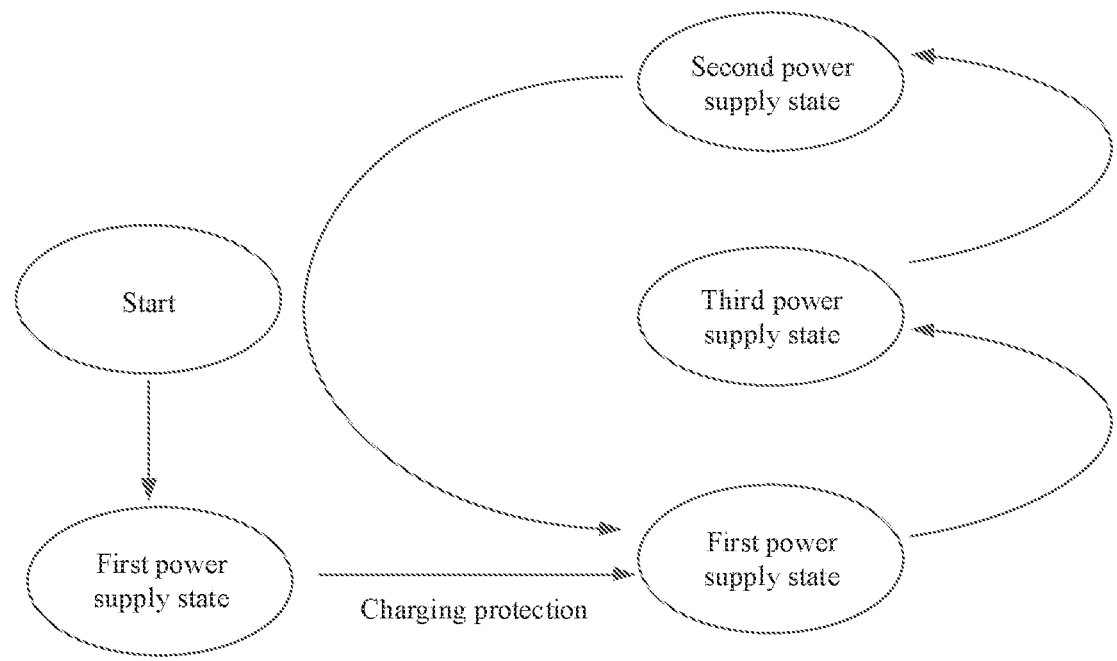
FIG. 22B is a schematic diagram 6 of a change of a power supply state of an electronic device according to an embodiment of this application.

A schematic diagram of a change of the power supply state of the electronic device corresponding to this solution may be as shown in FIG. 22B. Refer to FIG. 22B. After the electronic device is connected to the charging device, the electronic device is in the first power supply state. After entering the charging protection state, the electronic device, in one cycle, has power supply states that are sequentially the first power supply state, the third power supply state, and the second power supply state.

Figure 23:
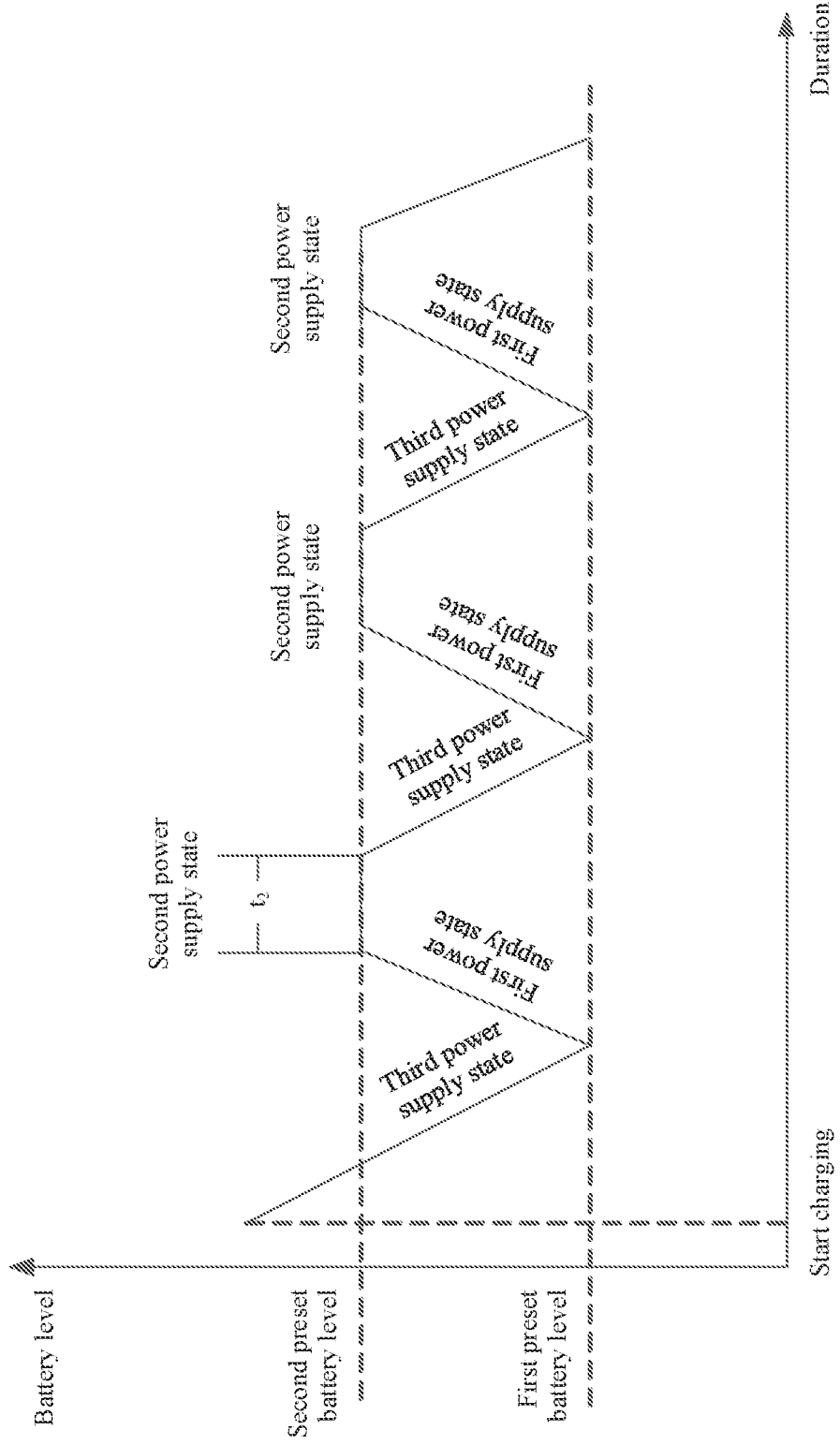
FIG. 23 is a schematic diagram 3 of a change of a battery level of a battery according to an embodiment of this application.

FIG. 23 is a schematic diagram of a change of a battery level of a battery in a charging method according to an embodiment of this application. Refer to FIG. 23. After an electronic device is connected to a charging device, when determining that the battery level of the battery is greater than a first preset battery level, the electronic device is in a third power supply state, and the battery level of the battery decreases. When the battery level of the battery decreases to the first preset battery level, the electronic device switches to a first power supply state, and the battery level of the battery increases. When determining that the battery level of the battery increases to a second preset battery level, the electronic device switches to a second power supply state, and maintains the second power supply state for second preset duration t2. If no power-intensive application runs when the second power supply state is maintained for the second preset duration, the battery level of the battery remains unchanged within the second preset duration. Then, the electronic device switches to the third power supply state, and the battery level of the battery decreases. When determining that the battery level of the battery decreases to the first preset battery level, the electronic device switches to the first power supply state, and the battery level of the battery increases. When determining that the battery level of the battery increases to the second preset battery level, the electronic device switches to the second power supply state, and maintains the second power supply state for the second preset duration. If no power-intensive application runs when the second power supply state is maintained for the second preset duration, the battery level of the battery remains unchanged in the second preset duration. Then, the electronic device switches to the third power supply state, and the battery level of the battery decreases. This process repeats until the electronic device determines to disconnect from the charging device.

In this embodiment, in a process in which the charging device charges the electronic device, when determining that the battery level of the battery is less than or equal to the first preset battery level, the electronic device is controlled to be in the first power supply state, so that the battery level of the battery increases. When the battery level of the battery increases to be greater than or equal to the second preset battery level, the electronic device is controlled to be in the third power supply state, so that the battery level of the battery decreases. The second preset battery level is less than or equal to a maximum battery level of the battery. This can avoid that the battery of the electronic device is in a high battery level state for a long time, thereby prolonging a service life of the battery.

In addition, in this embodiment, when determining that the battery level of the battery increases to be greater than or equal to the second preset battery level, the electronic device does not immediately switch to the third power supply state, but switches to the third power supply state after maintaining the second power supply state in which the battery level of the battery does not increase for a period of time. This avoids that the battery is in the high battery level state for a long time, reduces a charge/discharge cycle frequency of the battery, and further reduces a battery capacity loss rate caused by a charge/discharge cycle.

Figure 24A:
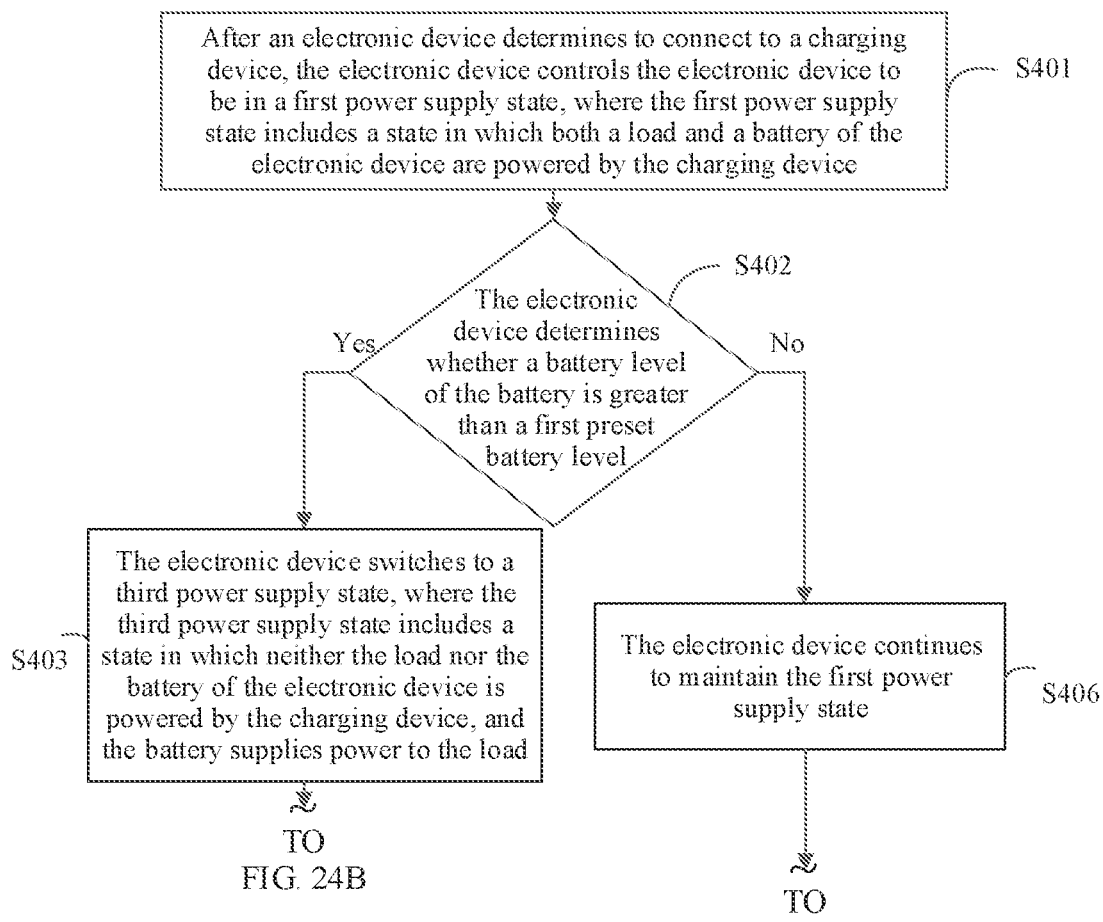

FIG. 24A and FIG. 24B are a flowchart 4 of a charging method according to an embodiment of this application. The embodiment shown in FIG. 24A and FIG. 24B is further improved based on the embodiment shown in FIG. 10A and FIG. 10B. The following describes still another charging method provided in this application by the embodiment as shown in FIG. 24A and FIG. 24B.

Refer to FIG. 24B. In a solution, a difference between the method in this embodiment and the method in the embodiment shown in FIG. 10A and FIG. 10B lies in that, in this embodiment, after step S1003, steps S1701 to S1703 are included. After step S1703, step S1001 to step S1703 are repeated until the electronic device determines to disconnect from the charging device. For specific implementations of steps S1701 to S1703, refer to the description in FIG. 17B. Details are not described herein again.

Figure 25A:
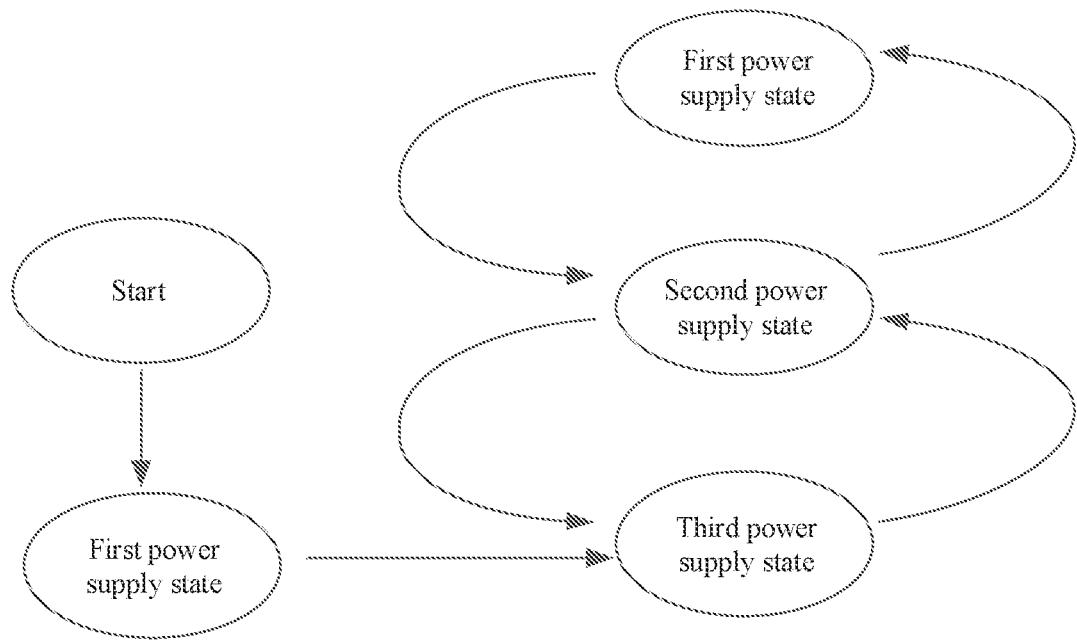
FIG. 25A is a schematic diagram 7 of a change of a power supply state of an electronic device according to an embodiment of this application.

A schematic diagram of a change of the power supply state of the electronic device corresponding to this solution may be as shown in FIG. 25A. Refer to FIG. 25A. After the electronic device is connected to the charging device, the electronic device is in the first power supply state. Then, the electronic device, in one cycle, has power supply states that are sequentially the third power supply state, the second power supply state, the first power supply state, and the second power supply state.

Still refer to FIG. 24B. In another solution, a difference between the method in this embodiment and the method in the embodiment shown in FIG. 10A and FIG. 10B lies in that in this embodiment, after step S406 of maintaining the first power supply state and before step S1004 of switching the electronic device to the second power supply state, steps S1704 to S1706 are further included. After step S1006, step S1704 to step S1006 are repeated until the electronic device determines to disconnect from the charging device. For specific implementation of steps S1704 to S1706, refer to the description in FIG. 17B. Details are not described herein again.

Figure 25B:
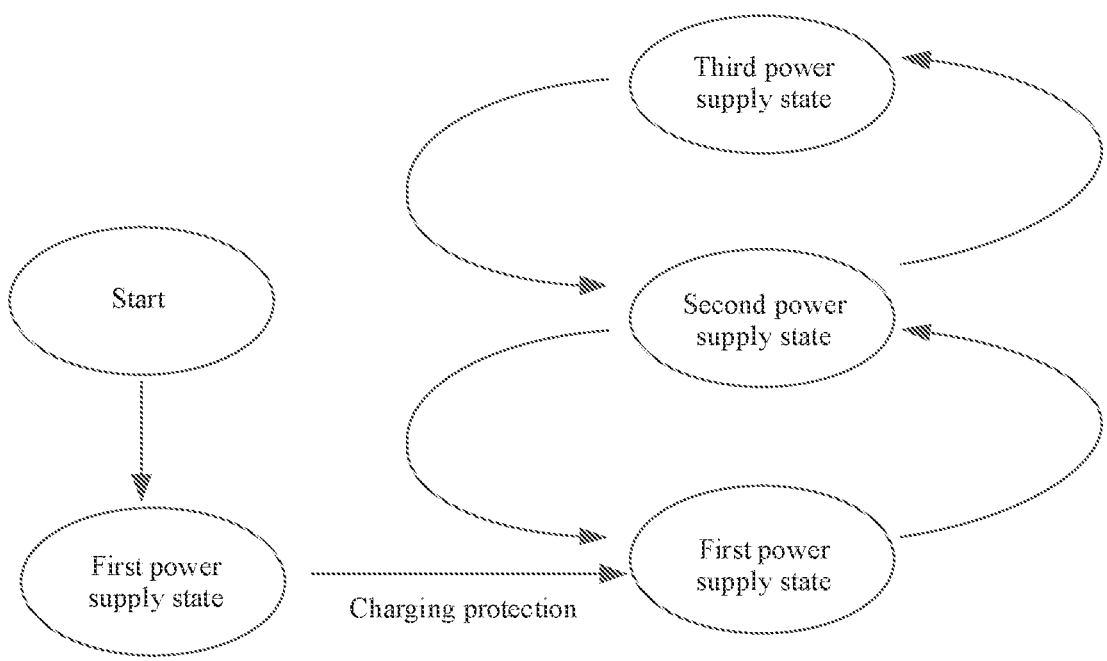
FIG. 25B is a schematic diagram 8 of a change of a power supply state of an electronic device according to an embodiment of this application.

A schematic diagram of a change of the power supply state of the electronic device corresponding to this solution may be as shown in FIG. 25B. Refer to FIG. 25B. After the electronic device is connected to the charging device, the electronic device is in the first power supply state. Then, the electronic device, in one cycle, has power supply states that are sequentially the first power supply state, the second power supply state, the third power supply state, and the second power supply state.

Figure 26:
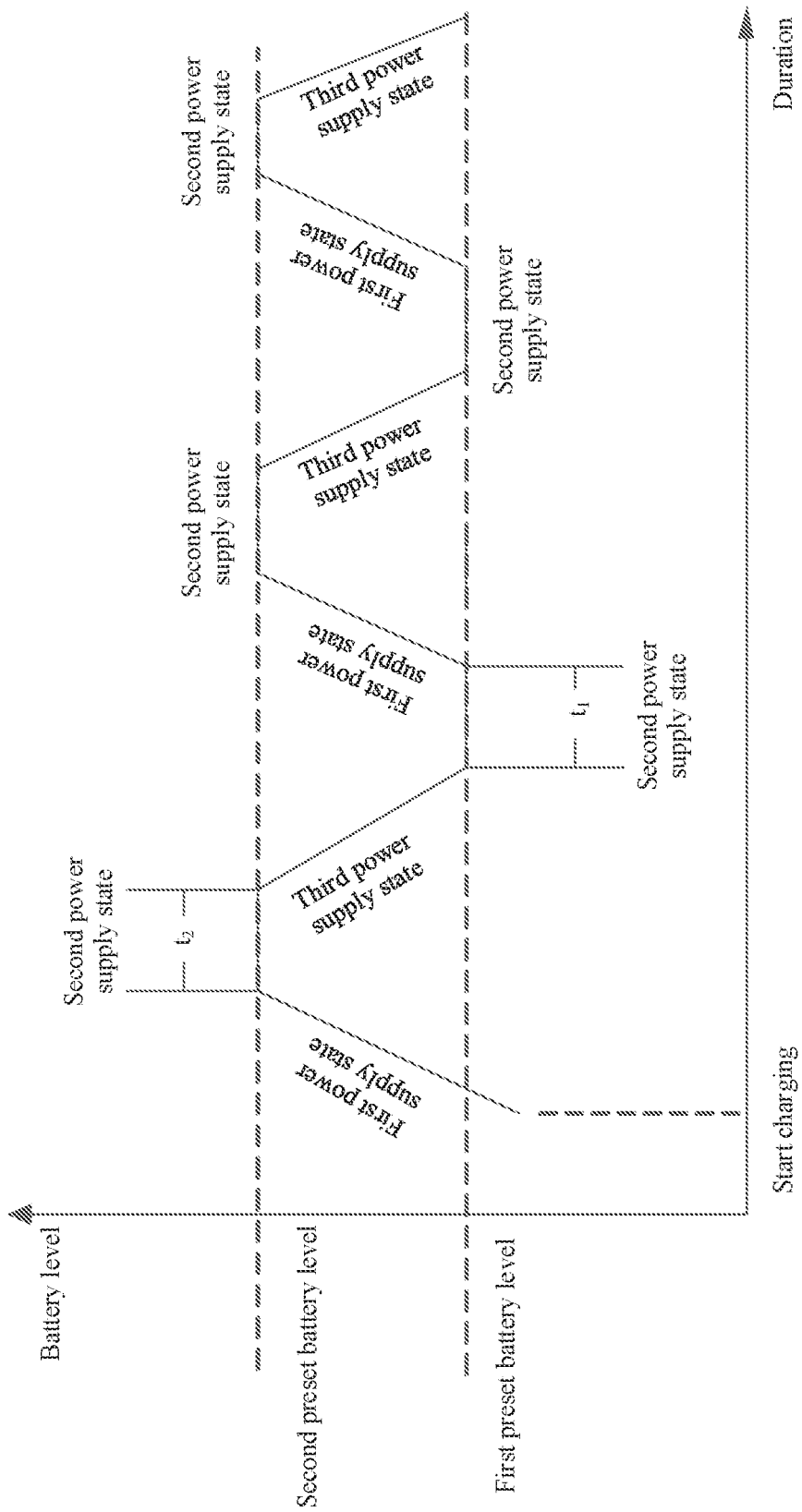
FIG. 26 is a schematic diagram 4 of a change of a battery level of a battery according to an embodiment of this application.

FIG. 26 is a schematic diagram of a change of a battery level of a battery in a charging method according to an embodiment of this application. Refer to FIG. 26. After an electronic device is connected to a charging device, when determining that the battery level of the battery is less than a first preset battery level, the electronic device is in a first power supply state, and the battery level of the battery gradually increases. When determining that the battery level of the battery increases to a second preset battery level, the electronic device switches to a second power supply state, and maintains the second power supply state for second preset duration t2. If no power-intensive application runs when the second power supply state is maintained for the second preset duration, the battery level of the battery remains unchanged in the second preset duration. Then, the electronic device switches to a third power supply state, and the battery level of the battery decreases. When determining that the battery level of the battery decreases to the first preset battery level, the electronic device switches to the second power supply state, and maintains the second power supply state for the first preset duration. If no power-intensive application runs when the second power supply state is maintained for the first preset duration, the battery level of the battery remains unchanged in the first preset duration. Then, the electronic device switches to the first power supply state, and the battery level of the battery increases. When determining that the battery level of the battery increases to the second preset battery level, the electronic device switches to the second power supply state, and maintains the second power supply state for the first preset duration. If no power-intensive application runs when the second power supply state is maintained for the second preset duration, the battery level of the battery remains unchanged in the second preset duration. Then, the electronic device switches to the third power supply state, and the battery level of the battery decreases. This process repeats until the electronic device determines to disconnect from the charging device.

It can be learned from the foregoing process that, after the electronic device in this embodiment is connected to the charging device, when determining that the battery level of the battery is less than or equal to the first preset battery level, the electronic device controls the electronic device to be in the first power supply state, so that the battery level of the battery increases. When the battery level of the battery increases to be greater than or equal to the second preset battery level, the electronic device controls the electronic device to be in the third power supply state, so that the battery level of the battery decreases. The second preset battery level is less than or equal to a maximum battery level of the battery. This can avoid that the battery of the electronic device is in a high battery level state for a long time, thereby prolonging a service life of the battery. That is, according to the charging method in this embodiment, duration in which the battery is at a high battery level is reduced, and the service life of the battery is prolonged.

In addition, in this embodiment, when the battery level of the battery is less than or equal to the first preset battery level, the electronic device is not directly controlled to be in the first power supply state, but is controlled to be in the first power supply state after being maintained in the second power supply state in which the battery level of the battery is not increased for the first preset duration. When the battery level of the battery is greater than or equal to the second preset battery level, the electronic device is not directly controlled to be in the third power supply state, but is controlled to be in the third power supply state after being maintained in the second power supply state in which the battery level of the battery is not increased for the second preset duration, so that the charge/discharge cycle frequency of the battery is further reduced, and the battery capacity loss rate caused by the charge/discharge cycle is further reduced.

Figure 27A:
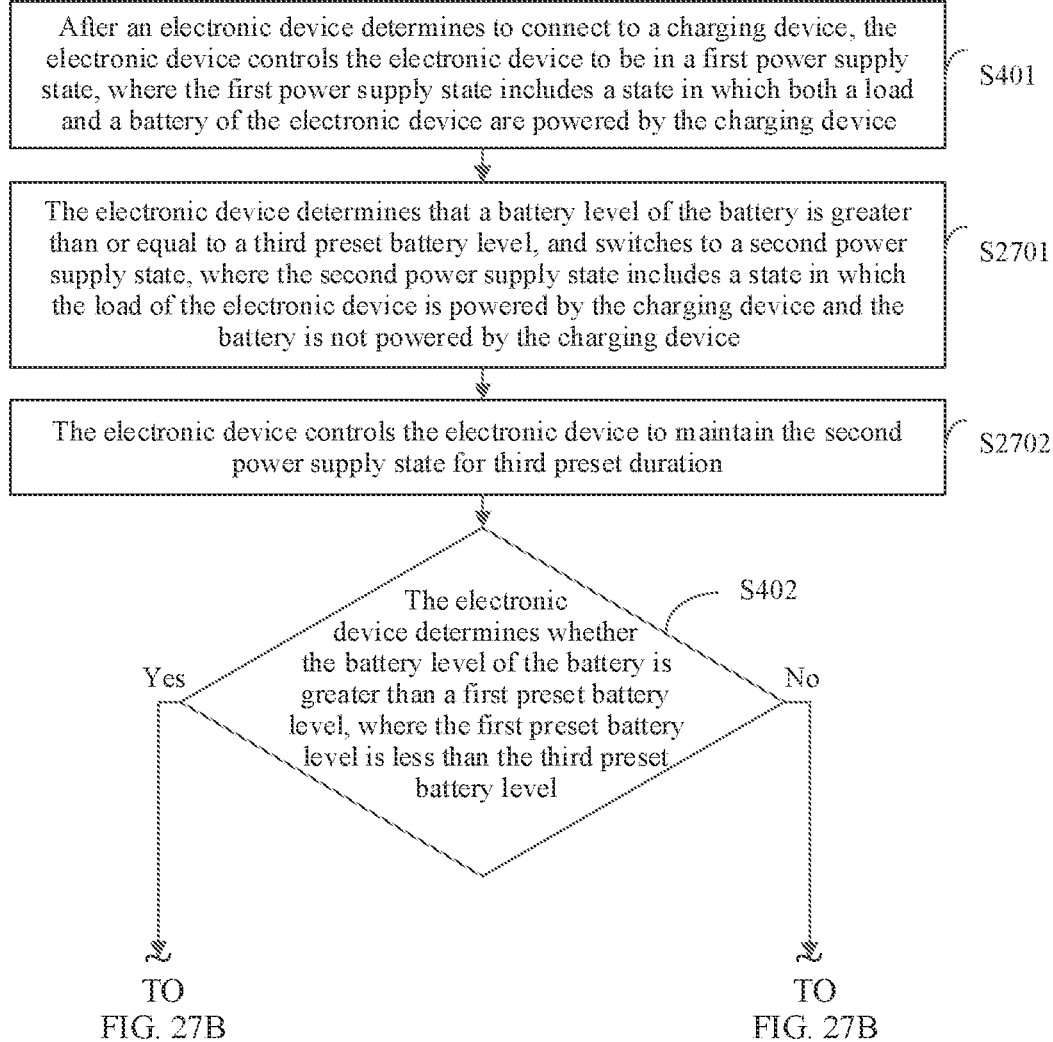
FIG. 27A and FIG. 27B are a flowchart 5 of a charging method according to an embodiment of this application.
Figure 27B:
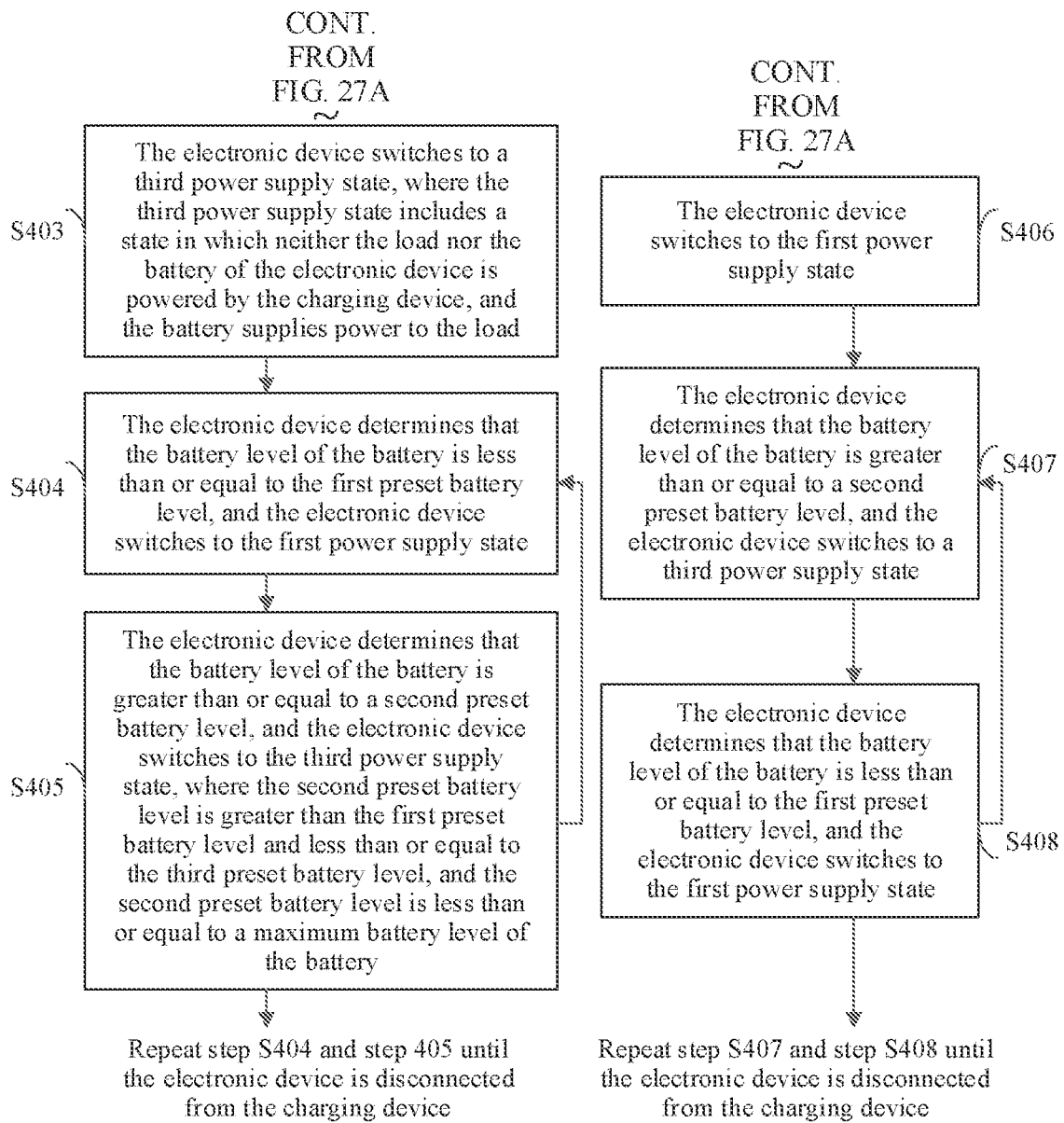

FIG. 27A and FIG. 27B are a flowchart 5 of a charging method according to an embodiment of this application. The embodiment shown in FIG. 27A and FIG. 27B is further improved based on the embodiment shown in FIG. 4. The following describes still another charging method provided in this embodiment with reference to the embodiment shown in FIG. 27A and FIG. 27B.

Refer to FIG. 27A. A difference between this embodiment and the embodiment shown in FIG. 4 lies in that after step S401 in which the electronic device is in the first power supply state and before step S402 in which it is determined whether the battery level of the battery is greater than the first preset battery level, the method in this embodiment further includes step S2701 and step S2702.

Step S2701: The electronic device determines that the battery level of the battery is greater than or equal to a third preset battery level, and switches to a second power supply state, where the second power supply state includes a state in which the load of the electronic device is powered by the charging device and the battery is not powered by the charging device.

When the electronic device is in the first power supply state, the load is powered by the charging device. If no power-intensive application runs, the load usually does not need to be powered by the battery. Therefore, the battery level of the battery of the electronic device gradually increases. The electronic device detects the battery level of the battery in real time. If the battery level of the battery is less than the third preset battery level, the electronic device continues to be in the first power supply state; or if the battery level of the battery is greater than or equal to the third preset battery level, the electronic device switches to the second power supply state. The third preset battery level may be less than or equal to a maximum battery level of the battery. For example, the third preset battery level is greater than or equal to a battery level 95%. For example, the third preset battery level is equal to a battery level 100%.

Optionally, after the electronic device switches from the first power supply state to the second power supply state, if the electronic device has a display part, the method may further include: The electronic device displays third indication information, where the third indication information indicates that the electronic device is in the second power supply state. In this case, the electronic device no longer displays the first indication information. After the electronic device switches from the first power supply state to the second power supply state, if the electronic device does not have a display part, the method may further include: The electronic device sends third indication information to the charging device, and in this case, the charging device no longer displays the first indication information.

Step S2702: The electronic device controls the electronic device to maintain the second power supply state for third preset duration.

In a specific implementation, after the electronic device is connected to the charging device, at a moment at which the battery level of the battery is determined to be greater than or equal to the third preset battery level for the first time, the electronic device starts a timer to start timing, and when determining that the timing of the timer is equal to the third preset duration, determines that the electronic device has been in the second power supply state for the third preset duration. It may be understood that, in a process in which the electronic device is connected to the charging device, the timer may keep timing after being started, and the timing is reset to 0 after the electronic device is disconnected from the charging device.

In a manner, the third preset duration may be determined based on total duration required for charging the battery of the electronic device from the battery level 0 to the maximum battery level. In this case, the third preset duration may be greater than the total duration. For example, the total duration is 5 hours (h), and the third preset duration may be 6 h.

In another manner, a habit of using the electronic device by a user in a specific scenario may be learned by using big data, to determine the third preset duration. For example, charging duration of the electronic device obtained when the user uses the electronic device in a specific scenario is learned. The third preset duration may be greater than the charging duration. The charging duration herein refers to duration from a time when the user connects the electronic device to the charging device to start charging to a time when the user disconnects the electronic device from the charging device.

In still another manner, the third preset duration may be determined based on a use scenario. For example, in a scenario in which the electronic device is connected to the charging device for a long time, such as access control management, the third preset duration may be randomly set to duration less than or equal to preselected duration. For example, if the preselected duration is 24 h, the third preset duration may be 12 h, 2 h, 0s, or the like.

After the electronic device is connected to the charging device, the battery level of the battery increases. If the battery level of the battery is greater than or equal to the third preset battery level, the electronic device is first controlled to last for the third preset duration in the second power supply state, so that the battery of the electronic device can maintain a high battery level for a period of time. In this way, the user can learn that the battery is in a high battery level state based on battery level indication information displayed on a display, and can learn that charging functions of the electronic device and the charging device are normal, that is, reliability of the electronic device is high.

It may be understood that the third preset duration may alternatively be 0s, that is, step S2702 is an optional step.

Figure 28A:
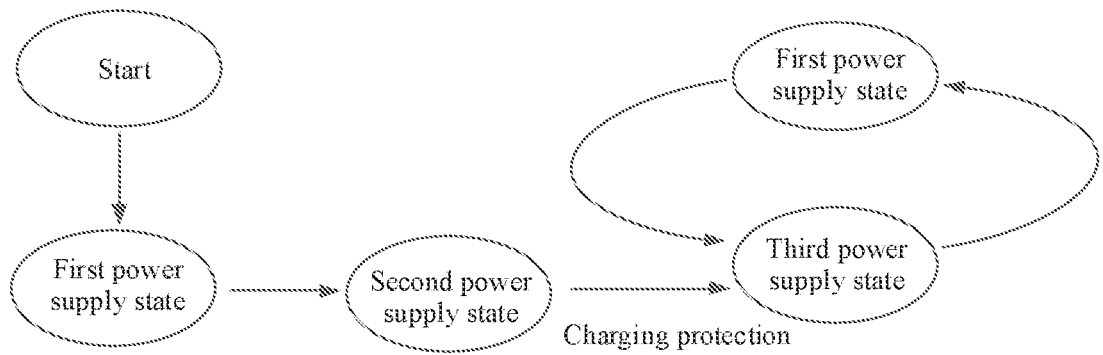
FIG. 28A is a schematic diagram 9 of a change of a power supply state of an electronic device according to an embodiment of this application.
Figure 28B:
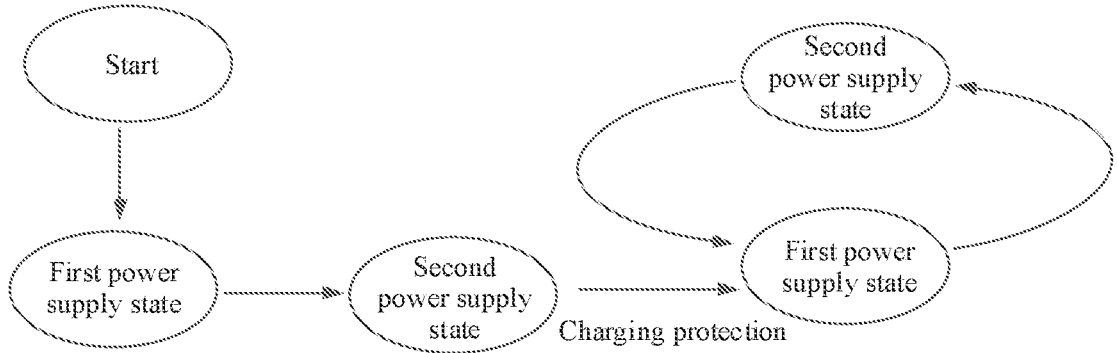
FIG. 28B is a schematic diagram 10 of a change of a power supply state of an electronic device according to an embodiment of this application.

A schematic diagram of a change of the power supply state of the electronic device corresponding to this solution may be as shown in FIG. 28A or FIG. 28B. After the electronic device is connected to the charging device, the electronic device is in the first power supply state. After the battery level of the battery reaches the third preset battery level, the electronic device is in the second power supply state for the third preset duration, and then enters a charging protection state. Refer to FIG. 28A. When the electronic device is in the charging protection state, the power supply state of the electronic device switches between the third power supply state and the first power supply state. Refer to FIG. 28B. When the electronic device is in the charging protection state, the power supply state of the electronic device switches between the first power supply state and the third power supply state.

Figure 29:
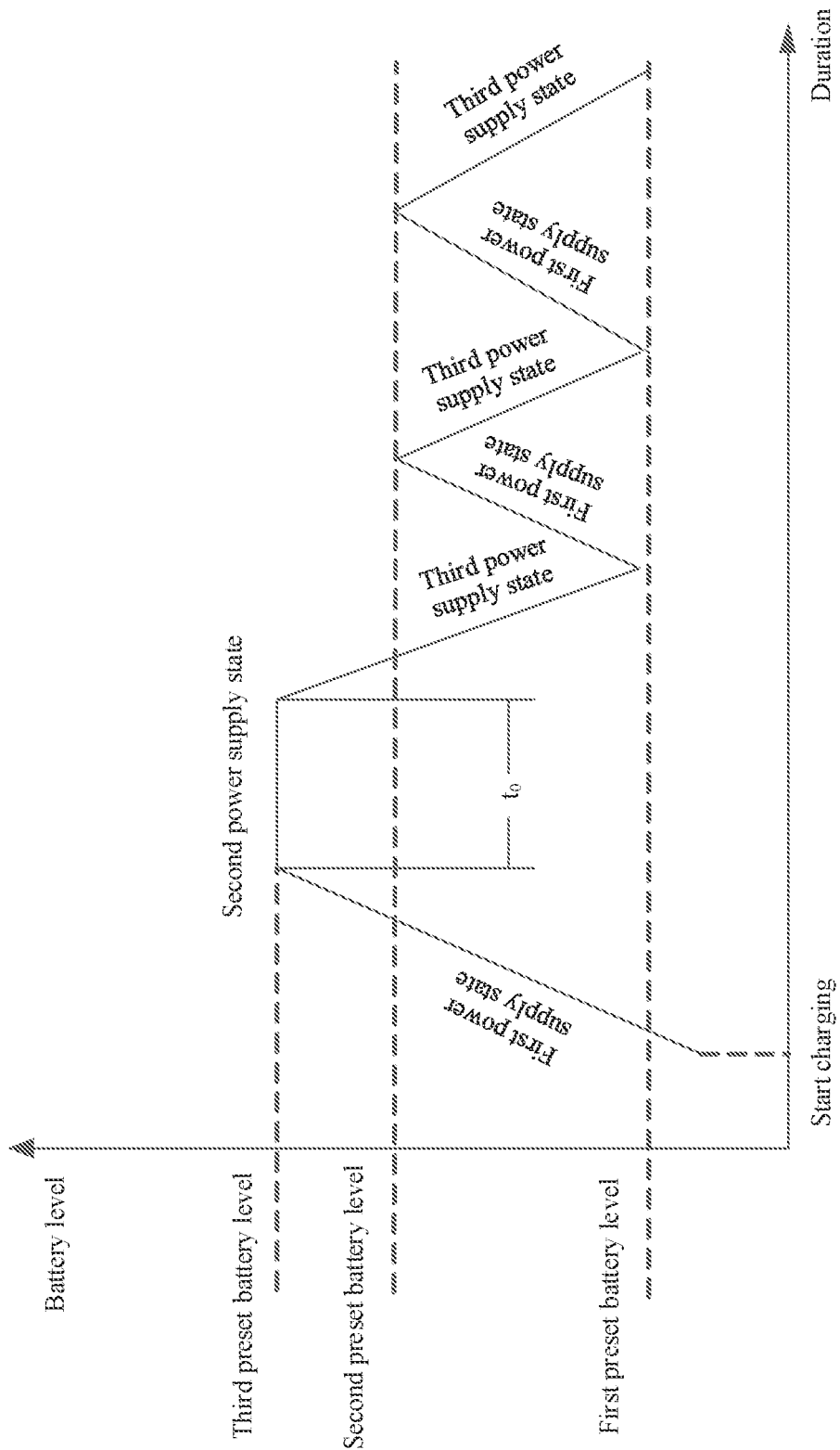
FIG. 29 is a schematic diagram 5 of a change of a battery level of a battery according to an embodiment of this application.

FIG. 29 is a schematic diagram of a change of a battery level of a battery in a charging method according to an embodiment of this application. Refer to FIG. 29. After an electronic device is connected to a charging device, because the electronic device is in a first power supply state, the battery level of the battery gradually increases. After the battery level reaches a third preset battery level, the electronic device switches to a second power supply state. When there is no power-intensive application, the battery level of the battery maintains the third preset battery level for third preset duration to. That is, after the third preset duration, the battery level of the battery is still the third preset battery level, and the third preset battery level is greater than a first preset battery level. Therefore, the electronic device switches to a third power supply state, and the battery level of the battery decreases. When the battery level of the battery decreases to be less than or equal to the first preset battery level, the electronic device switches to the first power supply state, and the battery level of the battery increases. When the battery level of the battery increases to be greater than or equal to a second preset battery level, the electronic device switches to the third power supply state, and the battery level of the battery decreases. When the battery level of the battery decreases to be less than or equal to the first preset battery level, the electronic device switches to the first power supply state, and the battery level of the battery increases. When the battery level of the battery increases to be greater than or equal to the second preset battery level, the electronic device switches to the third power supply state, and the battery level of the battery decreases. This process repeats until the electronic device determines to disconnect from the charging device.

According to the charging method in this embodiment, reliability of the electronic device is relatively high while duration in which the battery is at a high battery level is reduced, and a service life of the battery is prolonged.

Figure 30A:
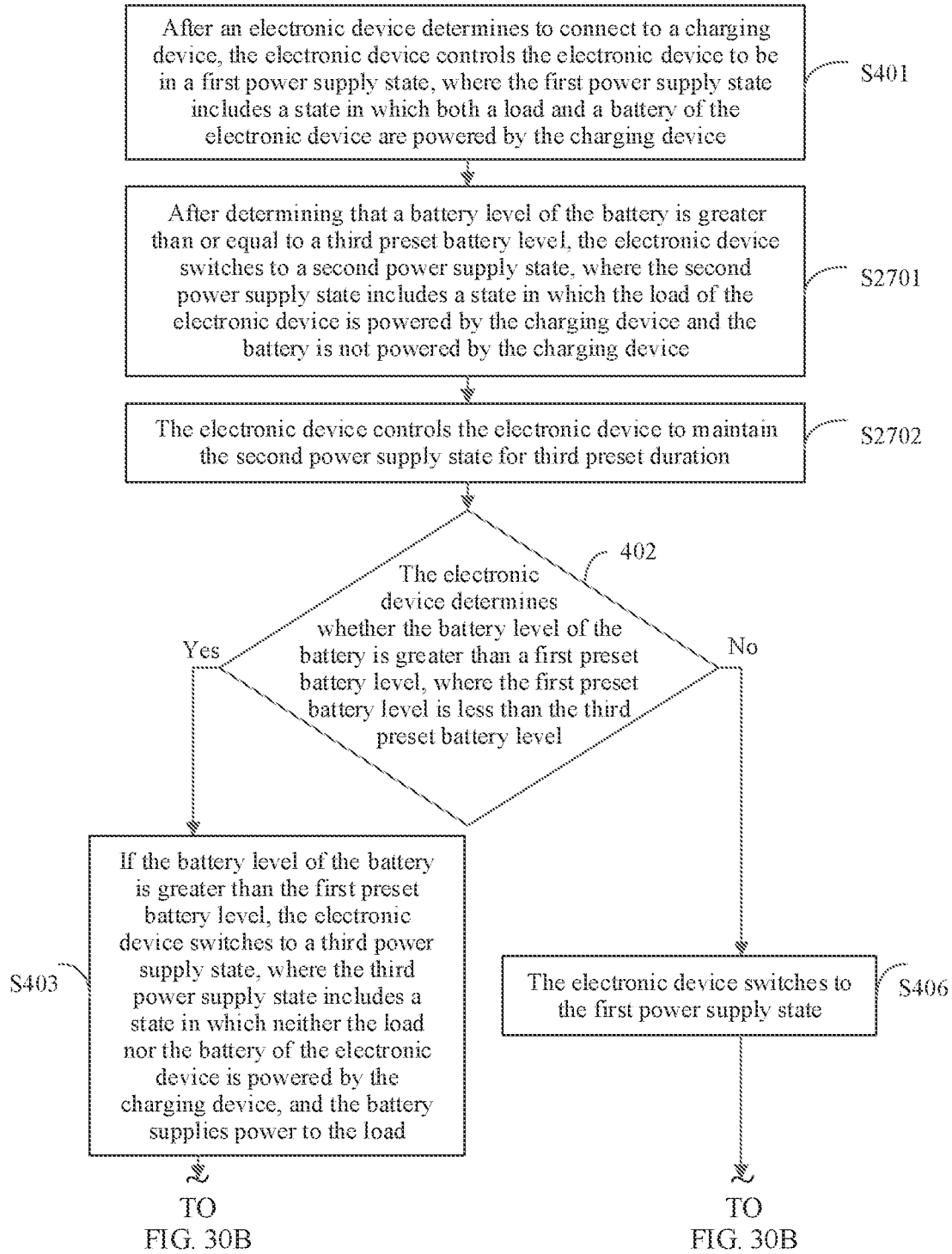
FIG. 30A and FIG. 30B are a flowchart 6 of a charging method according to an embodiment of this application.
Figure 30B:
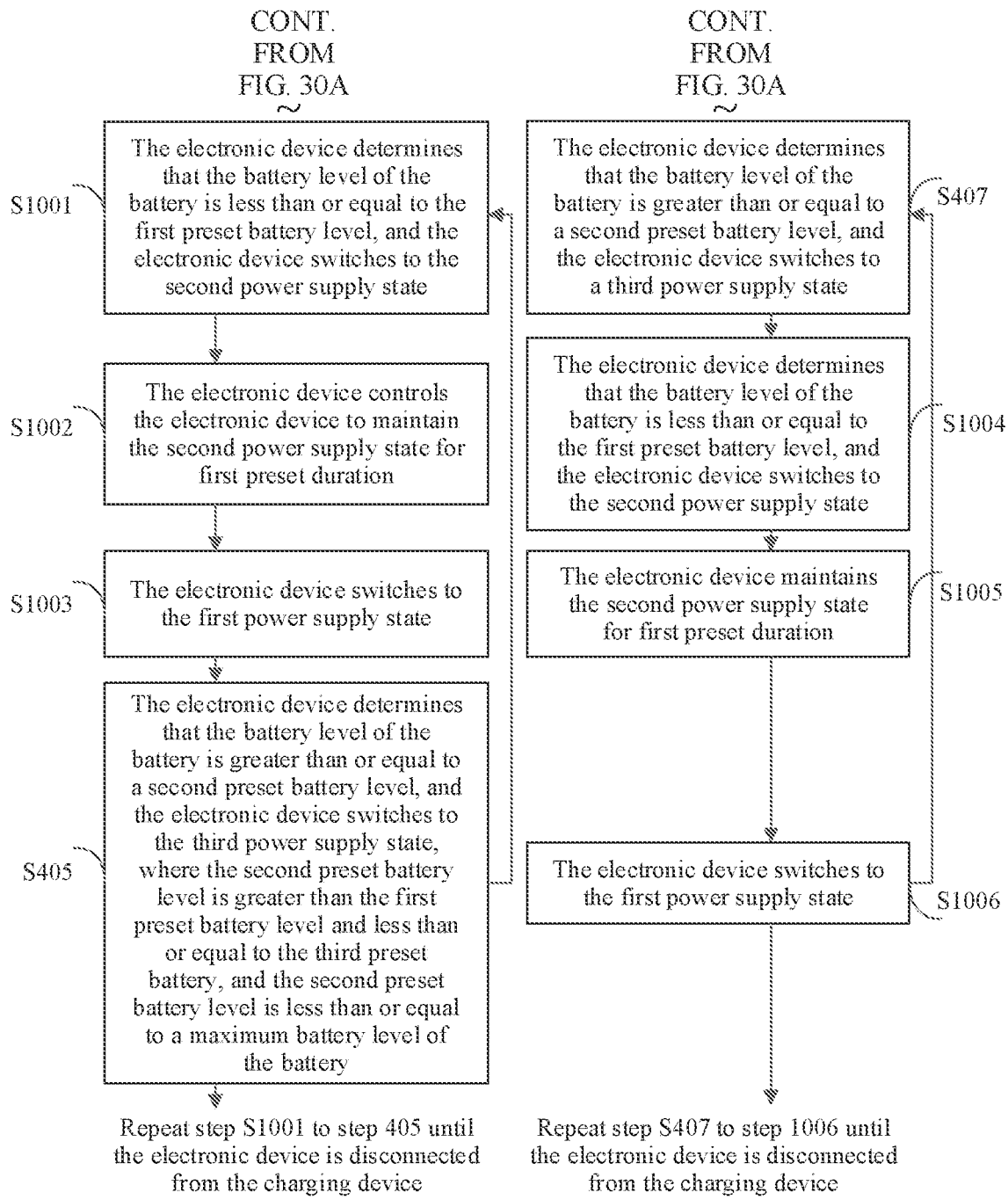

FIG. 30A and FIG. 30B are a flowchart 6 of a charging method according to an embodiment of this application. The embodiment shown in FIG. 30A and FIG. 30B is further improved based on the embodiment shown in FIG. 10A and FIG. 10B. The following describes still another charging method provided in this embodiment with reference to FIG. 30A and FIG. 30B.

Refer to FIG. 30A and FIG. 30B. A difference between this embodiment and the embodiment shown in FIG. 10A and FIG. 10B lies in that after step S401 in which the electronic device is in the first power supply state and before step S402 in which it is determined whether the battery level of the battery is greater than the first preset battery level, the method in this embodiment further includes step S2701 and step S2702. For specific implementation, refer to the description in the embodiment shown in FIG. 27A, and details are not described herein again.

Figure 31A:
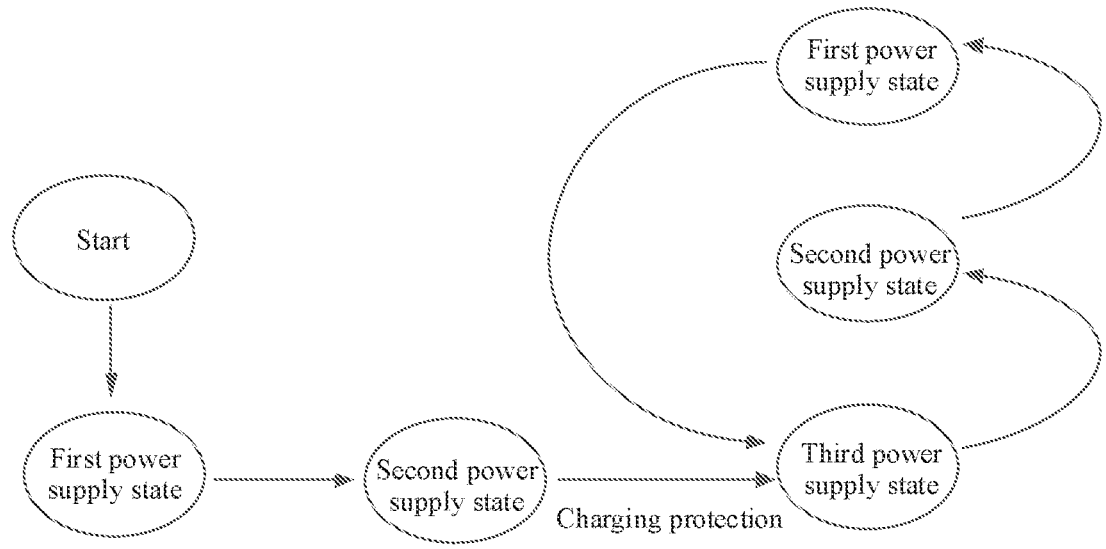
FIG. 31A is a schematic diagram 11 of a change of a power supply state of an electronic device according to an embodiment of this application.
Figure 31B:
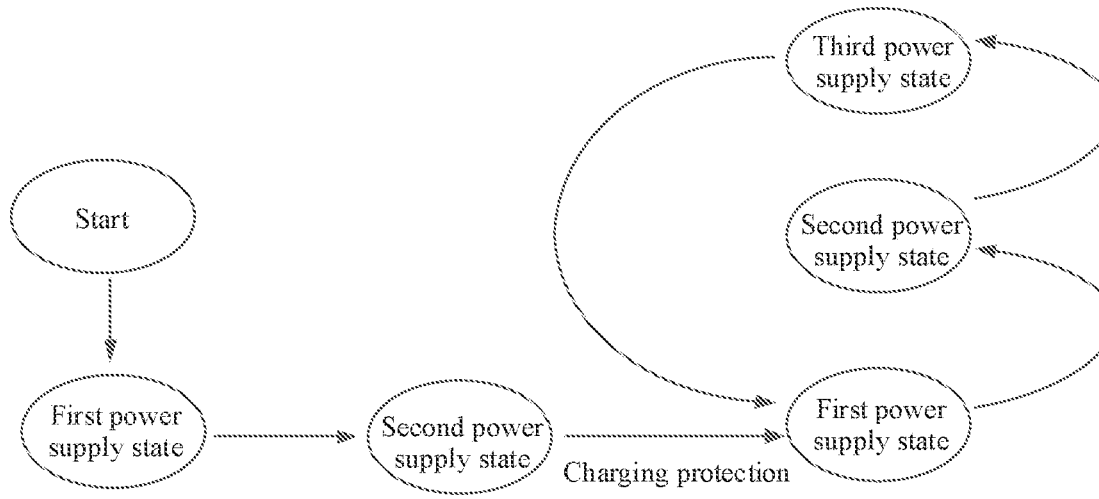
FIG. 31B is a schematic diagram 12 of a change of a power supply state of an electronic device according to an embodiment of this application.

A schematic diagram of a change of the power supply state of the electronic device corresponding to this solution may be as shown in FIG. 31A or FIG. 31B. After the electronic device is connected to the charging device, the electronic device is in the first power supply state. After the battery level of the battery reaches the third preset battery level, the electronic device is in the second power supply state for the third preset duration, and then enters a charging protection state. Refer to FIG. 31A. When the electronic device is in the charging protection state, in one cycle, the electronic device has power supply states that are sequentially the third power supply state, the second power supply state, and the first power supply state. Refer to FIG. 31B. When the electronic device is in the charging protection state, in one cycle, the electronic device has power supply states that are sequentially the first power supply state, the second power supply state, and the third power supply state.

Figure 32:
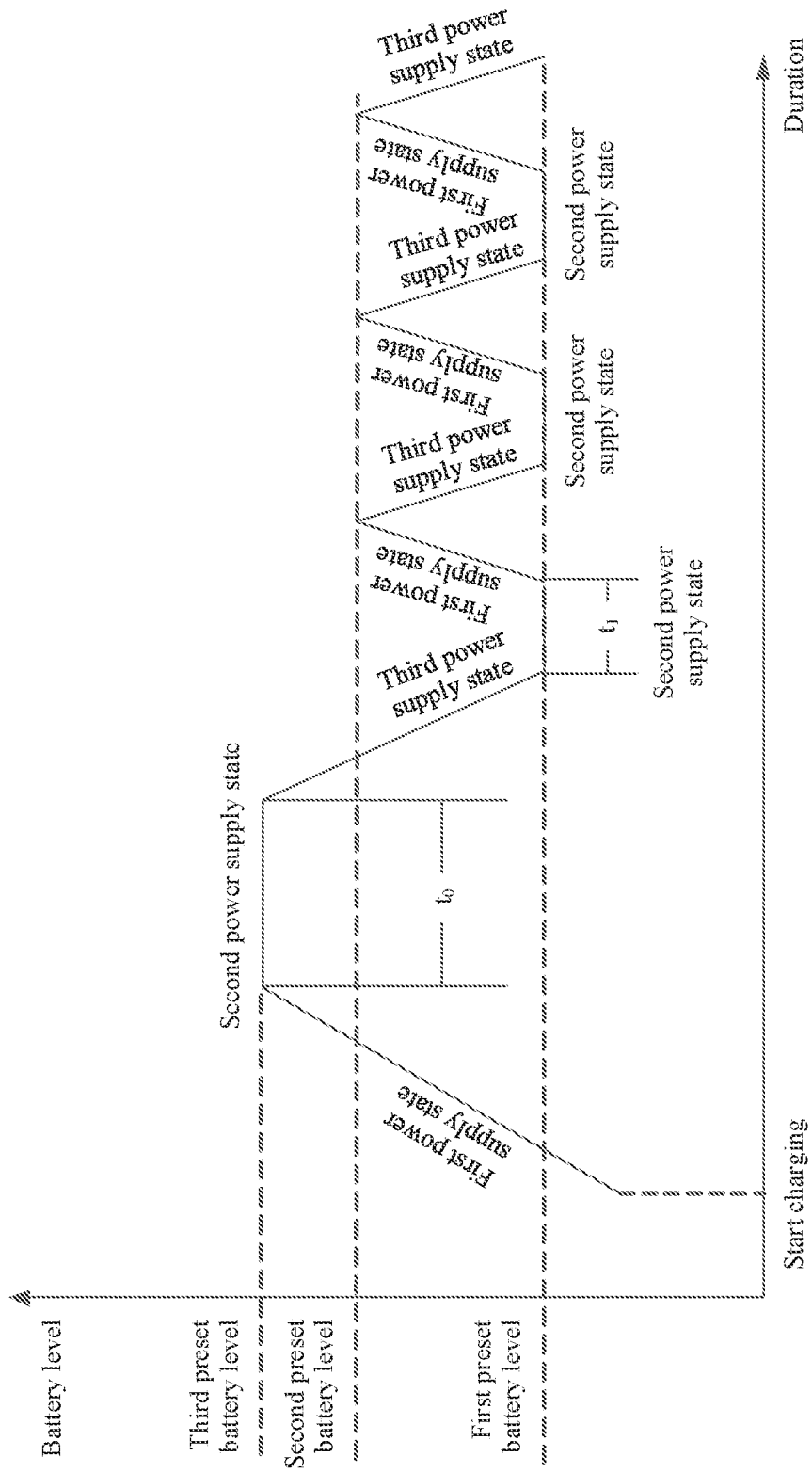
FIG. 32 is a schematic diagram 6 of a change of a battery level of a battery according to an embodiment of this application.

FIG. 32 is a schematic diagram of a change of a battery level of a battery in a charging method according to an embodiment of this application. Refer to FIG. 32. After an electronic device is connected to a charging device, because the electronic device is in a first power supply state, the battery level of the battery gradually increases. After the battery level reaches a third preset battery level, the electronic device switches to a second power supply state and maintains the second power supply state for third preset duration. If no power-intensive application runs when the second power supply state is maintained for the third preset duration, the battery level of the battery also maintains the third preset battery level for third preset duration to. After the third preset duration, the battery level of the battery is still the third preset battery level, and the third preset battery level is greater than a first preset battery level. Therefore, the electronic device switches to a third power supply state, and the battery level of the battery decreases. When the battery level of the battery decreases to be less than or equal to the first preset battery level, the electronic device switches to the second power supply state, and maintains the second power supply state for first preset duration t1. Then, the electronic device switches to the first power supply state, and the battery level of the battery increases. When the battery level of the battery increases to be greater than or equal to a second preset battery level, the electronic device switches to the third power supply state, and the battery level of the battery decreases. When the battery level of the battery decreases to be less than or equal to the first preset battery level, the electronic device switches to the second power supply state, and maintains the second power supply state for first preset duration. Then, the electronic device switches to the first power supply state, and the battery level of the battery increases. When the battery level of the battery increases to be greater than or equal to the second preset battery level, the electronic device switches to the third power supply state, and the battery level of the battery decreases. When the battery level of the battery decreases to be less than or equal to the first preset battery level, the electronic device switches to the second power supply state, and maintains the second power supply state for the first preset duration. Then, the electronic device switches to the first power supply state, and the battery level of the battery increases. This process repeats until the electronic device determines to disconnect from the charging device.

According to the charging method in this embodiment, a service life of the battery is long, a battery capacity loss rate is low, and reliability of the electronic device is high.

Figure 33A:
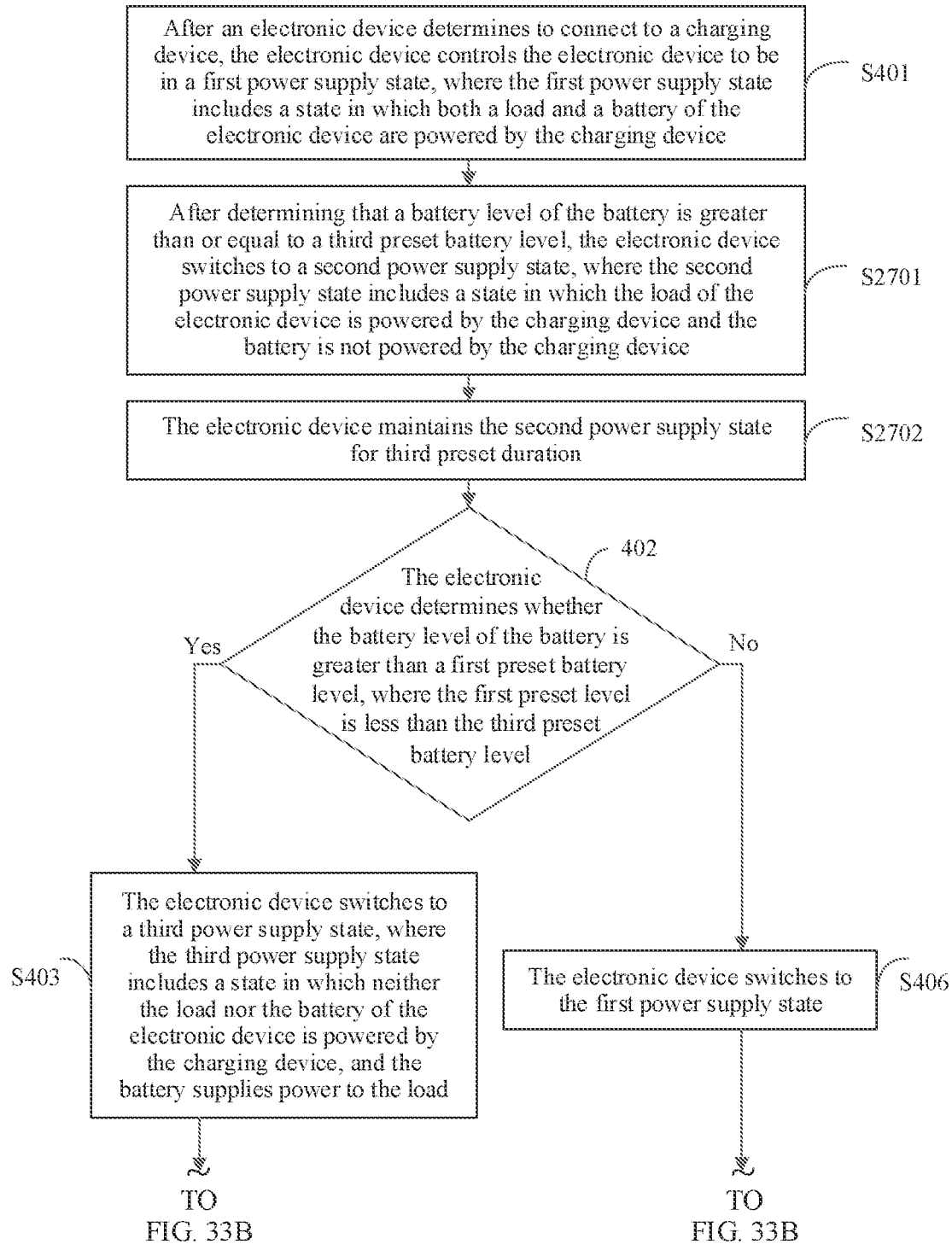
FIG. 33A and FIG. 33B are a flowchart 7 of a charging method according to an embodiment of this application.
Figure 33B:
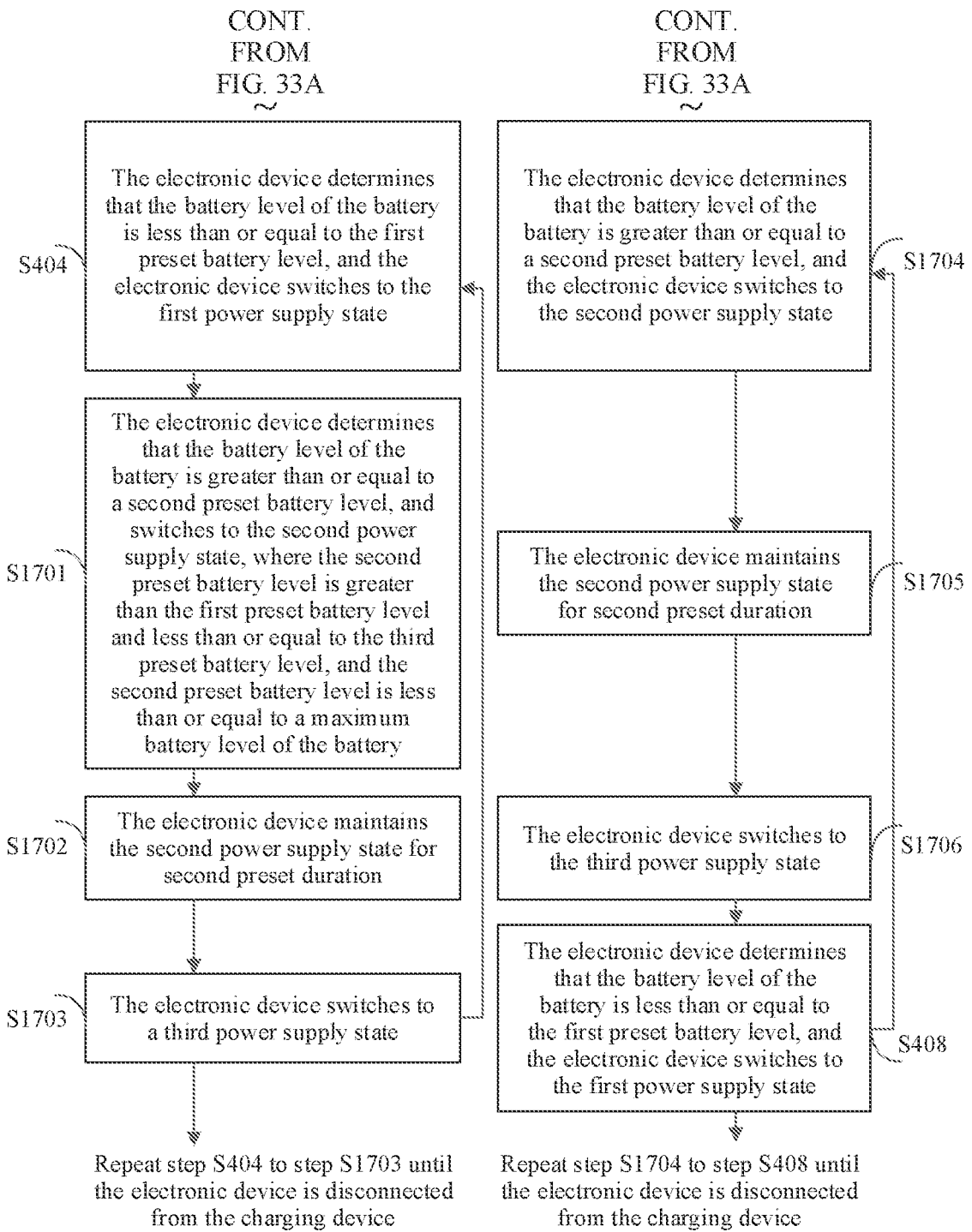

FIG. 33A and FIG. 33B are a flowchart 7 of a charging method according to an embodiment of this application. The embodiment shown in FIG. 33A and FIG. 33B is further improved based on the embodiment shown in FIG. 17A and FIG. 17B. The following describes still another charging method provided in this embodiment with reference to the embodiment in FIG. 33A and FIG. 33B.

Refer to FIG. 33A and FIG. 33B. A difference between this embodiment and the embodiment shown in FIG. 17A and FIG. 17B lies in that after step S401 in which the electronic device is in the first power supply state and before step S402 in which it is determined whether the battery level of the battery is greater than the first preset battery level, the method in this embodiment further includes step S2701 and step S2702. For specific implementation, refer to the description in the embodiment shown in FIG. 27A, and details are not described herein again.

Figure 34A:
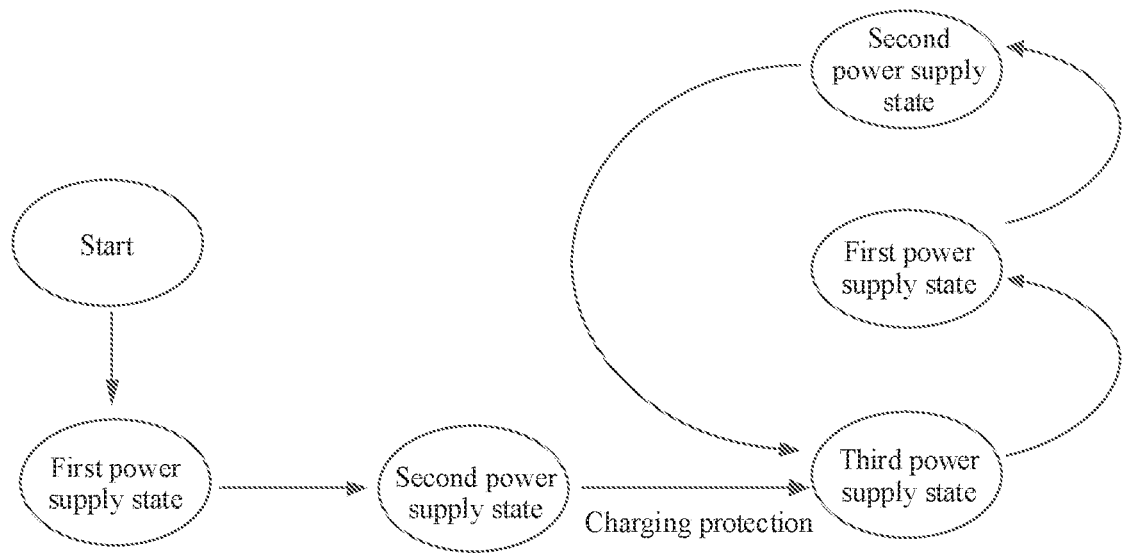
FIG. 34A is a schematic diagram 13 of a change of a power supply state of an electronic device according to an embodiment of this application.
Figure 34B:
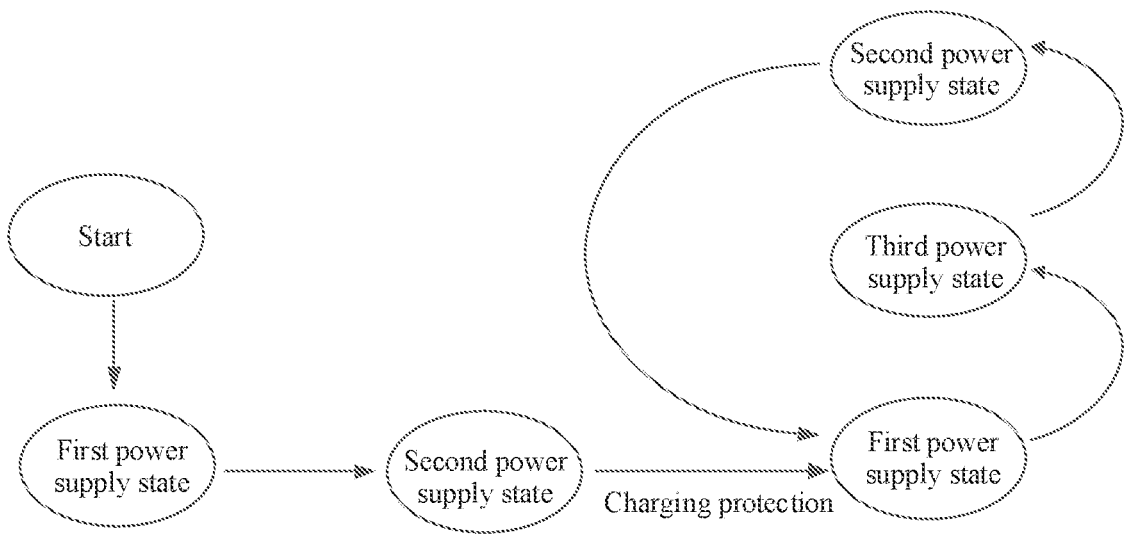
FIG. 34B is a schematic diagram 14 of a change of a power supply state of an electronic device according to an embodiment of this application.

A schematic diagram of a change of the power supply state of the electronic device corresponding to this solution may be as shown in FIG. 34A or FIG. 34B. After the electronic device is connected to the charging device, the electronic device is in the first power supply state. After the battery level of the battery reaches the third preset battery level, the electronic device is in the second power supply state for the third preset duration, and then enters a charging protection state. Refer to FIG. 34A. When the electronic device is in the charging protection state, in one cycle, the electronic device has power supply states that are sequentially the third power supply state, the first power supply state, and the second power supply state. Refer to FIG. 34B. When the electronic device is in the charging protection state, in one cycle, the electronic device has power supply states that are sequentially the first power supply state, the third power supply state, and the second power supply state.

Figure 35:
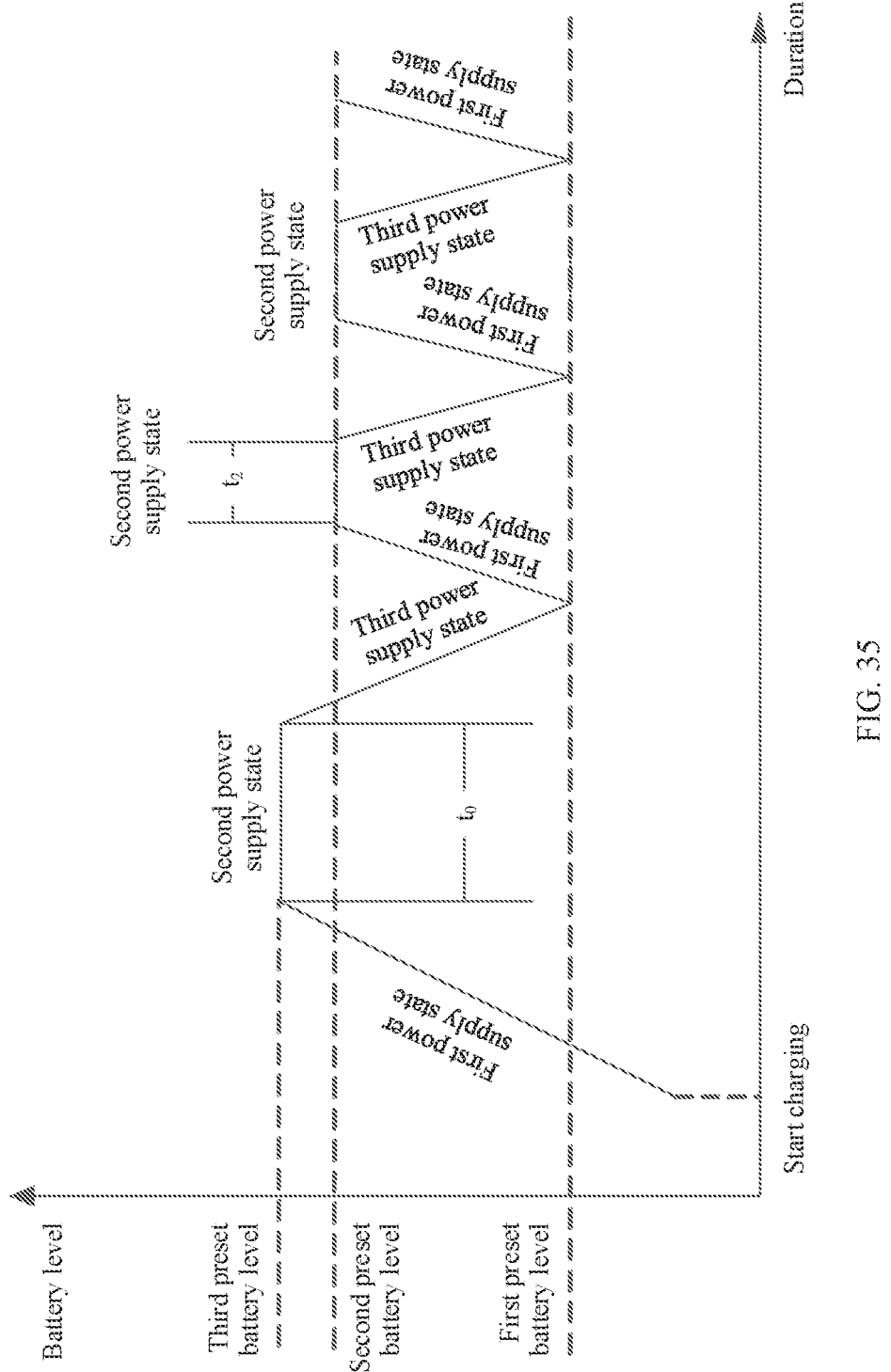
FIG. 35 is a schematic diagram 7 of a change of a battery level of a battery according to an embodiment of this application.

FIG. 35 is a schematic diagram of a change of a battery level of a battery in a charging method according to an embodiment of this application. Refer to FIG. 35. After an electronic device is connected to a charging device, because the electronic device is in a first power supply state, the battery level of the battery gradually increases. After the battery level reaches a third preset battery level, the electronic device switches to a second power supply state and maintains the second power supply state for third preset duration to. If no power-intensive application runs when the second power supply state is maintained for the third preset duration, the battery level of the battery remains unchanged in the third preset duration. After the third preset duration, the battery level of the battery is still the third preset battery level, and the third preset battery level is greater than a first preset battery level. Therefore, the electronic device switches to a third power supply state, and the battery level of the battery decreases. When determining that the battery level of the battery decreases to the first preset battery level, the electronic device switches to the first power supply state, and the battery level of the battery increases. When determining that the battery level of the battery increases to a second preset battery level, the electronic device switches to the second power supply state, and maintains the second power supply state for second preset duration t2. If no power-intensive application runs when the second power supply state is maintained for the second preset duration, the battery level of the battery remains unchanged in the second preset duration. Then, the electronic device switches to a third power supply state, and the battery level of the battery decreases. When determining that the battery level of the battery decreases to the first preset battery level, the electronic device switches to the first power supply state, and the battery level of the battery increases. When determining that the battery level of the battery increases to the second preset battery level, the electronic device switches to the second power supply state, and maintains the second power supply state for the second preset duration. If no power-intensive application runs when the second power supply state is maintained for the second preset duration, the battery level of the battery remains unchanged in the second preset duration. Then, the electronic device switches to the third power supply state, and the battery level of the battery decreases. This process repeats until the electronic device determines to disconnect from the charging device.

According to the charging method in this embodiment, a service life of the battery is long, a battery capacity loss rate is low, and reliability of the electronic device is high.

Figure 36A:
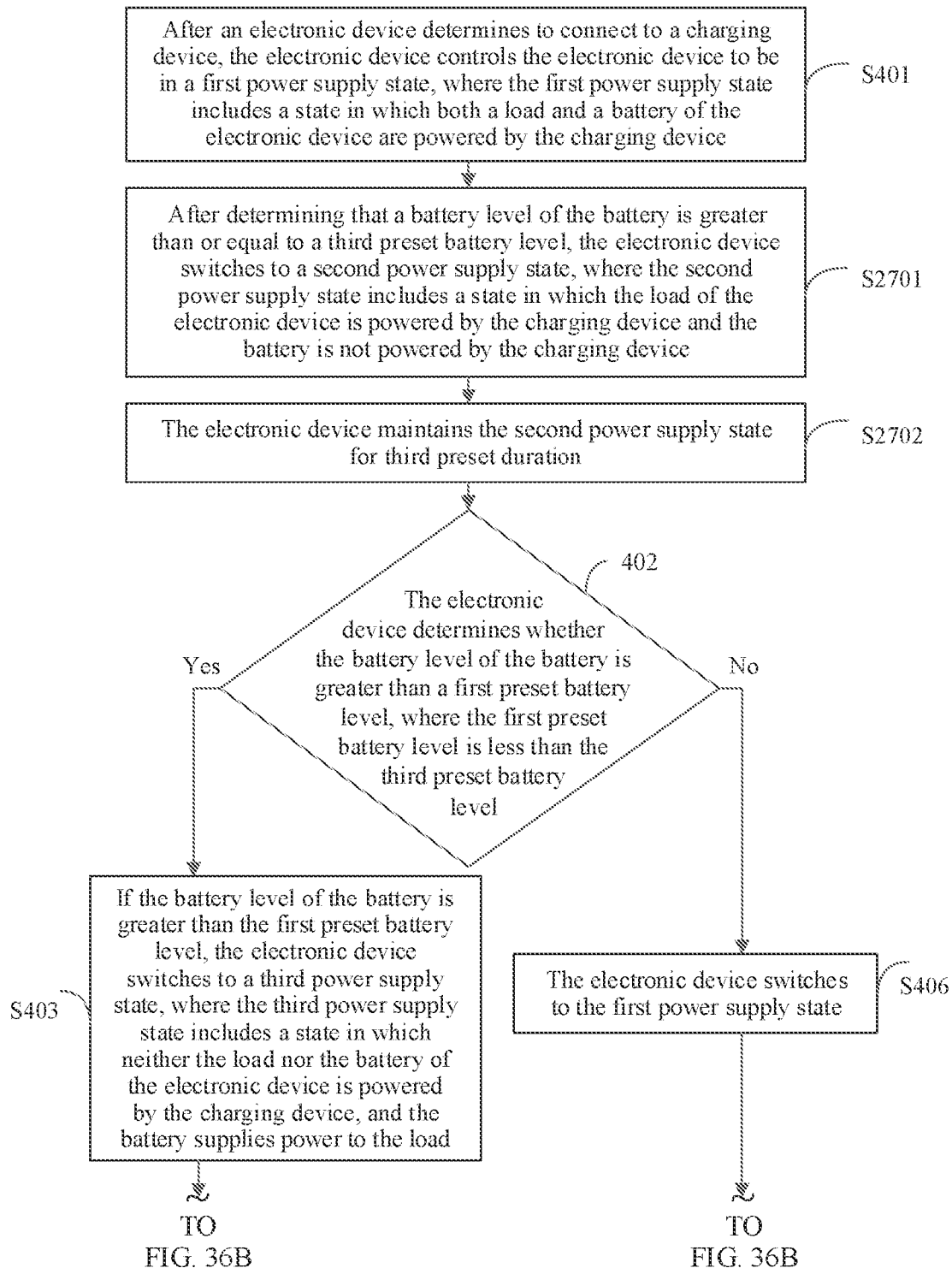
FIG. 36A and FIG. 36B are a flowchart 8 of a charging method according to an embodiment of this application.
Figure 36B:
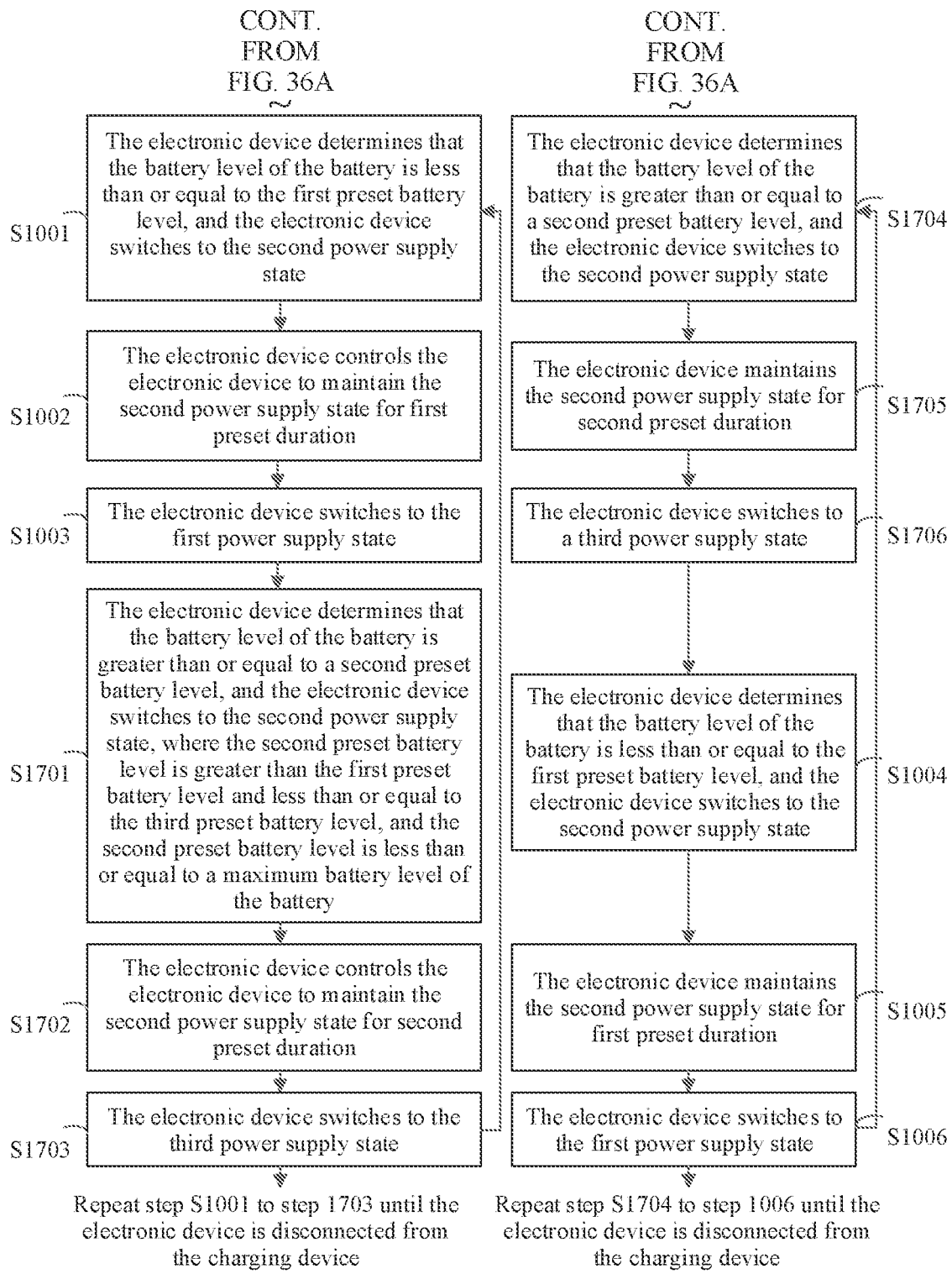

FIG. 36A and FIG. 36B are a flowchart 8 of a charging method according to an embodiment of this application. The embodiment shown in FIG. 36A and FIG. 36B is further improved based on the embodiment shown in FIG. 24A and FIG. 24B. The following describes still another charging method provided in this embodiment with reference to the embodiment in FIG. 36A and FIG. 36B.

Refer to FIG. 36A and FIG. 36B. A difference between this embodiment and the embodiment shown in FIG. 24A and FIG. 24B lies in that after step S401 in which the electronic device is in the first power supply state and before step S402 in which it is determined whether the battery level of the battery is greater than the first preset battery level, the method in this embodiment further includes step S2701 and step S2702. For specific implementation, refer to the description in the embodiment shown in FIG. 27A, and details are not described herein again.

Figure 37A:
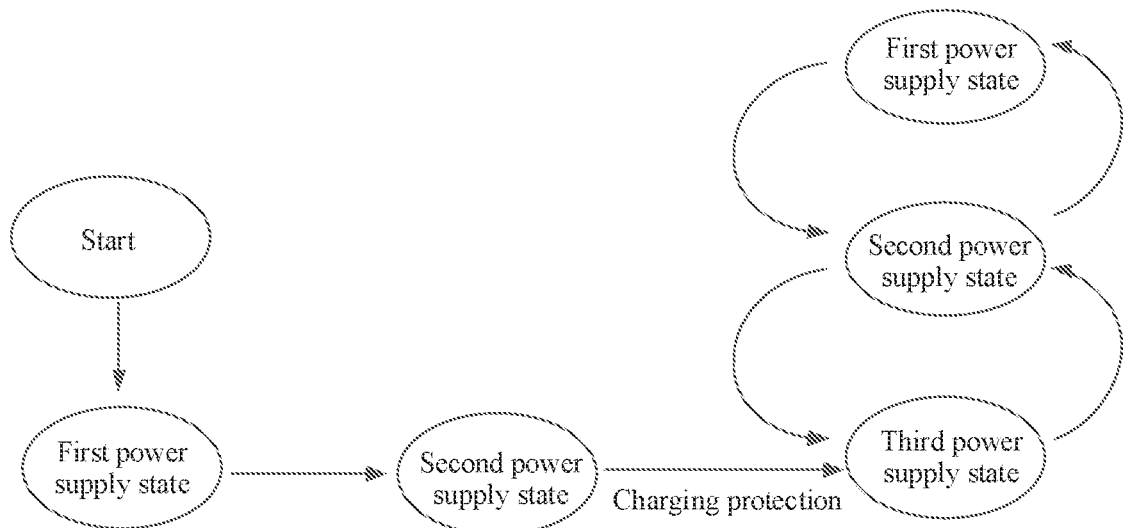
FIG. 37A is a schematic diagram 15 of a change of a power supply state of an electronic device according to an embodiment of this application.
Figure 37B:
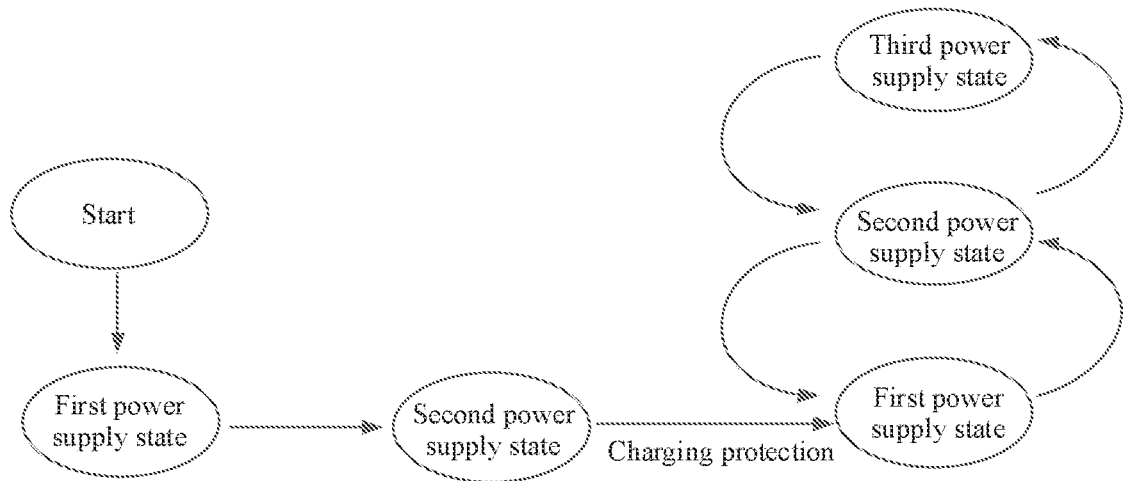
FIG. 37B is a schematic diagram 16 of a change of a power supply state of an electronic device according to an embodiment of this application.

A schematic diagram of a change of the power supply state of the electronic device corresponding to this solution may be as shown in FIG. 37A or FIG. 37B. After the electronic device is connected to the charging device, the electronic device is in the first power supply state. After the battery level of the battery reaches the third preset battery level, the electronic device is in the second power supply state for the third preset duration, and then enters a charging protection state. Refer to FIG. 37A. When the electronic device is in the charging protection state, in one cycle, the electronic device has power supply states that are sequentially the third power supply state, the second power supply state, the first power supply state, and the second power supply state. Refer to FIG. 37B. When the electronic device is in the charging protection state, in one cycle, the electronic device has power supply states that are sequentially the first power supply state, the second power supply state, the third power supply state, and the second power supply state.

Figure 38:
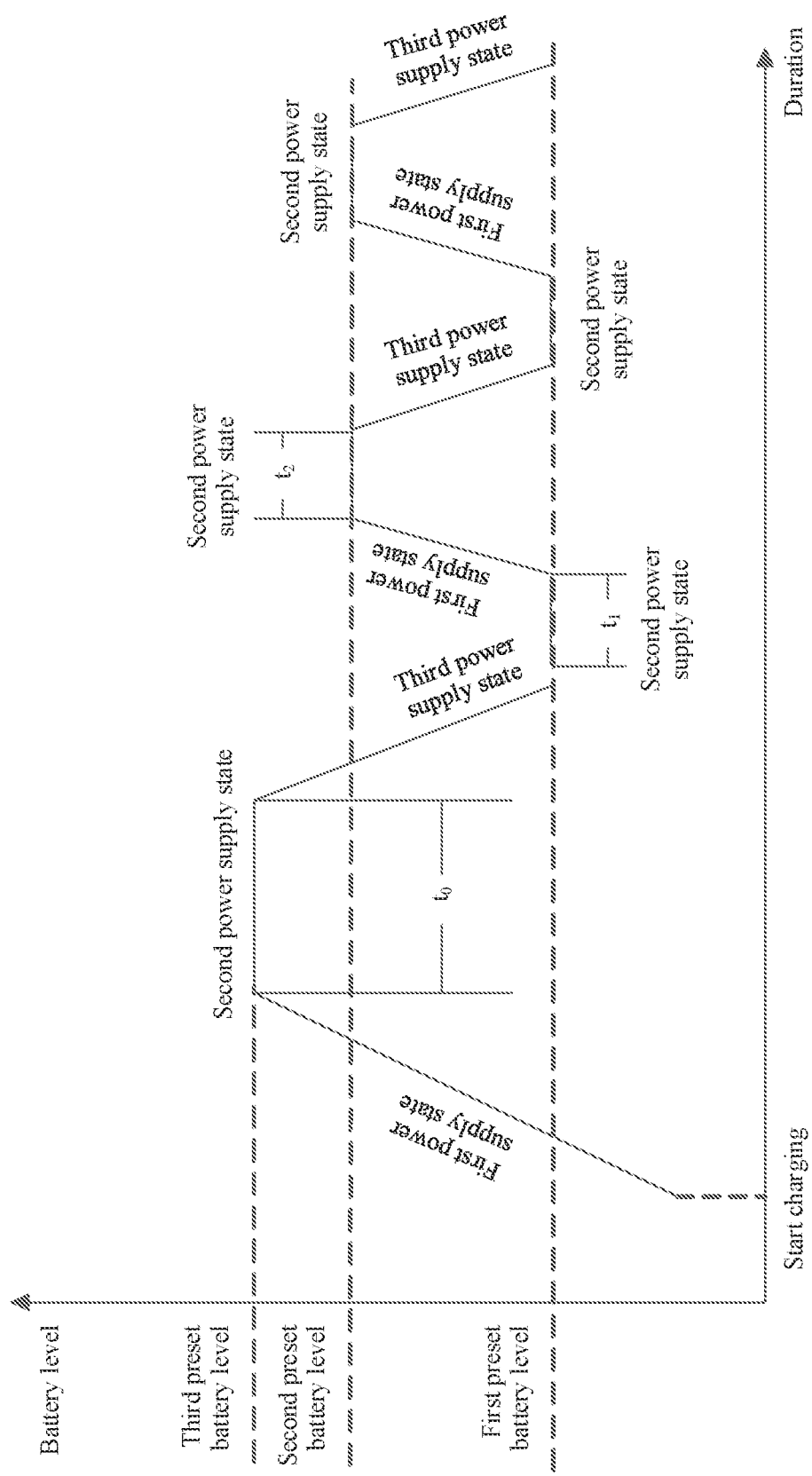
FIG. 38 is a schematic diagram 8 of a change of a battery level of a battery according to an embodiment of this application.

FIG. 38 is a schematic diagram of a change of a battery level of a battery in a charging method according to an embodiment of this application. Refer to FIG. 38. After an electronic device is connected to a charging device, because the electronic device is in a first power supply state, the battery level of the battery gradually increases. After the battery level reaches a third preset battery level, the electronic device switches to a second power supply state and maintains the second power supply state for third preset duration t0. If no power-intensive application runs when the second power supply state is maintained for the third preset duration, the battery level of the battery remains unchanged in the third preset duration. After the third preset duration, the battery level of the battery is still the third preset battery level, and the third preset battery level is greater than a first preset battery level. Therefore, the electronic device switches to a third power supply state, and the battery level of the battery decreases. When determining that the battery level of the battery decreases to the first preset battery level, the electronic device switches to the second power supply state, and maintains the second power supply state for first preset duration t1. If no power-intensive application runs when the second power supply state is maintained for the first preset duration, the battery level of the battery remains unchanged in the first preset duration. Then, the electronic device switches to the first power supply state, and the battery level of the battery increases. When determining that the battery level of the battery increases to a second preset battery level, the electronic device switches to the second power supply state, and maintains the second power supply state for second preset duration t2. If no power-intensive application runs when the second power supply state is maintained for the second preset duration, the battery level of the battery remains unchanged in the second preset duration. Then, the electronic device switches to the third power supply state, and the battery level of the battery decreases. When determining that the battery level of the battery decreases to the first preset battery level, the electronic device switches to the second power supply state, and maintains the second power supply state for the first preset duration. If no power-intensive application runs when the second power supply state is maintained for the first preset duration, the battery level of the battery remains unchanged in the first preset duration. Then, the electronic device switches to the first power supply state, and the battery level of the battery increases. When determining that the battery level of the battery increases to the second preset battery level, the electronic device switches to the second power supply state, and maintains the second power supply state for the first preset duration. If no power-intensive application runs when the second power supply state is maintained for the second preset duration, the battery level of the battery remains unchanged in the second preset duration. Then, the electronic device switches to the third power supply state, and the battery level of the battery decreases. This process repeats until the electronic device determines to disconnect from the charging device.

According to the charging method in this embodiment, a service life of the battery is long, a battery capacity loss rate is low, and reliability of the electronic device is high.

The charging method in embodiments of this application is described above by using several embodiments. It may be understood that in the foregoing embodiments, after any step, the electronic device is disconnected from a terminal device. If the electronic device is disconnected from the terminal device, steps after this step are not performed again.

As described above, after the electronic device enters a charging protection state, the battery level of the battery is always less than or equal to the third preset battery level, and the third preset battery level is less than or equal to a maximum battery level of the battery. For example, the electronic device is a mobile phone. In a case of the electronic device in the charging protection state in which the user needs to charge the battery of the electronic device to the maximum battery level and disconnect the electronic device from the charging device, if the user does not disconnect the mobile phone from the charging device in time, the mobile phone has entered the charging protection state when the mobile phone needs to disconnect from the charging device, and the battery level displayed on a display of the mobile phone is less than the maximum battery level of the battery. In this case, the user may input a first instruction by using the electronic device. The first instruction instructs the electronic device to charge the battery to the maximum battery level. After the electronic device obtains the first instruction, the electronic device executes the first instruction, so that the battery level of the battery reaches the maximum battery level.

That the electronic device obtains the first instruction includes but is not limited to the following several implementations.

First implementation: The electronic device obtains the first instruction input by a user by using a voice.

Second implementation: The electronic device obtains the first instruction that is input by a user by performing an operation on a preset icon on a display interface. The operation on the preset icon may be tapping the preset icon for a preset quantity of times, or may be touching the preset icon for at least preset duration.

Third implementation: The electronic device obtains the first instruction that is input by a user by performing an operation on a preset physical button. The operation on the preset physical button may be pressing the preset physical button for a preset quantity of times, or may be flipping the preset physical button from a first location to a second location, or may be pressing the preset physical button for preset duration.

In an implementation, after the electronic device executes the first instruction to enable the battery level of the battery to reach the maximum battery level, the electronic device may exit the charging protection state. In this case, when a display of the electronic device displays second indication information, the second indication information is no longer displayed after the electronic device executes the first instruction to enable the battery level of the battery to reach the maximum battery level. When the display of the charging device displays the second indication information, the charging device no long displays the second indication information after the electronic device executes the first instruction to enable the battery level of the battery to reach the maximum battery level.

Figure 39B:
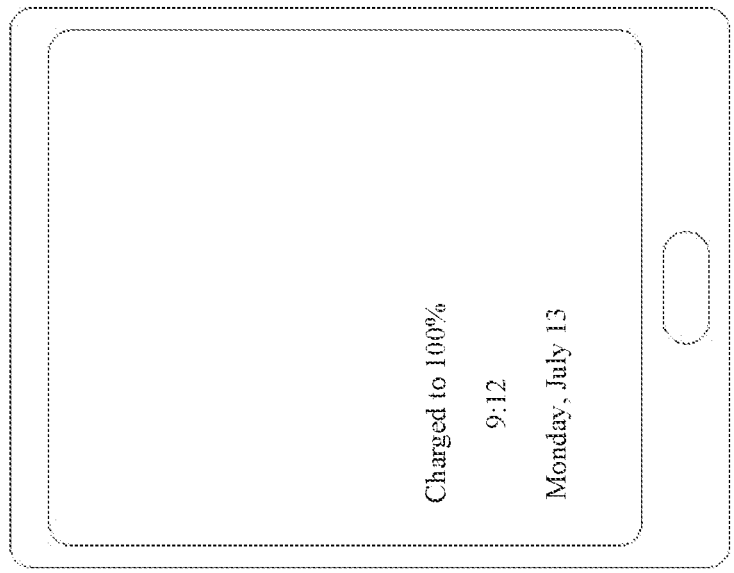
FIG. 39B is a schematic diagram 17 of a user interface of an electronic device in a screen-locked state according to an embodiment of this application.
Figure 39A:
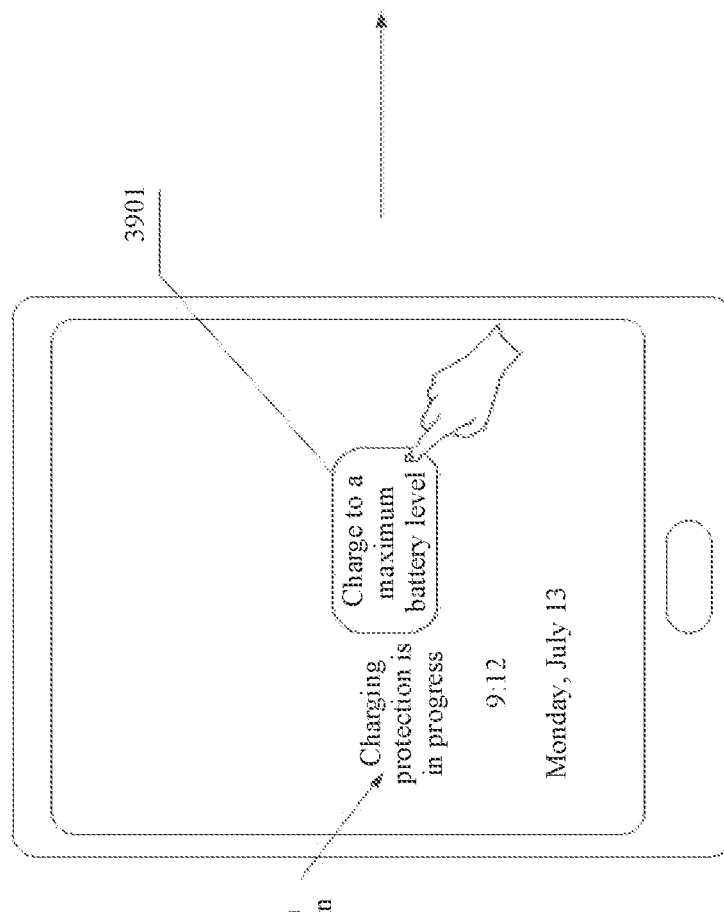
FIG. 39A is a schematic diagram 16 of a user interface of an electronic device in a screen-locked state according to an embodiment of this application.
Figure 41A:
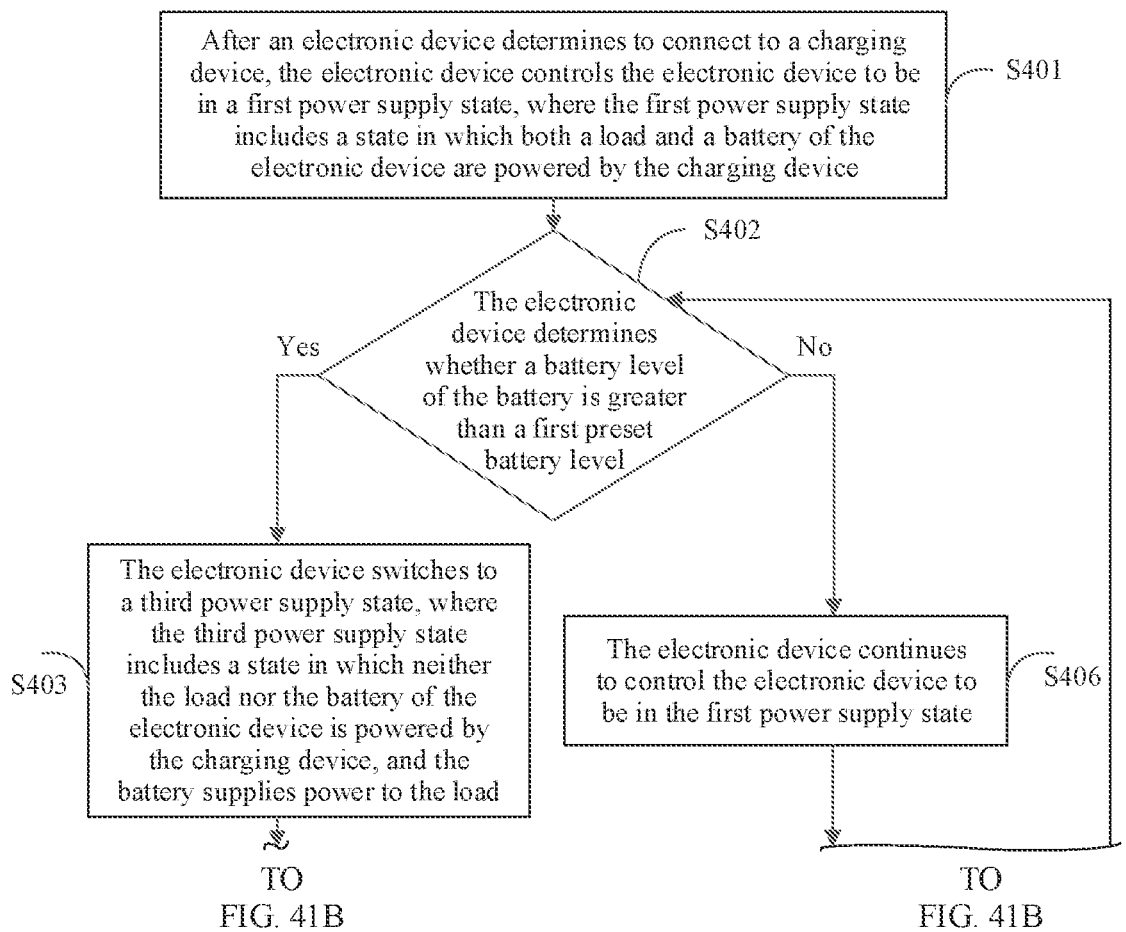
FIG. 41A and FIG. 41B are a flowchart 9 of a charging method according to an embodiment of this application.
Figure 41B:
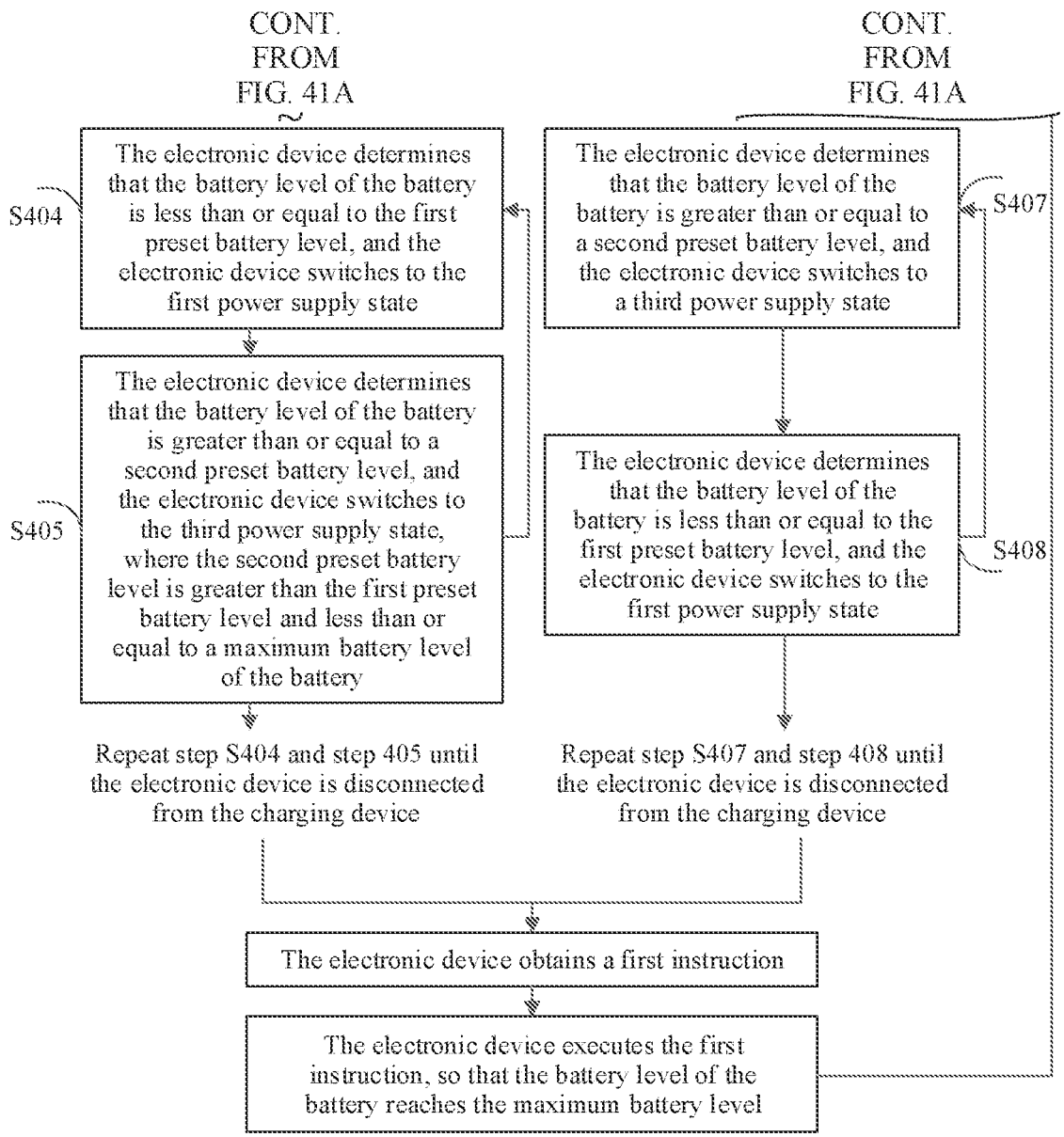
Figure 42A:
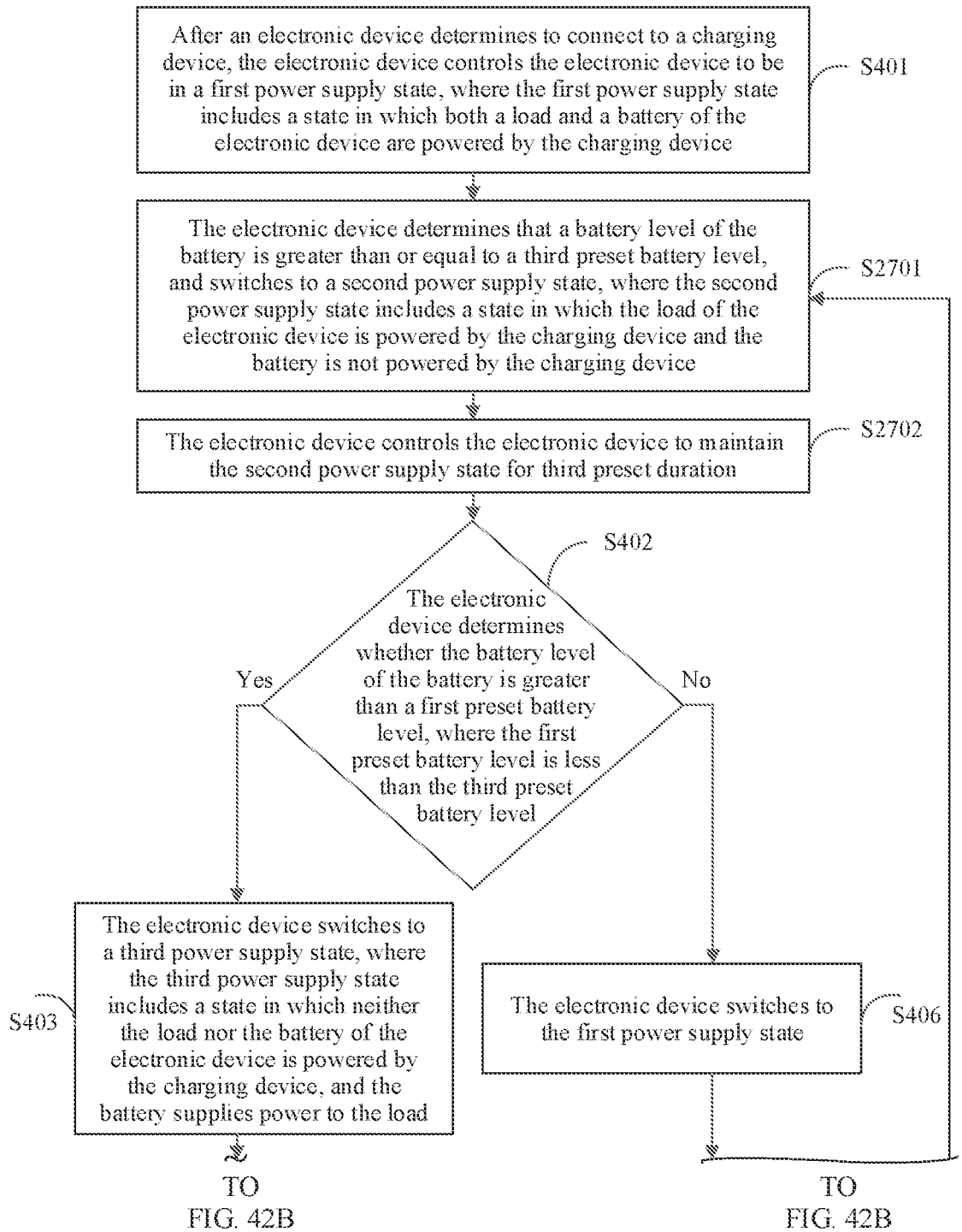
FIG. 42A and FIG. 42B are a flowchart 10 of a charging method according to an embodiment of this application.
Figure 42B:
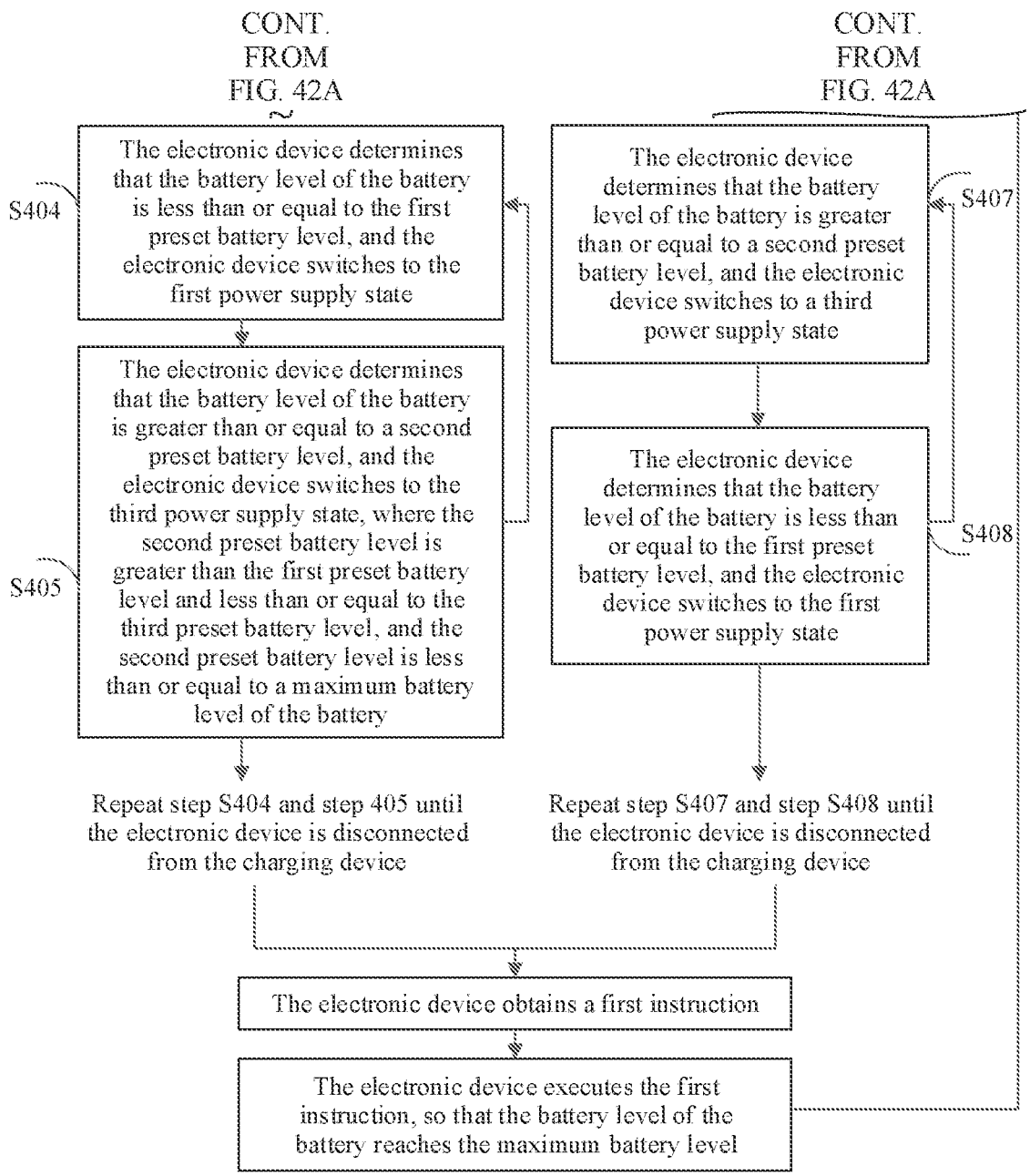

When the electronic device obtains the first instruction in the second implementation, schematic diagrams of a change of a user interface corresponding to this embodiment may be shown in FIG. 39A and FIG. 39B, or FIG. 40A and FIG. 40B. Refer to FIG. 39A or FIG. 40A. The user taps a preset icon 3901 to input the first instruction, and the electronic device executes the first instruction, so that the battery level of the battery reaches the maximum battery level 100%, and the second indication information and the preset icon are no longer displayed, as shown in FIG. 39B or FIG. 40B.

In another implementation, after executing the first instruction to enable the battery level of the battery to reach the maximum battery level, the electronic device may perform the method after step S401 in any embodiment of FIG. 4, FIG. 10A and FIG. 10B, FIG. 17A and FIG. 17B, FIG. 24A and FIG. 24B, FIG. 27A and FIG. 27B, FIG. 30A and FIG. 30B, FIG. 33A and FIG. 33B, or FIG. 36A and FIG. 36B, as shown in FIG. 41A and FIG. 41B or FIG. 42A and FIG. 42B.

According to the method in this embodiment, reliability of the electronic device can be further improved, and user experience can be improved.

The foregoing describes the charging method in embodiments of this application, and the following describes an apparatus in embodiments of this application.

Figure 43:
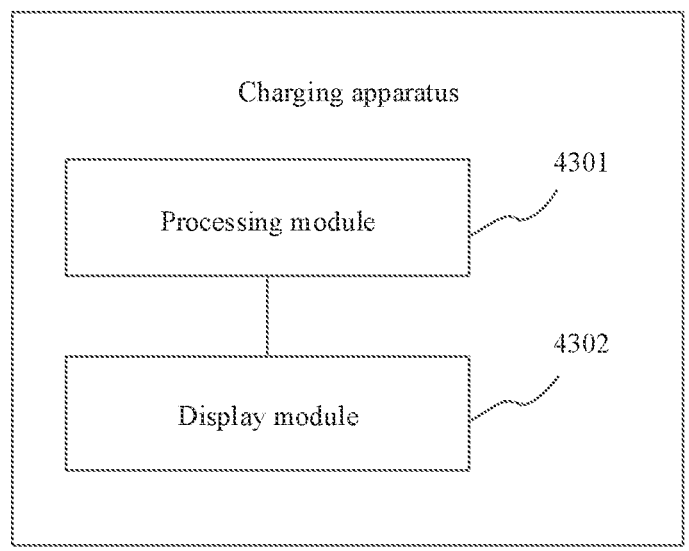
FIG. 43 is a schematic diagram of a structure of a charging apparatus according to an embodiment of this application.

FIG. 43 is a schematic diagram of a structure of a charging apparatus according to an embodiment of this application. Refer to FIG. 43. The charging apparatus includes a processing module 4301 and a display module 4302.

The processing module 4301 is configured to: control, if a battery level of a battery of an electronic device is less than or equal to a first preset battery level, the electronic device to be in a state in which both a load and the battery of the electronic device are powered by a charging device; and control, if the battery level of the battery is greater than or equal to a second preset battery level, the electronic device to be in a state in which neither the load nor the battery is powered by the charging device, and the battery supplies power to the load, where the second preset battery level is greater than the first preset battery level and is less than or equal to a maximum battery level of the battery.

In a possible implementation, when the processing module 4301 is configured to control, if the battery level of the battery is less than or equal to the first preset battery level, the electronic device to be in the state in which both the load and the battery are powered by the charging device, the processing module is specifically configured to: if the battery level of the battery of the electronic device is less than or equal to the first preset battery level, control the electronic device to be in a state in which the load is powered by the charging device and the battery is not powered by the charging device; and if duration in which the electronic device is in the state in which the load is powered by the charging device and the battery is not powered by the charging device is equal to first preset duration, control the electronic device to be in the state in which both the load and the battery are powered by the charging device.

In a possible implementation, when the processing module 4301 is configured to control, if the battery level of the battery is greater than or equal to the second preset battery level, the electronic device to be in the state in which neither the load nor the battery is powered by the charging device, and the battery supplies power to the load, the processing module is specifically configured to: if the battery level of the battery of the electronic device is greater than or equal to the second preset battery level, control the electronic device to be in the state in which the load is powered by the charging device and the battery is not powered by the charging device; and if the duration in which the electronic device is in the state in which the load is powered by the charging device and the battery is not powered by the charging device is equal to second preset duration, control the electronic device to be in the state in which neither the load nor the battery is powered by the charging device, and the battery supplies power to the load.

In a possible implementation, before the processing module 4301 controls, if the battery level of the battery of the electronic device is less than or equal to the first preset battery level, the electronic device to be in the state in which both the load and the battery are powered by the charging device, the processing module 4301 is further configured to: after the electronic device is connected to the charging device, control the electronic device to be in the state in which both the load and the battery are powered by the charging device; if the battery level of the battery of the electronic device is greater than or equal to a third preset battery level, control the electronic device to be in the state in which the load is powered by the charging device and the battery is not powered by the charging device, where the third preset battery level is greater than or equal to the second preset battery level and is less than or equal to the maximum battery level of the battery; and control the electronic device to last for third preset duration in the state in which the load is powered by the charging device and the battery is not powered by the charging device.

In a possible implementation, after the processing module 4301 controls the electronic device to last for the third preset duration in the state in which the load is powered by the charging device and the battery is not powered by the charging device, and before the processing module 4301 controls, if the battery level of the battery is less than or equal to the first preset battery level, the electronic device to be in the state in which both the load and the battery are powered by the charging device, the processing module is further configured to: if the battery level of the battery is greater than the first preset battery level, control the electronic device to be in the state in which neither the load nor the battery is powered by the charging device, and the battery supplies power to the load.

In a possible implementation, after the processing module 4301 controls the electronic device to be in the state in which both the load and the battery are powered by the charging device, the display module 4302 is configured to display first indication information, where the first indication information indicates that the battery is in a state in which the charging device supplies power.

In a possible implementation, after the processing module 4301 controls the electronic device to be in the state in which the load is powered by the charging device and the battery is not powered by the charging device, the display module 4302 is configured to: display third indication information, where the third indication information indicates that the electronic device is in the state in which the load is powered by the charging device and the battery is not powered by the charging device.

In a possible implementation, the display module 4302 is configured to: display second indication information, where the second indication information indicates that the battery of the electronic device is in a charging protection state.

In a possible implementation, the processing module 4301 is further configured to: obtain a first instruction, where the first instruction instructs to charge the battery to the maximum battery level; and control, in response to the first instruction, the electronic device to be in the state in which both the load and the battery are powered by the charging device, so that the battery level of the battery reaches the maximum battery level.

In a possible implementation, when obtaining the first instruction, the processing module 4301 is specifically configured to: obtain the first instruction input by a user by using a voice; or obtain the first instruction that is input by a user by using an operation on a preset icon on a display interface; or obtain the first instruction that is input by a user by using an operation on a preset physical button.

In a possible implementation, the first preset battery level is greater than or equal to a battery level 50% and less than or equal to a battery level 65%.

In a possible implementation, the second preset battery level is greater than or equal to a battery level 70% and less than or equal to a battery level 85%.

The charging apparatus shown in this embodiment may perform the technical solutions shown in the foregoing method embodiments. Implementation principles and beneficial effects of the charging apparatus are similar to those of the technical solutions, and details are not described herein again.

Figure 44:
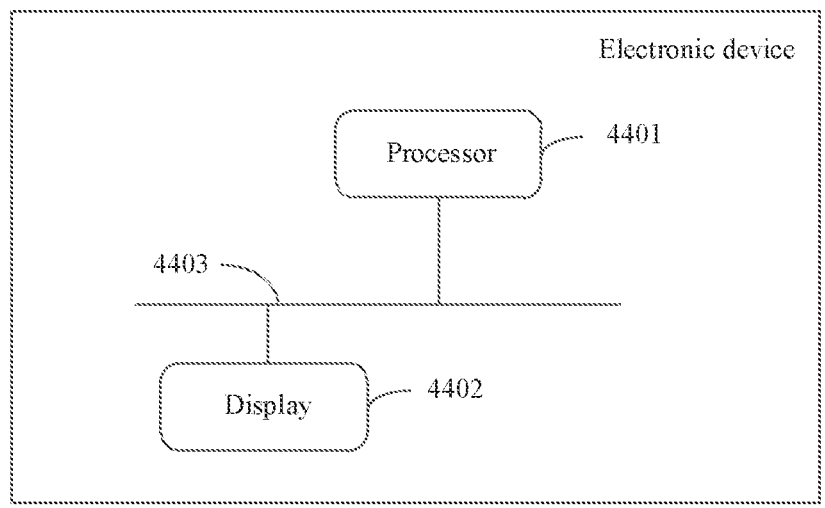
FIG. 44 is a schematic diagram of a structure of a terminal device according to an embodiment of this application.

FIG. 44 is a schematic diagram of a structure of a terminal device according to an embodiment of this application. Refer to FIG. 44. The terminal device in this embodiment may include a processor 4401 and a display 4402. The processor 4401 and the display 4402 may communicate with each other by using a communication bus 4403.

The processor 4401 is configured to: control, if a battery level of a battery of an electronic device is less than or equal to a first preset battery level, the electronic device to be in a state in which both a load and the battery of the electronic device are powered by a charging device; and control, if the battery level of the battery is greater than or equal to a second preset battery level, the electronic device to be in a state in which neither the load nor the battery is powered by the charging device, and the battery supplies power to the load, where the second preset battery level is greater than the first preset battery level and is less than or equal to a maximum battery level of the battery.

In a possible implementation, when the processor 4401 is configured to control, if the battery level of the battery is less than or equal to the first preset battery level, the electronic device to be in the state in which both the load and the battery are powered by the charging device, the processor is specifically configured to: if the battery level of the battery of the electronic device is less than or equal to the first preset battery level, control the electronic device to be in a state in which the load is powered by the charging device and the battery is not powered by the charging device; and if duration in which the electronic device is in the state in which the load is powered by the charging device and the battery is not powered by the charging device is equal to first preset duration, control the electronic device to be in the state in which both the load and the battery are powered by the charging device.

In a possible implementation, when the processor 4401 is configured to control, if the battery level of the battery is greater than or equal to the second preset battery level, the electronic device to be in the state in which neither the load nor the battery is powered by the charging device, and the battery supplies power to the load, the processor is specifically configured to: if the battery level of the battery of the electronic device is greater than or equal to the second preset battery level, control the electronic device to be in the state in which the load is powered by the charging device and the battery is not powered by the charging device; and if the duration in which the electronic device is in the state in which the load is powered by the charging device and the battery is not powered by the charging device is equal to second preset duration, control the electronic device to be in the state in which neither the load nor the battery is powered by the charging device, and the battery supplies power to the load.

In a possible implementation, before the processor 4401 controls, if the battery level of the battery of the electronic device is less than or equal to the first preset battery level, the electronic device to be in the state in which both the load and the battery are powered by the charging device, the processor 4401 is further configured to: after the electronic device is connected to the charging device, control the electronic device to be in the state in which both the load and the battery are powered by the charging device; if the battery level of the battery of the electronic device is greater than or equal to a third preset battery level, control the electronic device to be in the state in which the load is powered by the charging device and the battery is not powered by the charging device, where the third preset battery level is greater than or equal to the second preset battery level and is less than or equal to the maximum battery level of the battery; and control the electronic device to last for third preset duration in the state in which the load is powered by the charging device and the battery is not powered by the charging device.

In a possible implementation, after the processor 4401 controls the electronic device to last for the third preset duration in the state in which the load is powered by the charging device and the battery is not powered by the charging device, and before the processor 4401 controls, if the battery level of the battery is less than or equal to the first preset battery level, the electronic device to be in the state in which both the load and the battery are powered by the charging device, the processor is further configured to: if the battery level of the battery is greater than the first preset battery level, control the electronic device to be in the state in which neither the load nor the battery is powered by the charging device, and the battery supplies power to the load.

In a possible implementation, after the processor 4401 controls the electronic device to be in the state in which both the load and the battery are powered by the charging device, the display 4402 is configured to display first indication information, where the first indication information indicates that the battery is in a state in which the charging device supplies power.

In a possible implementation, after the processor 4401 controls the electronic device to be in the state in which the load is powered by the charging device and the battery is not powered by the charging device, the display 4402 is configured to: display third indication information, where the third indication information indicates that the electronic device is in the state in which the load is powered by the charging device and the battery is not powered by the charging device.

In a possible implementation, the display 4402 is configured to: display second indication information, where the second indication information indicates that the battery of the electronic device is in a charging protection state.

In a possible implementation, the processor 4401 is further configured to: obtain a first instruction, where the first instruction instructs to charge the battery to the maximum battery level; and control, in response to the first instruction, the electronic device to be in the state in which both the load and the battery are powered by the charging device, so that the battery level of the battery reaches the maximum battery level.

In a possible implementation, when obtaining the first instruction, the processor 4401 is specifically configured to: obtain the first instruction input by a user by using a voice; or obtain the first instruction that is input by a user by using an operation on a preset icon on a display interface; or obtain the first instruction that is input by a user by using an operation on a preset physical button.

In a possible implementation, the first preset battery level is greater than or equal to a battery level 50% and less than or equal to a battery level 65%.

In a possible implementation, the second preset battery level is greater than or equal to a battery level 70% and less than or equal to a battery level 85%.

The electronic device shown in this embodiment may perform the technical solutions shown in the foregoing method embodiments. Implementation principles and beneficial effects of the electronic device are similar to those of the technical solutions, and details are not described herein again.

Embodiments of this application provide a non-transitory computer-readable storage medium storing computer instructions. The storage medium is configured to store a computer program, and the computer program is used to implement the charging method in the foregoing embodiments.

Embodiments of this application provide a chip. The chip is configured to support an electronic device in implementing functions shown in embodiments of this application. The chip is specifically used in a chip system. The chip system may include a chip, or may include a chip and another discrete component. When the foregoing method is implemented by using the chip in the electronic device, the chip includes a processing unit. Further, the chip may further include a communication unit. The processing unit may be, for example, a processor. When the chip includes the communication unit, the communication unit may be, for example, an input/output interface, a pin, or a circuit. The processing unit performs all or some of actions performed by processing modules in embodiments of this application, and the communication unit may perform a corresponding receiving or sending action. In another specific embodiment, the processing module of the electronic device in this application may be a processing unit of a chip.

All or some of the steps of the foregoing method embodiments may be implemented by a program instructing related hardware. The foregoing program may be stored in a computer-readable memory. When the program is executed, the steps of the methods in embodiments are performed. The memory (storage medium) includes: a read-only memory (read-only memory, ROM), a RAM, a flash memory, a hard disk, a solid state disk, a magnetic tape (magnetic tape), a floppy disk (floppy disk), an optical disc (optical disc), and any combination thereof.

Embodiments of this application are described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processing unit of another programmable data processing device to generate a machine, so that the instructions executed by the computer or the processing unit of the another programmable data processing device generate an apparatus for implementing a specified function in one or more processes in the flowcharts and/or in one or more blocks in the block diagrams.

These computer program instructions may alternatively be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to embodiments of this application without departing from the spirit and scope of this application. In this case, this application is intended to cover these modifications and variations of the embodiments of this application provided that they fall within the scope of protection defined by the following claims and their equivalent technologies of this application.

In this application, the term "including" and a variant thereof may refer to non-limitative inclusion; the term "or" and a variant thereof may refer to "and/or". In this application, the terms "first", "second", and the like are intended to distinguish between similar objects but do not necessarily indicate a specific order or sequence. In this application, "a plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The invention claimed is:

1. A method comprising:
controlling an electronic device to be in a state in which both a load and a battery of the electronic device are powered by a charging device when a battery level of the battery is less than or equal to a first preset battery level; and
controlling the electronic device to be in a state in which neither the load nor the battery is powered by the charging device, and the battery supplies power to the load when the battery level of the battery is greater than or equal to a second preset battery level,
wherein the second preset battery level is greater than the first preset battery level and less than or equal to a maximum battery level of the battery.

2. The method of claim 1, wherein controlling the electronic device to be in the state in which both the load and the battery are powered by the charging device comprises:
controlling the electronic device to be in a state in which the load is powered by the charging device and the battery is not powered by the charging device when the battery level of the battery of the electronic device is less than or equal to the first preset battery level; and
controlling the electronic device to be in the state in which both the load and the battery are powered by the charging device when a duration in which the electronic device is in the state in which the load is powered by the charging device and the battery is not powered by the charging device is equal to a first preset duration.

3. The method of claim 2, wherein, after controlling the electronic device to be in the state in which the load is powered by the charging device and the battery is not powered by the charging device, the method further comprises displaying third indication information, and wherein the third indication information indicates that the electronic device is in the state in which the load is powered by the charging device and the battery is not powered by the charging device.

4. The method of claim 1, wherein controlling the electronic device to be in the state in which neither the load nor the battery is powered by the charging device, and the battery supplies power to the load comprises:
controlling the electronic device to be in the state in which the load is powered by the charging device and the battery is not powered by the charging device when the battery level of the battery of the electronic device is greater than or equal to the second preset battery level; and
controlling the electronic device to be in the state in which neither the load nor the battery is powered by the charging device, and the battery supplies power to the load when a duration in which the electronic device is in the state in which the load is powered by the charging device and the battery is not powered by the charging device is equal to a second preset duration.

5. The method of claim 1, wherein, before controlling the electronic device to be in the state in which both the load and the battery are powered by the charging device, the method further comprises:
after the electronic device is connected to the charging device, controlling the electronic device to be in the state in which both the load and the battery are powered by the charging device;
controlling the electronic device to be in the state in which the load is powered by the charging device and the battery is not powered by the charging device when the battery level of the battery of the electronic device is greater than or equal to a third preset battery level, wherein the third preset battery level is greater than or equal to the second preset battery level and is less than or equal to the maximum battery level of the battery; and
controlling the electronic device to last for a third preset duration in the state in which the load is powered by the charging device and the battery is not powered by the charging device.

6. The method of claim 5, wherein, after controlling the electronic device to last for the third preset duration in the state in which the load is powered by the charging device and the battery is not powered by the charging device, and before controlling, the electronic device to be in the state in which both the load and the battery are powered by the charging device, the method further comprises:
controlling the electronic device to be in the state in which neither the load nor the battery is powered by the charging device, and the battery supplies power to the load when the battery level is greater than the first preset battery level.

7. The method of claim 1, wherein, after controlling the electronic device to be in the state in which both the load and the battery are powered by the charging device, the method further comprises displaying first indication information, and wherein the first indication information indicates that the battery is in a state in which the charging device supplies power.

8. The method of claim 1, further comprising displaying second indication information, wherein the second indication information indicates that the battery of the electronic device is in a charging protection state.

9. The method of claim 1, further comprising:
obtaining a first instruction, wherein the first instruction instructs to charge the battery to the maximum battery level; and
controlling, in response to the first instruction, the electronic device to be in the state in which both the load and the battery are powered by the charging device so that the battery level of the battery reaches the maximum battery level.

10. The method of claim 9, wherein obtaining the first instruction comprises:
obtaining the first instruction input by a user by using a voice, or
obtaining the first instruction that is input by the user by using an operation on a preset icon on a display interface, or
obtaining the first instruction that is input by the user by using an operation on a preset physical button.

11. The electronic device comprising:
one or more touchscreens;
one or more memories; and
one or more processors,
wherein the one or more memories store one or more programs, and
when the one or more processors execute the one or more programs, the electronic device is configured to perform the method of claim 1.

12. The electronic device of claim 11, wherein the electronic device is configured to perform controlling the electronic device to be in the state in which both the load and the battery are powered by the charging device by:
controlling the electronic device to be in a state in which the load is powered by the charging device and the battery is not powered by the charging device when the battery level of the battery of the electronic device is less than or equal to the first preset battery level; and
controlling the electronic device to be in the state in which both the load and the battery are powered by the charging device when a duration in which the electronic device is in the state in which the load is powered by the charging device and the battery is not powered by the charging device is equal to a first preset duration.

13. The electronic device of claim 12, wherein the electronic device is further configured to perform:
after controlling the electronic device to be in the state in which the load is powered by the charging device and the battery is not powered by the charging device, displaying third indication information, wherein the third indication information indicates that the electronic device is in the state in which the load is powered by the charging device and the battery is not powered by the charging device.

14. The electronic device of claim 11, wherein the electronic device is configured to perform controlling the electronic device to be in the state in which neither the load nor the battery is powered by the charging device, and the battery supplies power to the load by:
controlling the electronic device to be in the state in which the load is powered by the charging device and the battery is not powered by the charging device when the battery level of the battery of the electronic device is greater than or equal to the second preset battery level; and
controlling the electronic device to be in the state in which neither the load nor the battery is powered by the charging device, and the battery supplies power to the load when a duration in which the electronic device is in the state in which the load is powered by the charging device and the battery is not powered by the charging device is equal to a second preset duration.

15. The electronic device of claim 11, wherein the electronic device is further configured to perform, before controlling the electronic device to be in the state in which both the load and the battery are powered by the charging device:
after the electronic device is connected to the charging device, controlling the electronic device to be in the state in which both the load and the battery are powered by the charging device;
controlling the electronic device to be in the state in which the load is powered by the charging device and the battery is not powered by the charging device when the battery level of the battery of the electronic device is greater than or equal to a third preset battery level, wherein the third preset battery level is greater than or equal to the second preset battery level and is less than or equal to the maximum battery level of the battery; and
controlling the electronic device to last for a third preset duration in the state in which the load is powered by the charging device and the battery is not powered by the charging device.

16. The electronic device of claim 11, wherein the electronic device is further configured to perform, before controlling the electronic device to be in the state in which both the load and the battery are powered by the charging device:
after the electronic device is connected to the charging device, controlling the electronic device to be in the state in which both the load and the battery are powered by the charging device;
controlling the electronic device to be in the state in which the load is powered by the charging device and the battery is not powered by the charging device when the battery level of the battery of the electronic device is greater than or equal to a third preset battery level, wherein the third preset battery level is greater than or equal to the second preset battery level and is less than or equal to the maximum battery level of the battery; and
controlling the electronic device to last for a third preset duration in the state in which the load is powered by the charging device and the battery is not powered by the charging device.

17. The electronic device of claim 16, wherein the electronic device is further configured to perform:
after controlling the electronic device to last for the third preset duration in the state in which the load is powered by the charging device and the battery is not powered by the charging device, and before the controlling, the electronic device to be in the state in which both the load and the battery are powered by the charging device, controlling the electronic device to be in the state in which neither the load nor the battery is powered by the charging device, and the battery supplies power to the load when the battery level is greater than the first preset battery level.

18. The electronic device of claim 11, wherein the electronic device is further configured to perform:
after controlling the electronic device to be in the state in which both the load and the battery are powered by the charging device, displaying first indication information, wherein the first indication information indicates that the battery is in a state in which the charging device supplies power.

19. The electronic device of claim 11, wherein the electronic device is further configured to perform displaying second indication information, wherein the second indication information indicates that the battery of the electronic device is in a charging protection state.

20. A non-transitory computer-readable storage medium storing computer instructions, wherein the computer instructions are used to enable a computer to perform the method of claim 1.

* * * * *